US012663563B2

(12) United States Patent
Fahey et al.

(10) Patent No.:  US 12,663,563 B2
(45) Date of Patent:      Jun. 23, 2026

(54) COVER GLASS ARTICLES FOR CAMERA LENS AND SENSOR PROTECTION AND APPARATUS WITH THE SAME

(71) Applicant: CORNING INCORPORATED, Corning, NY (US)

(72) Inventors: Albert Joseph Fahey, Corning, NY (US); Shandon Dee Hart, Elmira, NY (US); Karl William Koch, III, Elmira, NY (US); Carlo Anthony Kosik Williams, Painted Post, NY (US); Lin Lin, Painted Post, NY (US); Alexandre Michel Mayolet, Corning, NY (US); Xu Ouyang, Painted Post, NY (US); Charles Andrew Paulson, Painted Post, NY (US); James Joseph Price, Corning, NY (US)

(73) Assignee: CORNING INCORPORATED, Corning, NY (US)

( * ) Notice:      Subject to any disclaimer, the term of this patent is extended or adjusted under 35 U.S.C. 154(b) by 439 days.

(21) Appl. No.:    18/265,709

(22) PCT Filed:    Dec. 10, 2021

(86) PCT No.:      PCT/US2021/062727
§ 371 (c)(1),
(2) Date:       Jun. 7, 2023

(87) PCT Pub. No.: WO2022/125846
PCT Pub. Date: Jun. 16, 2022

(65)            Prior Publication Data
US 2024/0036236 A1      Feb. 1, 2024

Related U.S. Application Data

(60) Provisional application No. 63/124,394, filed on Dec. 11, 2020.

(51) Int. Cl.
*G02B 1/14*        (2015.01)
*G02B 1/115*       (2015.01)
(Continued)

(52) U.S. Cl.
CPC ................ *G02B 1/14* (2015.01); *G02B 1/115* (2013.01); *G02B 5/208* (2013.01); *H04N 23/52* (2023.01)

(58) Field of Classification Search
None
See application file for complete search history.

(56)            References Cited

U.S. PATENT DOCUMENTS

2011/0176396 A1    7/2011  Suzuki
2015/0323705 A1*  11/2015  Hart ........................ G02B 1/18
                                                          359/601

(Continued)

FOREIGN PATENT DOCUMENTS

CN        102129215  A     7/2011
CN        102736153  A    10/2012
                (Continued)

OTHER PUBLICATIONS

International Search Report and Written Opinion of the International Searching Authority; PCT/US2021/062727; dated May 6, 2022; 13 pages; European Patent Office.

(Continued)

*Primary Examiner* — Shan Liu
(74) *Attorney, Agent, or Firm* — William J. Tucker

(57)            ABSTRACT
A cover glass article is described herein that includes: a substrate comprising an outer primary surface with an outer optical film structure disposed thereon and an inner primary surface with an inner optical film structure disposed thereon. The outer film structure comprises a first plurality of alternating high index and low index layers with an outermost
(Continued)

low index layer. The inner film structure comprises a second plurality of alternating high index and low index layers with a low or high index layer disposed on the inner primary surface, and an innermost low or high index layer. Each high index layer of the first and the second plurality comprises a nitride or an oxynitride, and an oxide or a nitride, respectively. Further, the cover glass article exhibits an average photopic transmittance of greater than 95% and a maximum hardness of greater than 10 GPa.

31 Claims, 27 Drawing Sheets

(51) Int. Cl.
  G02B 5/20 (2006.01)
  H04N 23/52 (2023.01)

(56) References Cited

U.S. PATENT DOCUMENTS

| | | | |
|---|---|---|---|
| 2017/0017025 A1 | 1/2017 | Jidai et al. | |
| 2017/0307790 A1* | 10/2017 | Bellman | C03C 17/22 |
| 2020/0096686 A1* | 3/2020 | Cool | G02B 5/281 |

FOREIGN PATENT DOCUMENTS

| | | | | |
|---|---|---|---|---|
| CN | 107311472 A | * | 11/2017 | ......... C03C 17/3452 |
| CN | 111835896 A | | 10/2020 | |
| CN | 112051630 A | | 12/2020 | |
| EP | 2363766 A2 | | 9/2011 | |
| KR | 10-2020-0123903 A | | 11/2020 | |
| WO | 2015/076914 A1 | | 5/2015 | |

OTHER PUBLICATIONS

Chinese Patent Application No. 202180092028.0, Office Action dated May 30, 2025, 5 pages (English Translation only), Chinese Patent Office.

Corning Inc., "Information Related to Coatings on Commercially Available Tablet Devices—Supplying data related to the Apple iPad Air 2 (released Oct. 2014), Apple iPad Pro 2nd Generation (released Jun. 2017), and Apple iPad Air 4th Generation (released Oct. 2020)" 28 pages. This document has not been published in a book, magazine, journal, etc.

* cited by examiner 2-surface Reflectance

COVER GLASS ARTICLES FOR CAMERA LENS AND SENSOR PROTECTION AND APPARATUS WITH THE SAME

CROSS-REFERENCE TO RELATED APPLICATION

This application claims the benefit of priority under 35 U.S.C. § 371 of International Application No. PCT/US2021/062727, filed on Dec. 10, 2021, which claims the benefit of priority to U.S. Provisional Patent Application Ser. No. 63/124,394, filed on Dec. 11, 2020, the entire contents of which are hereby incorporated by reference in this disclosure for all purposes.

FIELD

This disclosure relates to cover glass articles for camera lens and sensor protection, particularly cover glass articles having a substrate with outer and inner optical film structures disposed thereon that exhibits high hardness, photopic transmittance and infrared transmittance.

BACKGROUND

Cover glass articles are often used to protect critical devices and components within electronic products and systems, such as mobile devices, smart phones, computer tablets, hand-held devices, vehicular displays and other electronic devices with displays, cameras, light sources and/or sensors. These cover glass articles can also be employed in architectural articles, transportation articles (e.g., articles used in automotive applications, trains, aircraft, sea craft, etc.), appliance articles, or any article that requires some transparency, scratch resistance, abrasion resistance, or a combination thereof. These articles may, for example, include cameras and infrared sensors that are placed in an automobile for driver-assist, autonomous driving, or security applications. Stationary security cameras may also require a protective housing including a strengthened cover glass that is resistant to breakage, scratches, or other types of damage.

These applications for cover glass articles often demand a combination of mechanical and environmental durability, breakage resistance, damage resistance, scratch resistance and strong optical performance characteristics. For example, the cover glass articles may be required to exhibit high light transmittance and low reflectance in the visible spectrum, infrared spectrum and other wavelength ranges depending on the components covered or otherwise protected by these articles. In some applications, the cover glass articles are required to cover cameras, sensors and/or light sources that operate in one spectrum, e.g., the visible spectrum. In many emerging applications, however, single cover glass articles are required to cover multiple cameras, sensors and light sources that operate in various spectra. Further, in other emerging applications, multiple cover glass articles are required to independently cover multiple cameras, sensors and light sources that operate in various spectra.

Accordingly, there is a need for improved cover glass articles for camera lens and sensor protection, particularly cover glass articles that exhibit a combination of high hardness and optical transmittance, including but not limited to photopic transmittance and infrared transmittance. This need and other needs are addressed by the present disclosure.

SUMMARY

According to an aspect of the disclosure, a cover glass article is provided that includes: a substrate comprising an outer primary surface and an inner primary surface, wherein the outer primary surface and the inner primary surface are opposite of one another; the outer primary surface of the substrate has an outer optical film structure disposed thereon; and the inner primary surface of the substrate has an inner optical film structure disposed thereon. The outer optical film structure comprises a first plurality of alternating high index and low index layers, the first plurality comprising an outermost low index layer. Further, the inner optical film structure comprises a second plurality of alternating high index and low index layers, the second plurality comprising a low or high index layer disposed on the inner primary surface of the substrate, and an innermost low or high index layer. Each high index layer of the first plurality comprises a nitride or an oxynitride, and each high index layer of the second plurality comprises an oxide or a nitride. In addition, the cover glass article exhibits an average photopic transmittance of greater than 95%, as measured through the primary surfaces of the substrate at an incident angle from 0 to 40 degrees, and the cover glass article exhibits a maximum hardness of greater than 10 GPa, as measured by a Berkovich Hardness Test over an indentation depth range from about 100 nm to about 500 nm in the outer optical film structure.

According to another aspect of the disclosure, a cover glass article is provided that includes: a substrate comprising an outer primary surface and an inner primary surface, wherein the outer primary surface and the inner primary surface are opposite of one another; the outer primary surface of the substrate has an outer optical film structure disposed thereon; and the inner primary surface of the substrate has an inner optical film structure disposed thereon. The outer optical film structure comprises a first plurality of alternating high index and low index layers, the first plurality comprising an outermost low index layer. Further, the inner optical film structure comprises a second plurality of alternating high index and low index layers, the second plurality comprising a low or high index layer disposed on the inner primary surface of the substrate, and an innermost low or high index layer. Each high index layer of the first plurality comprises $SiN_x$, $SiO_xN_y$, $AlN_x$, $SiAl_xN_y$, or $SiAl_xO_yN_z$ and a physical thickness from about 5 nm to 200 nm, each high index layer of the second plurality comprises $SiN_x$, $SiO_xN_y$, $AlN_x$, $SiAl_xN_y$, $SiAl_xO_yN_z$, $Nb_2O_5$, $Ta_2O_5$, $TiO_2$, $HfO_2$, or $Al_2O_3$ and a physical thickness from 5 nm to 500 nm. In addition, the cover glass article exhibits an average photopic transmittance of greater than 95%, as measured through the primary surfaces of the substrate at an incident angle from 0 to 40 degrees, and the cover glass article exhibits a maximum hardness of greater than 10 GPa, as measured by a Berkovich Hardness Test over an indentation depth range from about 100 nm to about 500 nm in the outer optical film structure.

According to a further aspect of the disclosure, an apparatus is provided that includes: a housing; at least one of a camera, a sensor, and a light source, each configured within the housing; a substrate within the housing, wherein the substrate comprises an outer primary surface and an inner primary surface, the outer primary surface and the inner primary surface are opposite of one another, and the substrate is disposed over the at least one of a camera, a sensor, and a light source; the outer primary surface of the substrate has an outer optical film structure disposed thereon; and the inner primary surface of the substrate has an inner optical film structure disposed thereon. The outer optical film structure comprises a first plurality of alternating high index and low index layers, the first plurality comprising an outermost low index layer. Further, the inner optical film structure comprises a second plurality of alternating high index and low index layers, the second plurality comprising a low or high index layer disposed on the inner primary surface of the substrate, and an innermost low or high index layer disposed over, and with an air gap therebetween, the at least one of a camera, a sensor, and a light source. Each high index layer of the first plurality comprises a nitride or an oxynitride, and each high index layer of the second plurality comprises an oxide or a nitride. In addition, the substrate and the outer and inner optical film structures exhibit an average photopic transmittance of greater than 95%, as measured through the primary surfaces of the substrate at an incident angle from 0 to 40 degrees. Further, the substrate and the outer and inner optical film structures exhibit a maximum hardness of greater than 10 GPa, as measured by a Berkovich Hardness Test over an indentation depth range from about 100 nm to about 500 nm in the outer optical film structure.

Additional features and advantages will be set forth in the detailed description which follows, and in part will be readily apparent to those skilled in the art from that description or recognized by practicing the embodiments as described herein, including the detailed description which follows, the claims, as well as the appended drawings.

BRIEF DESCRIPTION OF THE DRAWINGS

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description serve to explain principles and operation of the various embodiments, wherein:

DETAILED DESCRIPTION

Figure 1A:
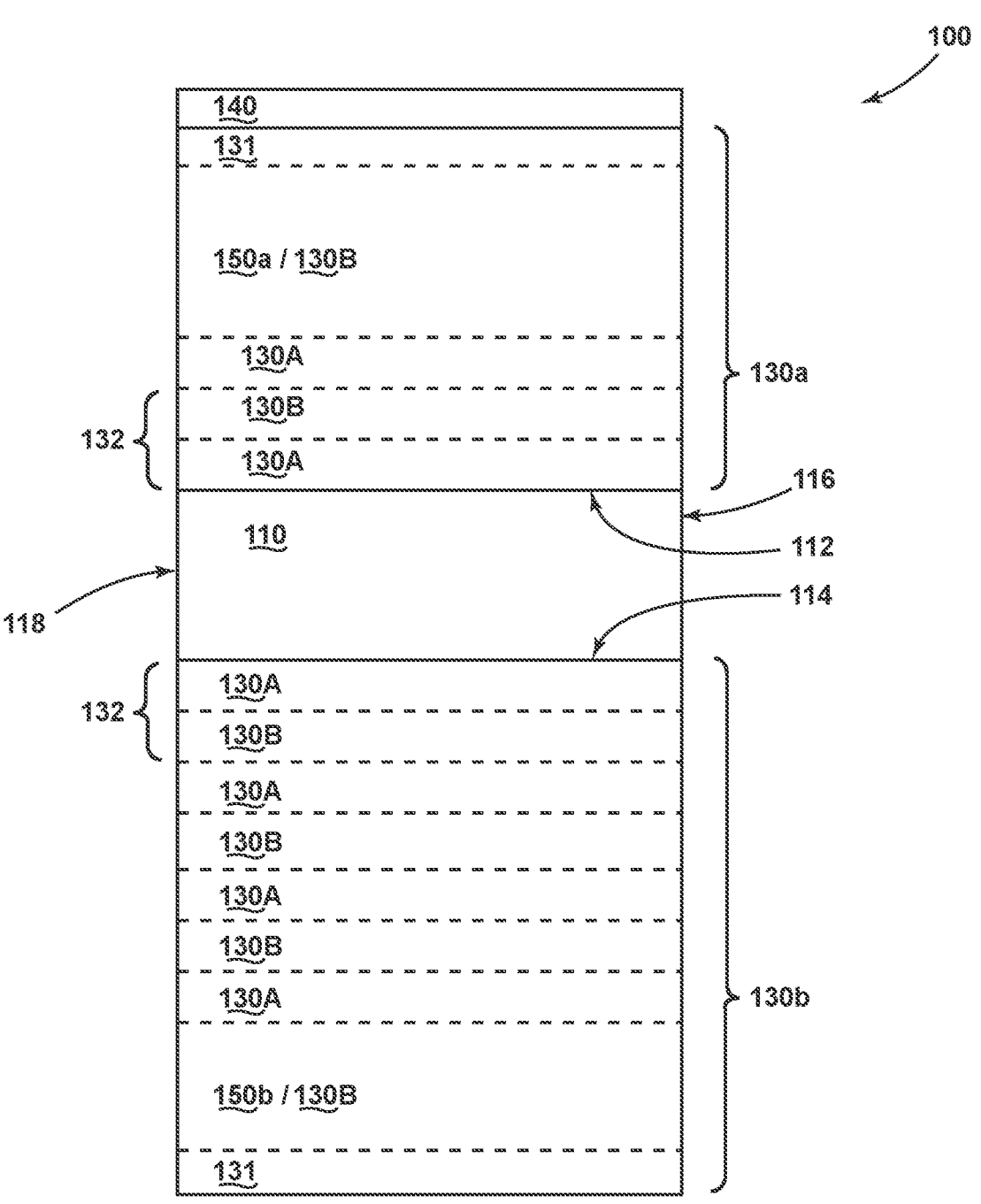
FIG. 1A is a cross-sectional side view of a cover glass article (e.g., for a camera, sensor, etc.), according to an embodiment of the disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example "up," "down," "right," "left," "front," "back," "top," "bottom"—are made only with reference to the figures as drawn and are not intended to imply absolute orientation.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used herein, the singular forms "a," "an" and "the" include plural referents unless the context clearly dictates otherwise. Thus, for example, reference to a "component" includes aspects having two or more such components, unless the context clearly indicates otherwise.

As used herein, the term "dispose" includes coating, depositing, and/or forming a material onto a surface using any known or to be developed method in the art. The disposed material may constitute a layer, as defined herein. As used herein, the phrase "disposed on" includes forming a material onto a surface such that the material is in direct contact with the surface and embodiments where the material is formed on a surface with one or more intervening material(s) disposed between material and the surface. The intervening material(s) may constitute a layer, as defined herein.

As used herein, the terms "low RI layer" and "high RI layer" refer to the relative values of the refractive index ("RI") of layers of an optical film structure of a cover glass article according to the disclosure (i.e., low RI layer<high RI layer). Hence, low RI layers have refractive index values that are less than the refractive index values of high RI layers. Further, as used herein, "low RI layer" and "low index layer" are interchangeable with the same meaning. Likewise, "high RI layer" and "high index layer" are interchangeable with the same meaning.

As used herein, the term "strengthened substrate" refers to a substrate employed in a cover glass article of the disclosure that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

As used herein, the "Berkovich Indenter Hardness Test" and "Berkovich Hardness Test" are used interchangeably to refer to a test for measuring the hardness of a material on a surface thereof by indenting the surface with a diamond Berkovich indenter. The Berkovich Indenter Hardness Test includes indenting the outermost surface (e.g., an exposed surface) of an outer or inner optical film structure of a cover glass article of the disclosure with the diamond Berkovich indenter to form an indent to an indentation depth in the range from about 50 nm to about 1000 nm (or the entire thickness of the outer or inner optical film structure, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res., Vol.* 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res., Vol.* 19, No. 1, 2004, 3-20. As used herein, each of "hardness" and "maximum hardness" interchangeably refers to a maximum hardness as measured along a range of indentation depths, and not an average hardness.

As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. As used herein, an "average transmittance" refers to the average amount of incident optical power transmitted through a material over a defined wavelength regime. As used herein, an "average reflectance" refers to the average amount of incident optical power reflected by the material.

As used herein, "photopic reflectance" mimics the response of the human eye by weighting the reflectance or transmittance, respectively, versus wavelength spectrum according to the human eye's sensitivity. Photopic reflectance may also be defined as the luminance, or tristimulus Y value of reflected light, according to known conventions such as CIE color space conventions. The "average photopic reflectance", as used herein, for a wavelength range from 380 nm to 720 nm is defined in the below equation as the spectral reflectance, $R(\lambda)$ multiplied by the illuminant spectrum, $I(\lambda)$ and the CIE's color matching function $\bar{y}(\lambda)$, related to the eye's spectral response:

$$(R_p) = \int_{380\ nm}^{720\ nm} R(\lambda) \times I(\lambda) \times \bar{y}(\lambda) d\lambda$$

In addition, "average reflectance" can be determined over the visible spectrum, or over other wavelength ranges, according to measurement principles understood by those skilled in the field of the disclosure, e.g., in the infrared spectrum from 840 nm to 950 nm, etc. Unless otherwise noted, all reflectance values reported or otherwise referenced in this disclosure are associated with testing through both primary surfaces of the substrate and optical film structures of the cover glass articles, e.g., a "two-surface" average photopic reflectance.

Camera system usability can be related to the total amount of reflectance in the camera system. Photopic reflectance is particularly important for visible light camera systems. Lower reflectance in a camera system or cover glass over a camera lens can reduce multiple-bounce reflections in the camera system that can generate 'ghost images'. Thus, reflectance has an important relationship to image quality in camera systems.

As used herein, "photopic transmittance" is defined in the below equation as the spectral transmittance, $T(\lambda)$ multiplied by the illuminant spectrum, $I(\lambda)$ and the CIE's color matching function $\bar{y}(\lambda)$, related to the eye's spectral response:

$$(T_p) = \int_{380\ nm}^{720\ nm} T(\lambda) \times I(\lambda) \times \bar{y}(\lambda) d\lambda$$

In addition, "average transmittance" can be determined over the visible spectrum or other wavelength ranges, according to measurement principles understood by those skilled in the field of the disclosure, e.g., in the infrared spectrum from 840 nm to 950 nm, etc. Unless otherwise noted, all transmittance values reported or otherwise referenced in this disclosure are associated with testing through both primary surfaces of the substrate and optical film structures of the cover glass articles, e.g., a "two-surface" average photopic transmittance.

As used herein, "transmitted color" and "reflected color" refer to the color transmitted or reflected through the cover glass articles of the disclosure with regard to color in the CIE L*,a*,b* colorimetry system under a D65 illuminant. More specifically, the "transmitted color" and "reflected color" are given by $\sqrt{(a^{*2}+b^{*2})}$, as these color coordinates are measured through transmission or reflectance of a D65 illuminant through the primary surfaces of the substrate of the cover glass article over an incident angle range, e.g., from 0 degrees to 10 degrees.

Generally, the disclosure is directed to cover glass articles that employ outer and inner optical film structures for substrates, including strengthened glass substrates (e.g., Corning® Gorilla Glass® products). These cover glass articles have high hardness and scratch resistance, and low optical reflectance. The optical film structures of the disclosure are indicative of new multilayer film structures, and the cover glass articles of the disclosure reflect new system-level designs configured for camera lens, sensor and/or light source protective glass. Scratches and reflections are both detrimental to camera, sensor and light source performance, leading to signal loss, image distortion, and related artifacts. However, as the number of cameras, sensors and light sources increase in electronic devices and the need for imaging and sensing continues to grow, the need for protective cover glass articles with optimized scratch and damage resistance, along with optical transmission across a wide spectrum, likewise continues to grow. The cover glass articles of the disclosure address these developing needs with new optical film structures and system-level designs.

The cover glass articles of the disclosure can be employed for camera lens, sensor and light source protection, along with protection of other components (e.g., buttons, speakers, microphones, etc.). These cover glass articles employ outer and inner optical film structures that exhibit a combination of high hardness and desirable optical properties, including high photopic transmittance and infrared transmittance. The cover glass articles can include a scratch-resistant layer within one or both of the outer and inner optical film structures. Further, the optical film structures of these articles can include a plurality of alternating high and low index layers, with each high index layer comprising an oxide or a nitride and each low index layer comprising a nitride or an oxynitride.

With regard to mechanical properties, the cover glass articles can exhibit a maximum hardness of 10 GPa or greater, as measured by a Berkovich Hardness Test over an indentation depth range from 100 nm to about 500 nm in the outer optical film structure. In terms of optical properties, the cover glass articles can exhibit an average photopic transmittance of greater than 95%, or even 97%, as measured through the primary surfaces of the substrate at an incident angle from 0 to 40 degrees. The cover glass articles can also exhibit an infrared transmittance level of greater than 85%, as measured from 840 nm to 860 nm or 930 nm to 950 nm at an incident angle from 0 to 10 degrees. In addition, the cover glass articles exhibit low transmitted color, $\sqrt{(a^{*2}+b^{*2})}$, of less than or equal to 2, at incidence angles from 0 to 10 degrees, 0 to 20 degrees, 0 to 60 degrees, or all incidence angles from 0 to 90 degrees.

These cover glass articles can be employed with a camera and/or sensor assembly as a camera/sensor system. For example, the system can include: 1) a sensor, which may be an imaging sensor, an infrared (IR) sensor, or any type of light sensor; 2) a lens, multiple lenses, or a lens-like system, to focus, collimate, or shape incoming light; 3) a light source; and 4) one or more of the two-sided cover glass articles of the disclosure. In some aspects of these systems, a single cover glass article with outer and inner optical film structures is employed as a protective cover for multiple sensors, lenses and/or light sources. These multiple sensors can also include one or more cameras combined with one or more infrared sensors, such as IR time-of-flight or light detection and ranging (LIDAR) sensors. In other related aspects, multiple cover glass articles with outer and inner optical film structures are employed to independently protect multiple sensors, lenses and/or light sources. In further related aspects, cover glass articles with one or more portions defined by outer and inner optical film structures, as configured according to the disclosure, can be employed to protect one or more sensors, lenses and/or light sources.

Furthermore, the cover glass articles of the disclosure can be optimized for improving and protecting performance of a camera or IR system. The outer and inner optical film structure on each primary surface of the substrate reduces reflectance, which reduces the presence of ghost images, image flare, image bloom, and other artifacts in the camera/sensor system. The high hardness of the outermost surface of the outer optical film structure provides high resistance to scratches and other forms of mechanical damage, which tend to degrade the performance of the camera or sensor system over time, for example, creating image artifacts, haze, or reduced IR sensor efficacy. These camera/sensor systems are becoming widespread in applications such as front and rear assemblies of smartphones and vehicle camera and sensor systems.

Figure 1B:
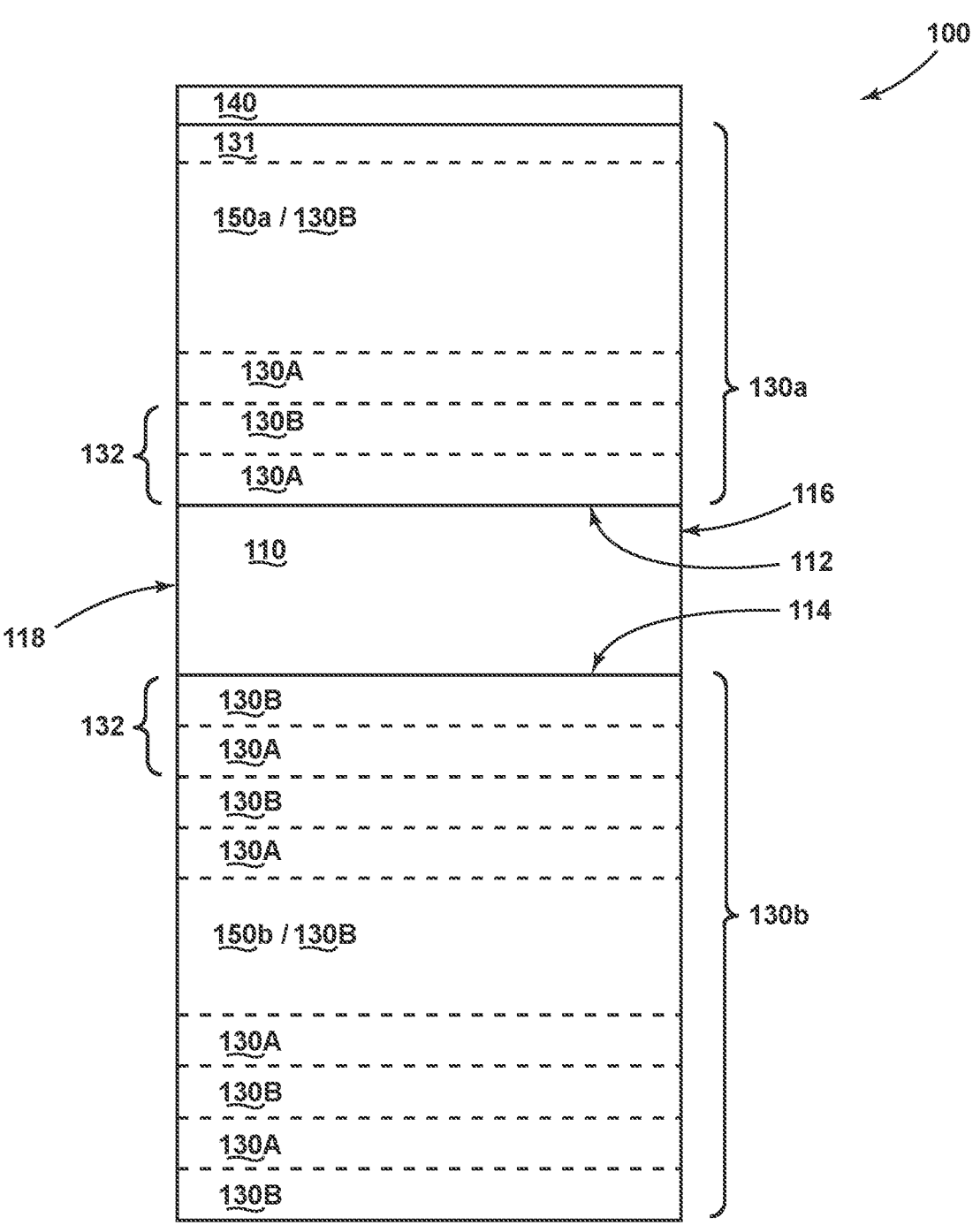
FIG. 1B is a cross-sectional side view of a cover glass article, according to an embodiment of the disclosure.

Referring to FIGS. 1A and 1B, a cover glass article 100 according to one or more embodiments may include a substrate 110, and an outer optical film structure 130a and an inner optical film structure 130b disposed on the substrate 110. The substrate 110 includes opposing primary surfaces 112, 114 and opposing secondary surfaces 116, 118. The outer optical film structure 130a is shown in FIGS. 1A and 1B as disposed on a first opposing primary surface 112 and the inner optical film structure 130b is disposed on the second opposing primary surface 114. Further, one or more of the outer and inner optical films structures 130a and 130b can additionally be disposed on one or both of the opposing secondary surfaces 116, 118, according to some embodiments.

Each of the outer and inner optical film structures 130a and 130b include at least one layer of material. As used herein, the term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments, a layer may include one or more contiguous and uninterrupted layers and/or one or more discontinuous and interrupted layers (i.e., a layer having different materials formed adjacent to one another). A layer or sub-layer may be formed by any known method in the art, including discrete deposition or continuous deposition processes. In one or more embodiments, the layer may be formed using only continuous deposition processes, or, alternatively, only discrete deposition processes.

In one or more embodiments, a single layer or multiple layers of each of the outer and inner optical film structures 130a and 130b may be deposited onto the substrate 110 by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying, dipping, spin coating, or slot coating (e.g., using sol-gel materials). Gen-erally, vapor deposition techniques may include a variety of vacuum deposition methods which can be used to produce thin films. For example, physical vapor deposition uses a physical process (such as heating or sputtering) to produce a vapor of material, which is then deposited on the object which is coated. Preferred methods of fabricating the outer and inner optical film structures 130a and 130b include reactive sputtering, metal-mode reactive sputtering and PECVD processes.

Each of the outer and inner optical film structures 130a and 130b may have a thickness of from about 100 nm to about 10 microns. For example, the optical film structures 130a and 130b may have a thickness greater than or equal to about 200 nm, 300 nm, 325 nm, 350 nm, 375 nm, 400 nm, 500 nm, 600 nm, 700 nm, 800 nm, 900 nm, 1 micron, 2 microns, 3 microns, 4 microns, 5 microns, 6 microns, 7 microns, or even 8 microns, and less than or equal to about 10 microns. The outer and inner optical film structures 130a and 130b may have the same thicknesses or different thicknesses.

In one or more embodiments, the outer and inner optical film structures 130a and 130b may include, or consist of, first and second scratch-resistant layers 150a and 150b, respectively, as shown in FIGS. 1A and 1B. For example, the cover glass article 100 is depicted in FIGS. 1A and 1B which includes a scratch-resistant layer 150a disposed over a primary surface 112 and a scratch-resistant layer 150b disposed over a primary surface 114. According to one embodiment, the scratch-resistant layers 150a and 150b may comprise one or more materials chosen from $Si_uAl_vO_xN_y$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_x$, $SiN_x:H_y$, $HfO_2$, $TiO_2$, $ZrO_2$, $Y_2O_3$, $Al_2O_3$, $MoO_3$, diamond-like carbon, or combinations thereof. Exemplary materials used in the scratch-resistant layers 150a, 150b may include an inorganic carbide, nitride, oxide, diamond-like material, or combination thereof. Examples of suitable materials for the scratch-resistant layers 150a, 150b include metal oxides, metal nitrides, metal oxynitride, metal carbides, metal oxycarbides, and/or combinations thereof. Exemplary metals include B, Al, Si, Ti, V, Cr, Y, Zr, Nb, Mo, Sn, Hf, Ta and W. Specific examples of materials that may be utilized in the scratch-resistant layers 150a, 150b may include $Al_2O_3$, AlN, $AlO_xN_y$, $Si_3N_4$, $SiO_xN_y$, $Si_uAl_vO_xN_y$, diamond, diamond-like carbon, $Si_xC_y$, $Si_xO_yC_z$, $ZrO_2$, $TiO_xN_y$, and combinations thereof. In some implementations, the scratch-resistant layers 150a, 150b may include $Ta_2O_5$, $Nb_2O_5$, $SiN_x$, $Al_2O_3$, $SiO_xN_y$, $AlN_x$, $SiAl_xN_y$, and combinations thereof. In further implementations, one or more of the scratch-resistant layers 150a, 150b may be a super-lattice of nano-layered $AlN_x/SiAl_xN_y$, as detailed in U.S. Patent Application Publication No. 2018/0029929, published on Feb. 1, 2018, entitled "Optical Structures and Articles with Multilayer Stacks Having High Hardness and Methods for Making the Same", the salient portions of which are hereby incorporated by reference in this disclosure. In embodiments, each of the scratch-resistant layers 150a, 150b exhibits a fracture toughness value greater than about 1 MPa m and simultaneously exhibits a hardness value greater than about 10 GPa, as measured by a Berkovich Hardness Test.

In one or more embodiments, the each of the scratch-resistant layers 150a, 150b may comprise a compositional gradient. For example, the scratch-resistant layers 150a, 150b may include a compositional gradient of $Si_uAl_vO_xN_y$ where the concentration of any one or more of Si, Al, O and N are varied to increase or decrease the refractive index. The refractive index gradient may also be formed using porosity.

Such gradients are more fully described in U.S. Patent Application Publication No. 2014/0334006A1, published on Nov. 13, 2014, entitled "Scratch-Resistant Articles with a Gradient Layer", which is hereby incorporated by reference in its entirety.

Each of the scratch-resistant layers 150a, 150b, as shown in exemplary form in the cover article 100 depicted in FIGS. 1A and 1B, may be relatively thick as compared with other layers (e.g., low RI layers 130A, high RI layers 130B, capping layer 131, etc.) such as greater than or equal to about 50 nm, 75 nm, 100 nm, 150 nm, 200 nm, 250 nm, 300 nm, 325 nm, 350 nm, 375 nm, 400 nm, 425 nm, 450 nm, 475 nm, 500 nm, 525 nm, 550 nm, 575 nm, 600 nm, 700 nm, 800 nm, 900 nm, 1 micron, 2 microns, 3 microns, 4 microns, 5 microns, 6 microns, 7 microns, or even 8 microns. For example, a scratch-resistant layer 150a, 150b may have a thickness from about 50 nm to about 10 microns, from about 100 nm to about 10 microns, from about 150 nm to about 10 microns, and all thickness levels and ranges between the foregoing ranges.

As shown in FIGS. 1A and 1, and outlined above, the cover glass articles 100 of the disclosure include an outer and inner optical film structure 130a and 130b, respectively. Each of the optical film structures 130a, 130b includes a plurality of alternating low and high refractive index (RI) layers, 130A and 130B, respectively. According to embodiments, each of the optical film structures 130a and 130b includes a period 132 of two or more layers, such as the low RI layer 130A and high RI layer 130B. Further, each of the optical film structures 130a and 130b may include a plurality of periods 132, such as 3 to 30 periods, 3 to 25 periods, 3 to 20 periods, and all periods within the foregoing ranges. In addition, the number of periods 132 and/or the number of layers of the optical film structures 130a and 130b can differ. Further, in some preferred implementations, the number of periods 132 of the optical film structures 130a and 130b can be configured such that each of the structures 130a and 130b includes at least five (5) layers, e.g., alternating low and high RI layers 130A and 130B totaling at least five layers (e.g., two periods 132 and an additional capping 131 layer, low RI layer 130A or high RI layer 130B). In other embodiments, the period 132 can be a single period with three layers such as a low RI layer 130A, a medium RI layer (not shown in FIGS. 1A and 1), and a high RI layer 130B, with the medium RI layer having a refractive index between the low RI layer 130A and the high RI layer 130B.

In some embodiments of the cover glass articles 100 depicted in FIGS. 1A and 1B, the outer optical film structure 130a includes a first plurality of alternating high index and low index layers, 130B and 130A, respectively, with the outermost low index layer 130A exposed (e.g., to the air). In some embodiments, the outermost low index layer is a capping layer 131, which serves as the outermost layer of the outer optical film structure 130a with the same composition and refractive index range of a low RI layer 130A. According to some embodiments, the outermost layer 130A/131 of the outer optical film structure 130a may not be exposed but instead have a top coating 140 disposed thereon (see FIGS. 1A and 1). In some implementations, each high RI layer 130B of the outer optical film structure 130a comprises a nitride (e.g., $SiN_x$) or an oxynitride (e.g., $SiO_xN_y$). In another implementation (as shown in exemplary form in FIGS. 1A and 1B), the first plurality of alternating high index and low index layers, 130B and 130A, respectively, further includes a low index layer 130A in contact with the outer primary surface 112 of the substrate 110. In addition, embodiments of the cover glass article 100 can be configured such that the first plurality of alternating high and low index layers further includes a first scratch-resistant layer 150a with the same composition as a high RI layer 130B and a physical thickness of at least 50 nm.

According to some embodiments of the cover glass articles 100 depicted in FIGS. 1A and 1B, the inner optical film structure 130b includes a second plurality of alternating high index and low index layers, 130B and 130A, respectively. Further, the second plurality includes a low index layer 130A or a high index layer 130B disposed on the inner primary surface 114 of the substrate 110 and an innermost (i.e., toward the bottom of the article 100 depicted in FIGS. 1A and 1B) low index layer 130A or high index layer 130B. In some instances, the innermost low index layer 130A or high index layer 130B is exposed. According to some embodiments, the innermost layer 130A/130B of the second plurality of the inner optical film structure 130b can serve as an innermost capping layer 131, which serves as the innermost layer of the inner optical film structure 130b with the same composition and refractive index range of a low RI layer 130A or a high RI layer 130B (see FIGS. 1A and 1). In some implementations, each high RI layer 130B of the inner optical film structure 130b comprises an oxide (e.g., $Nb_2O_5$) or a nitride (e.g., $SiN_x$). In another implementation, the second plurality of alternating high index and low index layers, 130B and 130A, respectively, further includes a low index layer 130A (as shown in exemplary form in FIG. 1A) or a high index layer 130B (as shown in exemplary form in FIG. 1B) in contact with the inner primary surface 114 of the substrate 110. In addition, embodiments of the cover glass article 100 can be configured such that the second plurality of alternating high and low index layers 130B and 130A further includes a second scratch-resistant layer 150b with the same composition as a high RI layer 130B and a physical thickness of at least 50 nm.

In one or more embodiments of the cover glass article 100 depicted in FIGS. 1A and 1B, the term "low RI", when used with the low RI layers 130A and/or capping layer 131, includes a range from about 1.3 to about 1.7 or 1.75. In one or more embodiments, the term "high RI", when used with the high RI layers 130B and/or scratch-resistant layers 150a, 150b, includes a range from about 1.7 to about 2.5 (e.g., about 1.85 or greater). In one or more embodiments, the term "medium RI", when used with a third layer of a period 132, includes a range from about 1.55 to about 1.8. In some embodiments, the ranges for low RI, high RI, and/or medium RI may overlap; however, in most instances, the layers of each of the outer and inner optical film structures 130a and 130b have the general relationship regarding RI of: low RI<medium RI<high RI (where "medium RI" is applicable in the case of a three layer period). In one or more embodiments, the difference in the refractive index of each of the low RI layers 130A (and/or capping layer 131) and the high RI layers 130B (and/or scratch-resistant layers 150a, 150b) may be about 0.01 or greater, about 0.05 or greater, about 0.1 or greater, or even about 0.2 or greater.

As an example, in FIGS. 1A and 1B the period 132 of the outer or inner optical film structures 130a, 130b may include a low RI layer 130A and a high RI layer 130B. When a plurality of periods is included in either or both of the outer and inner optical film structures 130a and 130b, the low RI layers 130A (designated as "L") and the high RI layers 130B (designated as "H") can alternate in the following sequence of layers: L/H/L/H . . . or H/L/H/L . . . , such that the low RI layers 130A and the high RI layers 130B alternate along the physical thickness of the optical film structures 130a, 130b. In the embodiment depicted in FIG. 1A, the outer optical film structure 130a includes two periods 132 with a capping layer 131, where each period 132 includes a low RI layer 130A and a high RI layer 130B. Also in the embodiment depicted in FIG. 1A, the inner optical film structure 130b includes four periods 132 with a capping layer 131, where each period 132 includes a low RI layer 130A and a high RI layer 130B. In the embodiment depicted in FIG. 1B, the outer optical film structure 130a includes two periods 132 with a capping layer 131, where each period 132 includes a low RI layer 130A and a high RI layer 130B. Also in the embodiment depicted in FIG. 1B, the inner optical film structure 130b includes four periods 132 and an additional high RI layer 130B, where each period 132 includes a high RI layer 130B and a low RI layer 130A. In some embodiments, as noted earlier, each of the optical film structures 130a, 130b may include up to 30 periods 132.

Example materials suitable for use in the outer and inner optical film structures 130a and 130b of the cover glass article 100 depicted in FIGS. 1A and 1B include, without limitation, $SiO_2$, $Al_2O_3$, $SiAl_xO_y$, $GeO_2$, SiO, $AlO_xN_y$, AlN, $AlN_x$, $SiAl_xN_y$, $SiN_x$, $SiO_xN_y$, $SiAl_xO_yN_z$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, $CeF_3$, diamond-like carbon and combinations thereof. Some examples of suitable materials for use in a low RI layer 130A include, without limitation, $SiO_2$, $Al_2O_3$, $SiAl_xO_y$, $GeO_2$, SiO, $AlO_xN_y$, $SiO_xN_y$, $SiAl_xO_yN_z$, MgO, $MgAl_xO_y$, $MgF_2$, $BaF_2$, $CaF_2$, $DyF_3$, $YbF_3$, $YF_3$, and $CeF_3$. In some implementations of the cover glass article 100, each of its low RI layers 130A includes $SiO_2$ or $MgF_2$. The nitrogen content of the materials for use in a low RI layer 130A may be minimized (e.g., in materials such as $Al_2O_3$ and $MgAl_xO_y$). Some examples of suitable materials for use in a high RI layer 130B include, without limitation, $SiAl_xO_yN_z$, $Ta_2O_5$, $Nb_2O_5$, AlN, $AlN_x$, $SiAl_xN_y$, $AlN_x/SiAl_xN_y$, $Si_3N_4$, $AlO_xN_y$, $SiO_xN_y$, $SiN_x$, $SiN_x$:$H_y$, $HfO_2$, $TiO_2$, $ZrO_2$, $Y_2O_3$, $Al_2O_3$, $MoO_3$, and diamond-like carbon. According to some implementations, each high RI layer 130B of the outer film structure 130a of the cover article 100 includes $SiN_x$, $SiO_xN_y$, $AlN_x$, $SiAl_xN_y$, or $SiAl_xO_yN_z$. In further implementations, one or more of the high RI layers 130B may be a super-lattice of nano-layered $AlN_x/SiAl_xN_y$. Further, some embodiments of the cover article 100 are configured such that the inner optical film structure 130b includes $SiN_x$, $Nb_2O_5$, $Ta_2O_5$ or $Al_2O_3$. In one or more embodiments, the high RI layer 130B may have high hardness (e.g., hardness of greater than 8 GPa), and the high RI materials listed above may comprise high hardness and/or scratch resistance.

The oxygen content of the materials for the high RI layer 130B may be minimized, especially in $SiN_x$ or $AlN_x$ materials. $AlO_xN_y$ materials may be considered to be oxygen-doped $AlN_x$ (i.e., they may have an $AlN_x$ crystal structure (e.g., wurtzite) and need not have an AlON crystal structure). Exemplary $AlO_xN_y$ or $SiO_xN_y$ high RI materials may comprise from about 0 atom % to about 20 atom % oxygen, or from about 5 atom % to about 15 atom % oxygen, while including 30 atom % to about 50 atom % nitrogen. Exemplary $SiAl_xO_yN_z$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. The foregoing materials may be hydrogenated up to about 30% by weight. Where a material having a medium refractive index is desired as a medium RI layer, some embodiments may utilize AlN and/or $SiO_xN_y$. It should be understood that a first or second scratch-resistant layer 150a, 150b may comprise any of the materials disclosed as suitable for use in a high RI layer 130B.

In embodiments of the cover glass articles 100 depicted in FIGS. 1A and 1, outer and inner optical film structures 130a, 130b that primarily comprise combinations of $SiO_2$, $Si_3N_4$, and/or $SiO_xN_y$ have been found to be advantageous for some applications due to their combination of high hardness, optical transparency, and chemical and environmental durability. For example, multilayer coating samples made from these materials (e.g., as exemplary of these optical film structures 130a, 130b) were subjected to aggressive chemical durability testing consisting of pre-abrasion with 400 grit $Al_2O_3$ sandpaper for 50 abrasion cycles with a 1 kg load applied over a 1 $cm^2$ contact area, followed by soaking in a 5% NaCl aqueous solution at 35° C. for 7 days. No corrosion, dissolution, delamination, or other visible change from before to after NaCl solution soaking was observed after chemical treatment, using optical microscope inspection of these materials and multilayer films made from these materials.

In one or more embodiments of the cover article 100, such as depicted in FIGS. 1A and 1B, the outer and/or inner optical film structure 130a, 130b may include a scratch-resistant layer 150a, 150b that is integrated as a high RI layer 130B, and one or more low RI layers 130A, high RI layers 130B, and/or a capping layer 131 may be positioned over the scratch-resistant layer 150a, 150b. Also, with regard to the first scratch-resistant layer 150a, as shown in FIGS. 1A and 1, an optional top coating 140 may also be positioned over the layer 150a. The scratch-resistant layer 150a, 150b may be alternately defined as the thickest high RI layer 130B in the overall outer and/or inner optical film structure 130a, 130b or in the overall cover glass article 100. Without being bound by theory, it is believed that the cover glass article 100 may exhibit increased hardness at indentation depths when a relatively thin amount of material is deposited over the scratch-resistant layer 150a, 150b. However, the inclusion of low RI and high RI layers 130A, 130B over the scratch-resistant layer 150a, 150b may enhance the optical properties of the cover glass article 100. In some embodiments, relatively few layers (e.g., only 1, 2, 3, 4, or 5 layers) may be positioned over the scratch-resistant layer 150a, 150b and these layers may each be relatively thin (e.g., less than 100 nm, less than 75 nm, less than 50 nm, or even less than 25 nm).

In one or more embodiments, the cover article 100 depicted in FIGS. 1A and 1B may include one or more additional top coatings 140 disposed on the outer optical film structure 130a. In one or more embodiments, the additional top coating 140 may include an easy-to-clean coating. An example of a suitable an easy-to-clean coating is described in U.S. Application Publication No. 2014/0113083, published on Apr. 24, 2014, entitled "Process for Making of Glass Articles with Optical and Easy-to-Clean Coatings", which is incorporated herein in its entirety by reference. The easy-to-clean coating may have a thickness in the range from about 5 nm to about 50 nm and may include known materials such as fluorinated silanes. The easy-to-clean coating may alternately or additionally comprise a low-friction coating or surface treatment. Exemplary low-friction coating materials may include diamond-like carbon, silanes (e.g., fluorosilanes), phosphonates, alkenes, and alkynes. In some embodiments, the easy-to-clean coating of the top coating 140 may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm, from about 7 nm to about 10 nm, from about 1 nm to about 90 nm, from about 5 nm to about 90 nm, from about 10 nm to about 90 nm, or from about 5 nm to about 100 nm, and all ranges and sub-ranges therebetween.

The top coating 140 may include a scratch-resistant layer or layers 150a, 150b which comprise any of the materials disclosed as being suitable for use in the scratch-resistant layer 150a and/or 150b. In some embodiments, the additional top coating 140 includes a combination of easy-to-clean material and scratch-resistant material. In one example, the combination includes an easy-to-clean material and diamond-like carbon. Such an additional top coating 140 may have a thickness in the range from about 5 nm to about 20 nm. The constituents of the additional coating 140 may be provided in separate layers. For example, the diamond-like carbon may be disposed as a first layer and the easy-to clean material can be disposed as a second layer on the first layer of diamond-like carbon. The thicknesses of the first layer and the second layer may be in the ranges provided above for the additional coating. For example, the first layer of diamond-like carbon may have a thickness of about 1 nm to about 20 nm or from about 4 nm to about 15 nm (or more specifically about 10 nm) and the second layer of easy-to-clean material may have a thickness of about 1 nm to about 10 nm (or more specifically about 6 nm). The diamond-like coating may include tetrahedral amorphous carbon (Ta—C), Ta—C:H, and/or a-C—H.

According to embodiments of the cover article 100 depicted in FIGS. 1A and 1B, each of the high RI layers 130B of the outer optical film structure 130a can have a physical thickness that ranges from about 5 nm to 2000 nm, about 5 nm to 1500 nm, about 5 nm to 1000 nm, and all thicknesses and ranges of thickness between these values. For example, these high RI layers 130B can have a physical thickness of 5 nm, 10 nm, 20 nm, 30 nm, 40 nm, 50 nm, 60 nm, 70 nm, 80 nm, 90 nm, 100 nm, 250 nm, 500 nm, 750 nm, 1000 nm, 1250 nm, 1500 nm, 1750 nm, 2000 nm and all thickness values between these levels. Further, each of the high RI layers 130B of the inner optical film structure 130b can have a physical thickness that ranges from about 5 nm to 500 nm, about 5 nm to 400 nm, about 5 nm to 300 nm, and all thicknesses and ranges of thickness between these values. As an example, each of these high RI layers 130B can have a physical thickness of 5 nm, 10 nm, 20 nm, 30 nm, 40 nm, 50 nm, 60 nm, 70 nm, 80 nm, 90 nm, 100 nm, 200 nm, 300 nm, 400 nm, 500 nm, and all thickness values between these levels. In addition, according to some embodiments of the cover article 100 depicted in FIGS. 1A and 1B, each of the low RI layers 130A of the outer and inner optical film structures 130a, 130b can have a physical thickness from about 5 nm to 300 nm, about 5 nm to 250 nm, about 5 nm to 200 nm, and all thicknesses and ranges of thickness between these values. For example, each of these low RI layers 130A can have a physical thickness of 5 nm, 10 nm, 20 nm, 30 nm, 40 nm, 50 nm, 60 nm, 70 nm, 80 nm, 90 nm, 100 nm, 150 nm, 200 nm, 250 nm, 300 nm, and all thickness values between these levels.

In one or more embodiments, at least one of the layers (such as a low RI layer 130A or a high RI layer 130B) of the outer and inner optical film structures 130a, 130b may include a specific optical thickness (or optical thickness range). As used herein, the term "optical thickness" refers to the product of the physical thickness and the refractive index of a layer. In one or more embodiments, at least one of the layers of the outer and inner optical film structures 130a, 130b may have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, all of the layers in the outer and inner optical film structures 130a, 130b may each have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, at least one layer of either or both of the outer and inner optical film structures 130a, 130b has an optical thickness of about 50 nm or greater. In some embodiments, each of the low RI layers 130A have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, each of the high RI layers 130B have an optical thickness in the range from about 2 nm to about 200 nm, from about 10 nm to about 100 nm, from about 15 nm to about 100 nm, from about 15 nm to about 500 nm, or from about 15 nm to about 5000 nm. In embodiments with a three layer period 132, each of the medium RI layers have an optical thickness in the range from about 2 nm to about 200 nm, from about 10 nm to about 100 nm, from about 15 nm to about 100 nm, from about 15 nm to about 500 nm, or from about 15 nm to about 5000 nm. In some embodiments, the scratch-resistant layer 150a and/or 150b is the thickest layer in the outer and/or inner optical film structure 130a, 130b, and/or has an index of refraction higher than that of any other layer in the film structure.

The substrate 110 of the cover article 100 depicted in FIGS. 1A and 1B may include an inorganic material and may include an amorphous substrate, a crystalline substrate or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including poly-styrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal substrates. The substrate 110 may be characterized as alkali-including substrates (i.e., the substrate includes one or more alkalis). In one or more embodiments, the substrate 110 exhibits a refractive index in the range from about 1.45 to about 1.55. In specific embodiments, the substrate 110 may exhibit an average strain-to-failure at a surface on one or more opposing major surfaces that is 0.5% or greater, 0.6% or greater, 0.7% or greater, 0.8% or greater, 0.9% or greater, 1% or greater, 1.1% or greater, 1.2% or greater, 1.3% or greater, 1.4% or greater, 1.5% or greater or even 2% or greater, as measured using ball-on-ring testing using at least 5, at least 10, at least 15, or at least 20 samples. In specific embodiments, the substrate 110 may exhibit an average strain-to-failure at its surface on one or more opposing major surfaces of about 1.2%, about 1.4%, about 1.6%, about 1.8%, about 2.2%, about 2.4%, about 2.6%, about 2.8%, or about 3% or greater.

The term "strain-to-failure" refers to the strain at which cracks propagate in the outer or inner optical film structure 130a, 130b, substrate 110, or both simultaneously without application of additional load, typically leading to catastrophic failure in a given material, layer or film and perhaps even bridge to another material, layer, or film, as defined herein. That is, breakage of the optical film structures 130a, 130b without breakage of the substrate 110 constitutes failure, and breakage of the substrate 110 also constitutes failure. The term "average" when used in connection with average strain-to-failure or any other property is based on the mathematical average of measurements of such property on 5 samples. Typically, crack onset strain measurements are repeatable under normal laboratory conditions, and the standard deviation of crack onset strain measured in multiple samples may be as little as 0.01% of observed strain. Average strain-to-failure as used herein was measured using Ring-on-Ring Tensile Testing. However, unless stated otherwise, strain-to-failure measurements described herein refer to measurements from the ring-on-ring testing, as described in International Publication No. WO2018/125676, published on Jul. 5, 2018, entitled "Coated Articles with Optical Coatings Having Residual Compressive Stress," and incorporated herein by reference in its entirety.

Suitable substrates 110 may exhibit an elastic modulus (or Young's modulus) in the range from about 30 GPa to about 120 GPa. In some instances, the elastic modulus of the substrate 110 may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween. In some examples, Young's modulus may be measured by sonic resonance (ASTM E1875), resonant ultrasound spectroscopy, or nanoindentation using Berkovich indenters.

In one or more embodiments, an amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_xO_y$) layer). Glass-ceramic substrates may comprise one or more crystalline phases such as lithium disilicate, petalite, beta quartz, or beta spodumene, potentially combined with residual glass in the structure. These glass-ceramic substrates may preferably be optically transparent and chemically strengthened, such as those described in U.S. Pat. No. 10,611,675, U.S. Patent Application Publication No. 2020/0231491, U.S. Patent Application Publication No. 2020/0223744, and U.S. Patent Application Publication No. 2020/0148591, each of which is hereby incorporated by reference in its entirety.

The substrate 110 of one or more embodiments may have a hardness that is less than the hardness of the article (as measured by the Berkovich Indenter Hardness Test described herein). The hardness of the substrate 110 is measured using the Berkovich Indenter Hardness Test.

The substrate 110 may be substantially optically clear, transparent and free from light scattering. In such embodiments, the substrate 110 may exhibit an average light transmittance over the optical wavelength regime of about 85% or greater, about 86% or greater, about 87% or greater, about 88% or greater, about 89% or greater, about 90% or greater, about 91% or greater or about 92% or greater. In some embodiments, these light reflectance and transmittance values may be a total reflectance or total transmittance (taking into account reflectance or transmittance on both major surfaces of the substrate 110) or may be observed on a single-side of the substrate 110 (i.e., on the primary surface 112 only, without taking into account the opposite surface 114). Unless otherwise specified, the average reflectance or transmittance of the substrate 110 alone is measured at an incident illumination angle of 0 degrees relative to the primary surface 112 (however, such measurements may be provided at incident illumination angles of 45 degrees or 60 degrees). The substrate 110 may optionally exhibit a color, such as white, black, red, blue, green, yellow, orange, etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate 110 is chemically strengthened by an ion exchange process, the ions in the surface layer of the substrate 110 are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate 110 in a salt bath (or baths), use of multiple salt baths, additional steps such as annealing, washing, and the like, are generally determined by the composition of the substrate 110 and the desired compressive stress (CS), depth of compressive stress layer (or depth of layer) of the substrate 110 that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. Pat. No. 8,561, 429, in which glass substrates are strengthened by immersion in multiple, successive, ion exchange treatments in salt baths of different concentrations; and U.S. Pat. No. 8,312, 739, in which glass substrates are strengthened by ion exchange in a first bath diluted with an effluent ion, followed by immersion in a second bath having a smaller concentration of the effluent ion than the first bath. The contents of U.S. Pat. Nos. 8,561,429 and 8,312,739 are incorporated herein by reference in their entirety.

The degree of chemical strengthening achieved by ion exchange may be quantified based on the parameters of central tension (CT), surface CS, depth of compression (DOC), and depth of layer of potassium ions (DOL). Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Refracted near-field (RNF) method or a scattered light polariscope (SCALP) technique may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. The RNF method is described in U.S. Pat. No. 8,854,623, issued Oct. 7, 2014, entitled "Systems and Methods for Measuring a Profile Characteristic of a Glass Sample", which is incorporated herein by reference in its entirety. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. Refracted near-field (RNF) method or SCALP may be used to measure the stress profile. When the RNF method is utilized to measure the stress profile, the maximum CT value provided by SCALP is utilized in the RNF method. In particular, the stress profile measured by RNF is force balanced and calibrated to the maximum CT value provided by a SCALP measurement. In particular, the RNF method includes placing the glass article adjacent to a reference block, generating a polarization-switched light beam that is switched between orthogonal polarizations at a rate of between 1 Hz and 50 Hz, measuring an amount of power in the polarization-switched light beam and generating a polarization-switched reference signal, wherein the measured amounts of power in each of the orthogonal polarizations are within 50% of each other. The method further includes transmitting the polarization-switched light beam through the glass sample and reference block for different depths into the glass sample, then relaying the transmitted polarization-switched light beam to a signal photodetector using a relay optical system, with the signal photodetector generating a polarization-switched detector signal. The method also includes dividing the detector signal by the reference signal to form a normalized detector signal and determining the profile characteristic of the glass sample from the normalized detector signal. The maximum CT values are measured using a scattered light polariscope (SCALP) technique known in the art.

In one embodiment, a strengthened substrate 110 can have a surface CS of 250 MPa or greater, 300 MPa or greater (e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater). The strengthened substrate 110 may have a DOL of 10 μm or greater, 15 μm or greater, 20 μm or greater (e.g., 25 μm, 30 μm, 35 μm, 40 μm, 45 μm, 50 μm or greater) and/or a CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). The DOC may be from 0.05 times the thickness (t) of the substrate 110 to about 0.3·t, for example from about 0.05·t to about 0.25·t, or from about 0.05·t to about 0.24·t, or from about 0.05·t to about 0.23·t, or from about 0.05·t to about 0.22·t, or from about 0.05·t to about 0.21·t, or from about 0.05·t to about 0.20·t, or from about 0.05·t to about 0.19·t, or from about 0.05·t to about 0.18·t. In one or more specific embodiments, the strengthened substrate 110 has one or more of the following: a surface CS greater than 500 MPa, a DOL greater than 15 μm, a DOC of from about 0.05·t to about 0.22·t, and a CT greater than 18 MPa.

Example glasses that may be used in the substrate 110 may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3)\geq66$ mol. %, and $Na_2O\geq9$ mol. %. In an embodiment, the glass composition includes at least 6 wt. % aluminum oxide. In a further embodiment, the substrate 110 includes a glass composition with one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass compositions used in the substrate 110 can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. %≤MgO; and 0-3 mol. % CaO.

A further example glass composition suitable for the substrate 110 comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. %≤$(Li_2O+Na_2O+K_2O)$≤20 mol. % and 0 mol. %≤$(MgO+CaO)$≤10 mol. %.

A still further example glass composition suitable for the substrate 110 comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. %≤$(Li_2O+Na_2O+K_2O)$≤18 mol. % and 2 mol. %≤$(MgO+CaO)$≤7 mol. %.

In a particular embodiment, an alkali aluminosilicate glass composition suitable for the substrate 110 comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $(Al_2O_3+B_2O_3)/\Sigma modifiers$ (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma modifiers$ (i.e., sum of modifiers) is greater than 1.

In still another embodiment, the substrate 110 may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. %≤$SiO_2+B_2O_3+CaO$≤69 mol. %; $Na_2O+K_2O+B_2O_3+MgO+CaO+SrO$>10 mol. %; 5 mol. %≤$MgO+CaO+SrO$≤8 mol. %; $(Na_2O+B_2O_3)—Al_2O_3$≤2 mol. %; 2 mol. %≤$Na_2O—Al_2O_3$≤6 mol. %; and 4 mol. %≤$(Na_2O+K_2O)—Al_2O_3$≤10 mol. %.

In an alternative embodiment, the substrate 110 may comprise an alkali aluminosilicate glass composition comprising: 2 mol. % or more of $Al_2O_3$ and/or $ZrO_2$, or 4 mol. % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina and/or spinel $(MgAl_xO_y)$.

Optionally, the crystalline substrate 110 may include a glass ceramic substrate, which may be strengthened or non-strengthened. Examples of suitable glass ceramics may include $Li_2O—Al_2O_3—SiO_2$ system (i.e., LAS-System) glass ceramics, $MgO—Al_2O_3—SiO_2$ system (i.e., MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in $Li_2SO_4$ molten salt, whereby an exchange of $2Li^+$ for $Mg^{2+}$ can occur.

The substrate 110 according to one or more embodiments can have a physical thickness ranging from about 100 μm to about 5 mm in various portions of the substrate 110. Example substrate 110 physical thicknesses range from about 100 μm to about 500 μm (e.g., 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less, or less than 1 mm. The substrate 110 may be acid polished or otherwise treated to remove or reduce the effect of surface flaws.

With regard to the hardness of the cover glass articles 100 depicted in FIGS. 1A and 1, typically, in nanoindentation measurement methods (such as by using a Berkovich indenter) where the coating is harder than the underlying substrate, the measured hardness may appear to increase initially due to development of the plastic zone at shallow indentation depths (e.g., less than 25 nm or less than 50 nm) and then increases and reaches a maximum value or plateau at deeper indentation depths (e.g., from 50 nm to about 500 nm or 1000 nm). Thereafter, hardness begins to decrease at even deeper indentation depths due to the effect of the underlying substrate. Where a substrate 110 having a greater hardness compared to the coating is utilized, the same effect can be seen; however, the hardness increases at deeper indentation depths due to the effect of the underlying substrate.

With further regard to the cover glass articles 100 depicted in FIGS. 1A and 1B, the indentation depth range and the hardness values at certain indentation depth ranges can be selected to identify a particular hardness response of the outer and inner optical film structures 130a, 130b and the layers of these structures thereof, described herein, without the effect of the underlying substrate 110. When measuring hardness of the optical film structures 130a, 130b (when disposed on a substrate 110) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate 110. The influence of the substrate 110 on hardness occurs at deeper indentation depths (i.e., typically at depths greater than about 10% of the total thickness of the outer or inner optical film structure 130a, 130b). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm) in the outer or inner optical film structure 130a, 130b, the apparent hardness of a material appears to increase dramatically versus indentation depth. This small indentation depth regime does not represent a true metric of hardness but, instead, reflects the development of the aforementioned plastic zone, which is related to the finite radius of curvature of the indenter. At intermediate indentation depths, the apparent hardness approaches maximum levels. At deeper indentation depths, the influence of the substrate 110 becomes more pronounced as the indentation depths increase. Hardness may begin to drop dramatically once the indentation depth exceeds about 30% of the optical coating thickness.

In one or more embodiments, the cover glass article 100, as depicted in FIGS. 1A and 1, may exhibit a maximum hardness of about 10 GPa or greater, about 11 GPa or greater, or about 12 GPa or greater, as measured in the outer optical film structure 130a by a Berkovich Indenter Hardness Test over an indentation depth from about 100 nm to about 500 nm. For example, the cover glass article 100 can exhibit a maximum hardness of 10 GPa, 11 GPa, 12 GPa, 13 GPa, 14 GPa, 15 GPa, 16 GPa, 17 GPa, 18 GPa, 19 GPa, 20 GPa, or greater, as measured in the outer optical film structure 130a. In one or more embodiments, the cover glass article 100 may exhibit a maximum hardness of about 10 GPa or greater, about 11 GPa or greater, or about 12 GPa or greater (e.g., 14 GPa or greater, 16 GPa or greater, 18 GPa or greater, or even 20 GPa or greater) as measured in the inner optical film structure 130b by a Berkovich Indenter Hardness Test over an indentation depth from about 100 nm to about 500 nm. For example, the cover glass article 100 can exhibit a maximum hardness of 10 GPa, 11 GPa, 12 GPa, 13 GPa, 14 GPa, 15 GPa, 16 GPa, 17 GPa, 18 GPa, 19 GPa, 20 GPa, or greater, as measured in the inner optical film structure 130b.

With further regard to the hardness of the cover glass articles 100 depicted in FIGS. 1A and 1B, the hardness of the material of a high RI layer 130B and/or scratch-resistant layer 150a, 150b may be characterized specifically. In some embodiments, the maximum hardness of the high RI layer 130B and/or the scratch-resistant layers 150a, 150b, as measured by the Berkovich Indenter Hardness Test, may be about 10 GPa or greater, about 12 GPa or greater, about 15 GPa or greater, about 18 GPa or greater, or even about 20 GPa or greater. The hardness of a given layer (e.g., high RI layer 130B) may be measured by analyzing a cover glass article 100 where the layer measured is the uppermost layer in the outer optical film structure 130a or the innermost layer in the inner optical film structure 130b. If the layer to be measured for hardness is a buried layer, its hardness may be measured by producing a cover glass article which does not include the overlying layers and subsequently testing the article for hardness. Such measured hardness values may be exhibited by the cover glass article 100, outer and inner optical film structures 130a, 130b, high RI layer 130B, and/or scratch-resistant layers 150a, 150b along an indentation depth of about 50 nm or greater or about 100 nm or greater, and may be sustained above a certain hardness value for a continuous indentation depth range. In embodiments, the continuous indentation depth range can be from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, from about 200 nm to about 600 nm, from about 200 nm to about 800 nm, from about 200 nm to about 1000 nm, from about 300 nm to about 500 nm, from about 300 nm to about 800 nm, or from about 300 nm to about 1000 nm. In one or more embodiments, the cover glass article 100 exhibits a hardness that is greater than the hardness of the substrate 110 (which can be measured on the primary surface 112 or 114 with the respective outer or inner optical film structure 130a, 130b removed).

According to embodiments, the cover glass articles 100 depicted in FIGS. 1A and 1B may exhibit an average photopic transmittance, or average visible transmittance over an optical wavelength regime from 400 to 700 nm, of about 95% or greater, about 96% or greater, about 97% or greater, about 98% or greater, or even about 98.5% or greater at normal incidence, from 0 to 10 degrees, from 0 to 20 degrees, from 0 to 30 degrees, or even from 0 to 40 degrees. The cover glass articles 100 may also exhibit an average photopic or visible transmittance of about 85% or greater, about 88% or greater, about 89% or greater, or even about 90% or greater, over an optical wavelength regime from 400 to 700 nm at normal incidence, or from 0 to 60 degrees. Further, the cover glass articles 100 may exhibit an average photopic or visible transmittance of about 92% or greater, 94% or greater, 95% or greater, about 96% or greater, about 97% or greater, or even about 98% or greater, over an optical wavelength regime from 350 to 750 nm at normal incidence, from 0 to 10 degrees, from 0 to 20 degrees, or from 0 to 30 degrees. In addition, the cover glass articles 100 may exhibit an average photopic or visible transmittance of about 85% or greater, 88% or greater, 89% or greater, or even about 90% or greater, over an optical wavelength regime from 350 to 750 nm at an incidence from 0 to 60 degrees.

According to embodiments, the cover glass articles 100 depicted in FIGS. 1A and 1B may exhibit an average infrared transmittance of about 88% or greater, about 90% or greater, about 92% or greater, about 94% or greater, about 95% or greater, about 96% or greater, about 97% or greater, or even about 98% or greater, over a wavelength regime from 840 nm to 860 nm or from 930 nm to 950 nm at normal incidence, or from 0 to 10 degrees. The cover glass articles 100 may also exhibit an average infrared transmittance of about 88% or greater, about 90% or greater, about 92% or greater, about 94% or greater, about 95% or greater, about 96% or greater, or even about 97% or greater, over a wavelength regime from 840 nm to 860 nm at an incidence from 0 to 30 degrees. The cover glass articles 100 may also exhibit an average infrared transmittance of about 85% or greater, about 88% or greater, about 90% or greater, about 91% or greater, about 92% or greater, or even about 93% or greater, over a wavelength regime from 930 nm to 950 nm at an incidence from 0 to 30 degrees.

According to some implementations, the cover glass articles 100 depicted in FIGS. 1A and 1B may exhibit a transmitted color with a D65 illuminant, as given by $\sqrt{(a*^2 + b*^2)}$, of less than 2, less than 1.5, or even less than 1, as measured at normal incidence, from 0 to 10 degrees, or over all incidence angles from 0 to 90 degrees. For example, the cover glass articles 100 can exhibit a transmitted color of less than 2, 1.9, 1.8, 1.7, 1.6, 1.5, 1.4, 1.3, 1.2, 1.1, 1.0, 0.9, 0.8, 0.7, 0.6, 0.5, or even lower, as measured at normal incidence, from 0 to 10 degrees, or over all incidence angles from 0 to 90 degrees.

According to some implementations, the cover glass articles 100 depicted in FIGS. 1A and 1B may exhibit a reflected color with a D65 illuminant, as given by $(a*^2 + b*^2)$, of less than or equal to 10, less than 8, less than 6, less than 5, or even less than 4, as measured at normal incidence, from 0 to 10 degrees, or over all incidence angles from 0 to 90 degrees. For example, the cover glass articles 100 can exhibit a reflected color of 10, 9, 8, 7, 6, 5, 4, or even lower, as measured at normal incidence, from 0 to 10 degrees, or over all incidence angles from 0 to 90 degrees.

According to embodiments, the cover glass articles 100 depicted in FIGS. 1A and 1B may exhibit an average photopic reflectance, or average reflectance over an optical wavelength regime from 400 to 700 nm, less than 2%, less than 1.8%, less than about 1.5%, less than about 1.0%, less than about 0.9%, or even less than 0.85%, at normal incidence, or from 0 to 10 degrees. For example, the cover glass articles 100 can exhibit an average photopic or visible reflectance of 1.9%, 1.8%, 1.7%, 1.6%, 1.5%, 1.4%, 1.3%, 1.2%, 1.1%, 1.0%, 0.9%, 0.85%, or even lower, at normal incidence, or from 0 to 10 degrees. Similarly, according to some embodiments, the cover glass articles 100 depicted in FIGS. 1A and 1B may exhibit an average reflectance over an infrared wavelength regime from 840 nm to 950 nm, less than 10%, less than 9%, less than 8%, less than 7%, less than 6%, less than 5%, less than 4%, less than 3%, or less than 2%, at normal incidence, or from 0 to 10 degrees. For example, the cover glass articles 100 can exhibit an average infrared reflectance (i.e., from 840 nm to 950 nm) of 10%, 9%, 8%, 7%, 6%, 5%, 4%, 3%, 2%, or even lower, at normal incidence, or from 0 to 10 degrees.

Figure 2:
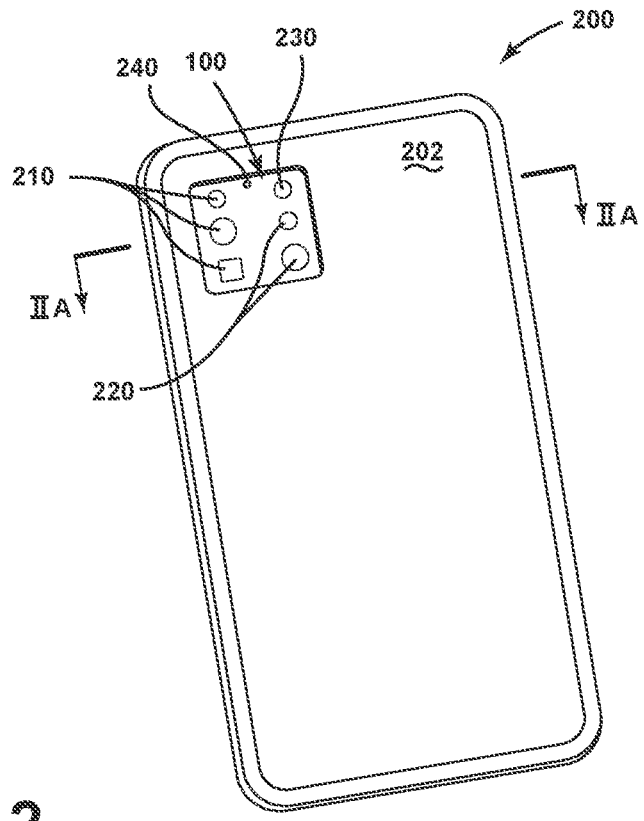
FIG. 2 is a perspective view of an apparatus (e.g., a mobile phone) with a housing, two or more of a camera, a sensor, and a light source, and a cover glass article, according to an embodiment of the disclosure.
Figure 2A:
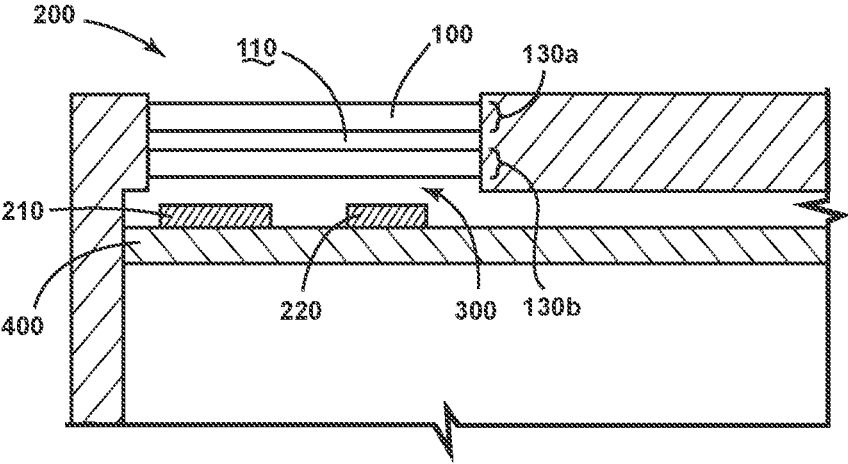
FIG. 2A is a cross-sectional view of the apparatus depicted in FIG. 2 along line IIA-IIA.

Referring now to FIGS. 2 and 2A, an apparatus 200 is provided with a housing 202, two or more of camera 210 (e.g., a visible light camera), sensor 220 (e.g., an infrared sensor), and a light source 230, and a cover glass article 100 (e.g., as shown in FIGS. 1A and 1B, and described above), according to an embodiment of the disclosure. In other embodiments, the apparatus 200 is provided with one or more of a camera 210, sensor 220 and a light source 230. In some implementations, the apparatus 200 includes a microphone 240, as also depicted in FIG. 2. Further, apparatus 200 can be a mobile phone, smart phone, computer tablet, hand-held electronic device, vehicular display or any other electronic device with a display, camera, light source and/or sensor. According to some additional implementations, the apparatus 200 depicted in FIGS. 2 and 2A can be envisioned as an architectural article, transportation article (e.g., an article used in automotive applications, trains, aircraft, sea craft, etc.), an appliance article, or any article that requires some transparency, scratch resistance, abrasion resistance, or a combination thereof and, further, employs a cover glass article 100 of the disclosure.

Referring again to FIGS. 2 and 2A, an apparatus 200 is depicted that includes: a housing 202; at least one camera 210, at least one sensor 220, and a light source 230 configured within the housing 202; and a substrate 110 within the housing 202, wherein the substrate 110 comprises an outer primary surface 112 and an inner primary surface 114 (see FIGS. 1A and 1B), the outer primary and inner primary surfaces 112, 114 opposite of one another, and the substrate 110 is disposed over the at least one camera 210, the at least one sensor 220, and the light source 230. Further, the outer primary surface 112 of the substrate 110 has an outer optical film structure 130a disposed thereon; and the inner primary surface 114 of the substrate 110 has an inner optical film structure 130b disposed thereon. In addition, the outer optical film structure 130a comprises a first plurality of alternating high index and low index layers 130B, 130A, the first plurality comprising an outermost low index layer (e.g., a capping layer 131, as shown in FIGS. 1A and 1). Further, in some instances this outermost low index layer is exposed to air. Alternatively, the outermost low index layer can be covered by a top coating 140. Further, the inner optical film structure 130b comprises a second plurality of alternating high index and low index layers 130B, 130A, the second plurality comprising a low or high index layer (130A or 130B) disposed on the inner primary surface 114 of the substrate 110, and an innermost low or high index layer disposed over, and with an air gap 300 therebetween, the at least one camera 210, the at least one sensor 220, and the light source 230. Each high index layer 130B of the first plurality of the outer optical film structure 130a comprises a nitride or an oxynitride, and each high index layer 130B of the second plurality of the inner optical film structure 130b comprises an oxide or a nitride. In addition, the substrate 110 and the outer and inner optical film structures 130a, 130b exhibit an average photopic transmittance of greater than 95%, as measured through the primary surfaces 112, 114 of the substrate 110 at an incident angle from 0 to 40 degrees. Further, the substrate 110 and the outer and inner optical film structures 130a, 130b exhibit a maximum hardness of greater than 10 GPa, as measured by a Berkovich Hardness Test over an indentation depth range from about 100 nm to about 500 nm in the outer optical film structure 130a.

Figure 2B:
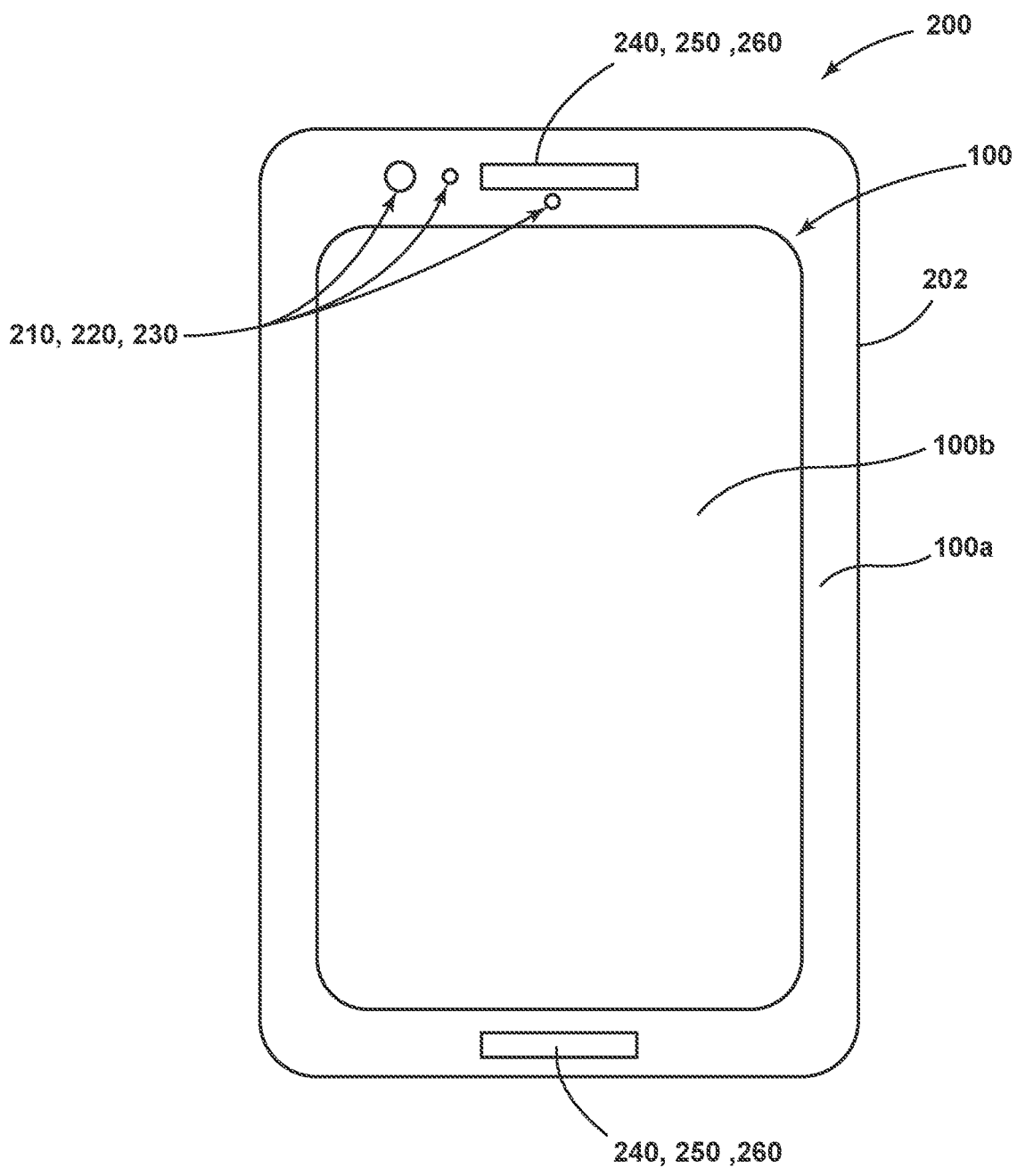
FIG. 2B is a perspective view of an apparatus (e.g., a mobile phone) with a housing, one or more of a camera, a sensor, and a light source, and a cover glass article with a portion having optical film structures according to the disclosure over the camera(s), sensor(s) and light source(s), according to an embodiment of the disclosure.
Figure 2C:
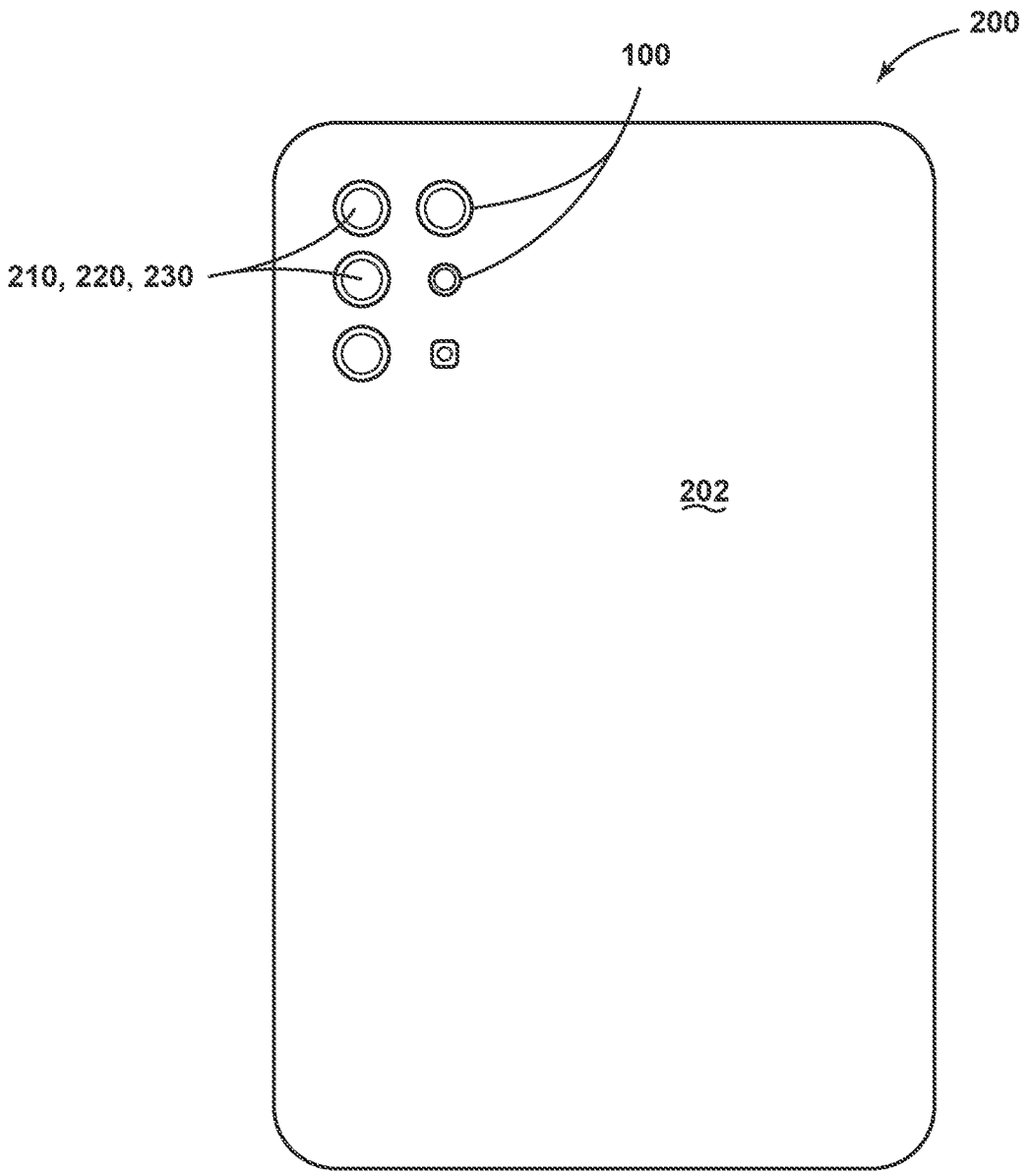
FIG. 2C is a perspective view of an apparatus (e.g., a mobile phone) with a housing, one or more of a camera, a sensor, and a light source, and cover glass articles according to the disclosure over each of the camera(s), sensor(s) and light source(s), according to an embodiment of the disclosure.
Figure 2D:
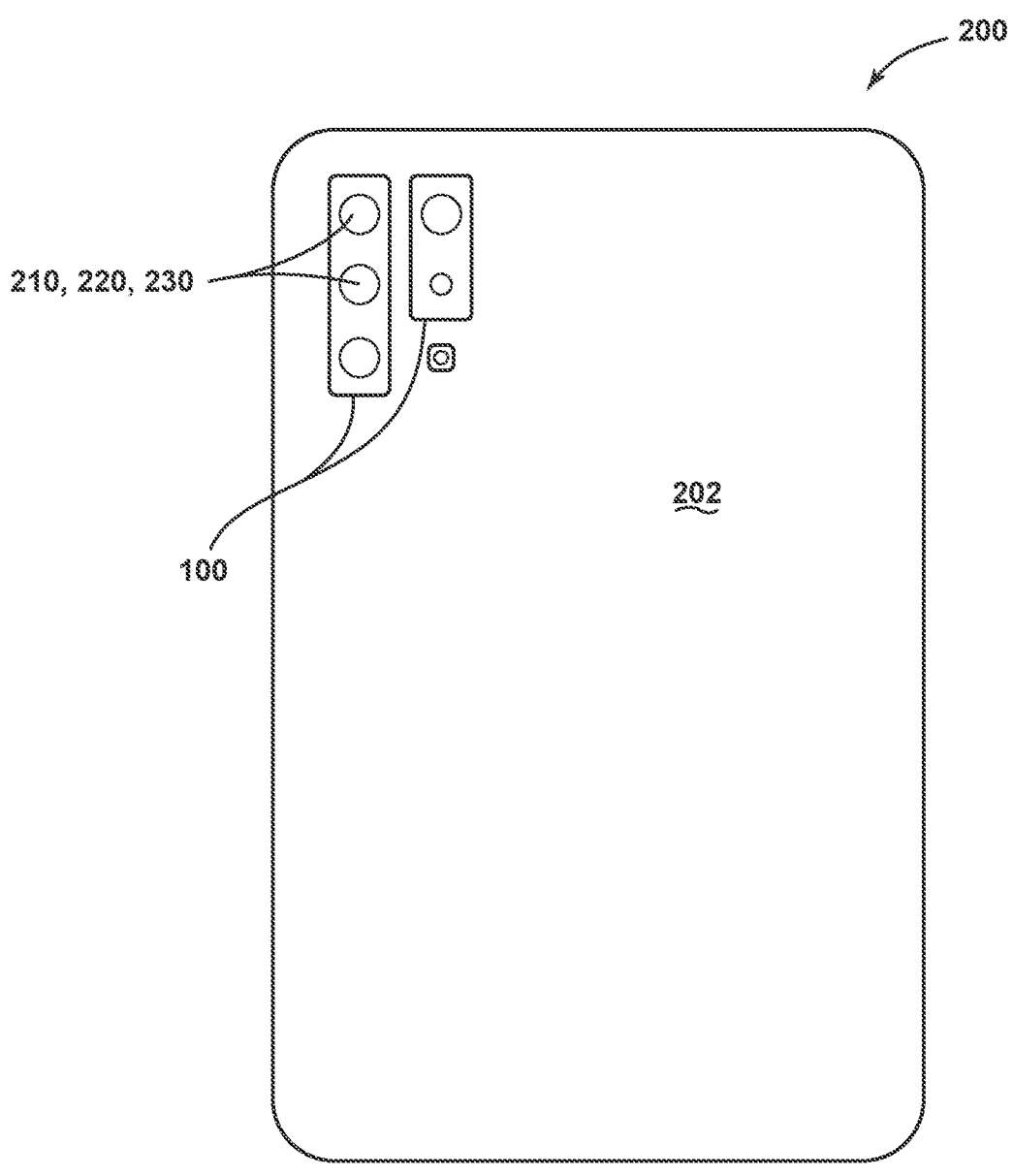
FIG. 2D is a perspective view of an apparatus (e.g., a mobile phone) with a housing, one or more of a camera, a sensor, and a light source, and cover glass articles according to the disclosure over one or more of the camera(s), sensor(s) and light source(s), according to an embodiment of the disclosure.

As noted earlier, FIGS. 2 and 2A depict an apparatus 200 where a single cover glass article 100, having optical film structures 130a, 130b coatings on both of its primary surfaces 112, 114, is used as a durable, optically transparent cover to protect multiple cameras and sensors. Additional apparatus 200 configurations can be considered that employ cover glass articles 100 of the disclosure, as depicted in FIGS. 2B-2D. For example, as depicted in FIG. 2B, an apparatus 200 can include a housing 202, one or more of a camera 210, a sensor 220, and a light source 230 together with a display region (not shown, but underneath the display portion 100b), and a cover glass article 100 that includes an optical film portion 100a having optical film structures 130a, 130b over the camera(s) 210, sensor(s) 220 and light source(s) 230; and the display portion 100b. Optionally, the apparatus 200 may also include one or more microphones 240, speakers 250 and/or buttons 260, which are also covered by the optical film portion 100a of the cover glass article 100 having the optical film structures 130a, 130b, or these microphones 240, speakers 250 and/or buttons 260 may be exposed holes or have a different cover material that is not the same as the cover glass article 100. In these configurations, the cover glass article 100 also may be configured such that the display portion 100b (e.g., in a display region of the device) has only one of optical film structures 130a, 130b, an optical film coating that differs from the film structures 130a, 130b, or no optical film coating. In such configurations, the cover glass article 100 employed in this apparatus 200 can be utilized on the front cover of a smartphone, tablet, laptop, smartwatch, or similar device having a display adjacent to one or more sensors which can be cameras or infrared (IR) sensors, together with optional visible or IR light emitters/light sources. In this application, the dual-sided optical film structures 130a, 130b may be present in the optical film portion 100a of the cover glass article 100, as situated only over the camera 210 or sensor 220 portion of the apparatus 200. Hence, the cover glass article 100 may include a single substrate 110 with different coatings in different areas (e.g., in the optical film portion 100a, display portion 100b, etc.), or coatings in one area and no coatings in another area.

Referring again to the apparatus 200 depicted in FIGS. 2A-2D, at least some portion of the cover glass article 100 comprises a substrate 110 with optical film structures 130a, 130b on respective primary surfaces 112, 114 of the substrate 110, as embodied by the Examples that follow below. Alternately, there could be multiple pieces of substrate 110 in the different areas of the cover glass article 100 (not shown). Optionally and preferably for some applications, the cover glass article 100 may include a single substrate 110 over both the display and one or more cameras 210 or sensors 220, with a single-side hard-coating of the display portion 100b present over the display region of the device, while the two-sided coating of the optical film structures 130a, 130b of the optical film portion 100a is present over one or more cameras 210 or sensors 220. The single-side hard-coating in the display portion 100b may be the same as the outer optical film structure 130a on the outer primary surface 112 of the substrate 110 detailed in the disclosure and/or the following Examples, while an optical film portion 100a of the cover glass article 100 over one or more cameras 210 or sensors 220 incorporates the two-sided coatings of the optical film structures 130a, 130b, as detailed in the disclosure and/or in the following Examples. The rear side of the cover glass article 100 within the display portion 100b of the apparatus 200 may be optically bonded with an adhesive between the rear side of the substrate 110 and the display region, with no optical film structure 130b on the rear of the substrate 110 in this display region.

In another embodiment of the disclosure, an apparatus 200 is depicted in FIG. 2C with a housing 202, one or more of a camera 210, a sensor 220, and a light source 230, and multiple cover glass articles 100, with each article 100 over each of the camera(s) 210, sensor(s) 220 and light source(s) 230. Similarly, according to another embodiment of the disclosure, an apparatus 200 is depicted in FIG. 2D with housing 202, one or more of a camera 210, a sensor 220, and a light source 230, and multiple cover glass articles 100 over one or more of the camera(s) 210, sensor(s) 220 and light source(s) 230. As such, each of the apparatus 200 depicted in FIGS. 2C and 2D may include a cover glass article 100, as utilized on, for example, the back, non-display side of a smartphone, tablet, laptop, smartwatch, or similar device. Separately cut pieces of cover glass articles 100, as outlined in the disclosure, may cover individual or multiple sensors, cameras and/or light sources. The multiple pieces of the cover glass article 100 may be the same, having the same optics, hardness, and 2-sided coating structure (i.e., as of the optical film structures 130a, 130b). Alternately, the multiple pieces of the cover glass article 100 could have different coatings or coating combinations. For example, one piece of the cover glass article 100 may have a 2-sided coating with optical film structures 130a, 130b facilitating high visible and IR transmission, while another cover glass article 100 over another sensor may be uncoated or may have a 1-sided coating, or may have high transmission in the IR wavelength range and low transmission in the visible wavelength range, or other wavelength-selective optical effects.

Figure 13:
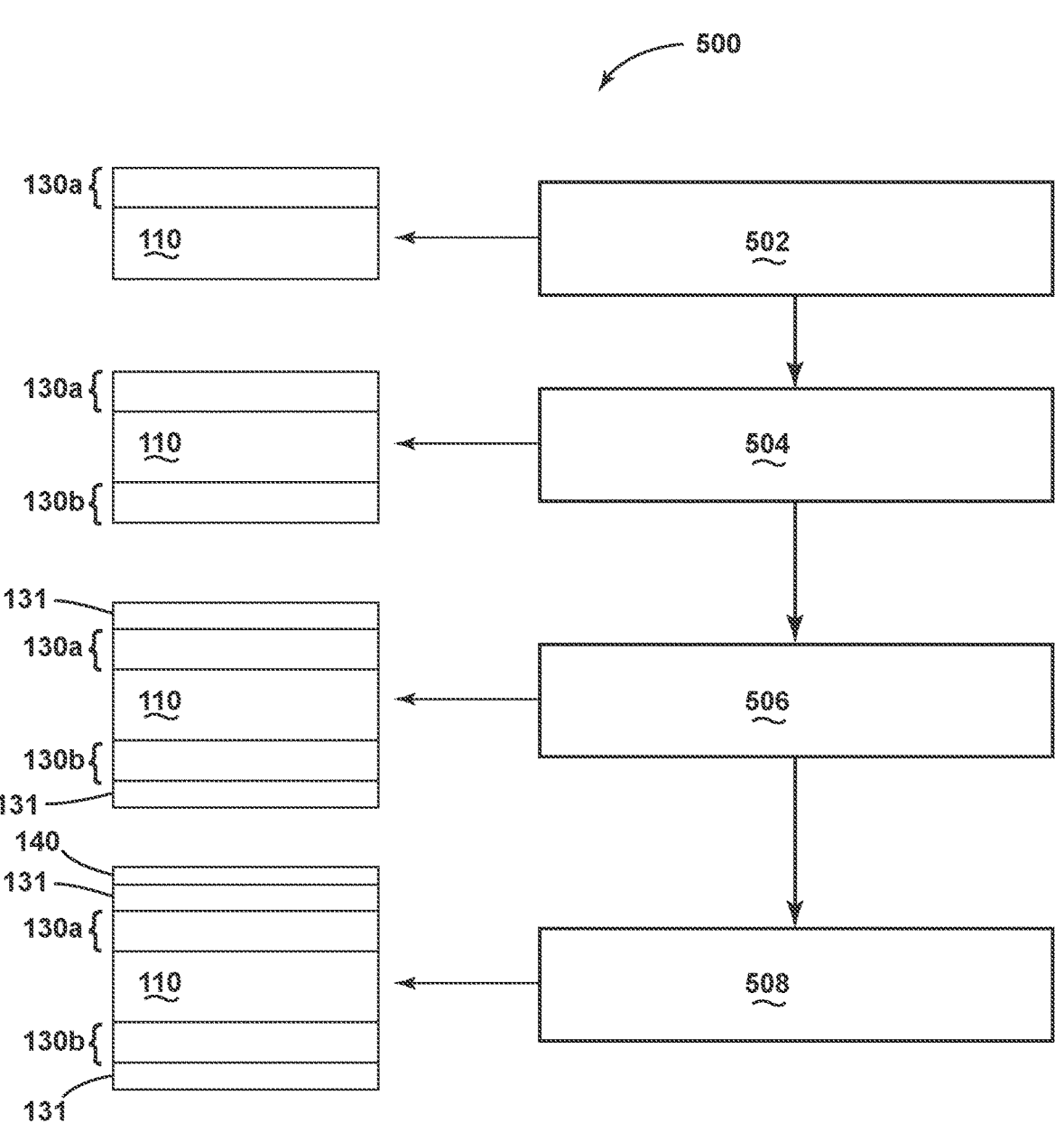
FIG. 13 is a schematic of a method of making cover glass articles, according to embodiments of the disclosure.

Referring now to FIG. 13, a method 500 of making a cover glass article 100 (see FIGS. 1A and 1, and earlier description) is depicted in schematic form. In particular, the method 500 includes a step 502 of forming an outer optical film structure 130a over the outer primary surface 112 of a substrate 110; and step 504 of forming an inner optical film structure 130b over the inner primary surface 114 of the substrate 110. It should be understood that steps 502 and 504 can be conducted in reverse order or simultaneously, according to some embodiments of the method 500 depicted in FIG. 13. In addition, the method 500 includes an optional step 506 of forming a capping layer 131 over the outer and/or inner optical film structure 130a, 130b. The method 500 may also include an optional step 508 of forming a top coating 140 over the outer optical film structure 130a. In addition, each of the steps 502-508 may be conducted by a vacuum deposition technique such as, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering or laser ablation), thermal or e-beam evaporation and/or atomic layer deposition. Liquid-based methods may also be used such as spraying, dipping, spin coating, or slot coating (e.g., using sol-gel materials). Generally, vapor deposition techniques employed in steps 502-

508 may include a variety of vacuum deposition methods which can be used to produce thin films. For example, physical vapor deposition uses a physical process (such as heating or sputtering) to produce a vapor of material, which is then deposited on the object which is coated. Preferred methods of fabricating the outer and inner optical film structures 130a and 130b according to steps 502 and 504 include reactive sputtering, metal-mode reactive sputtering and PECVD processes. Finally, it should be understood that the substrate 100 can optionally be chemically strengthened, as outlined earlier in the disclosure, before steps 502-508 of the method 500.

EXAMPLES

The following examples describe various features and advantages provided by the disclosure, and are in no way intended to limit the invention and appended claims.

In these examples, cover glass articles were formed according to the methods of the disclosure (e.g., through reactive sputtering, metal-mode reactive sputtering and PECVD methods) and as delineated in each of the Tables 1-10. Optical properties were obtained through transfer matrix modeling, starting from experimentally measured refractive index (n and k) values for each of the layers of the optical film structures in these cover glass articles. Cover glass article hardness values reported in the following examples were obtained using the Berkovich Hardness Test method outlined earlier in the disclosure.

Example 1

A cover glass article was prepared for this example with the structure delineated below in Table 1. The outer optical film structure has 19 layers (Layers 1-19) with a measured maximum indentation hardness of greater than 15 GPa, and a hardness at a 500 nm indentation depth that is greater than 14 GPa.

Optical properties measured for this example are summarized in Table 1A below. In particular, optical transmission vs. wavelength range data are reported. As is evident from Table 1A, this example has a 2-surface average transmission (Tx)>97.4% in a wavelength range from 400 to 700 nm and from 0 to 40 degrees incidence, Tx>98% from 840 to 860 nm from 0 to 10 degrees incidence, Tx>95% from 930 to 950 nm from 0 to 10 degrees incidence, and average photopic reflectance (Y), Rx<1.3% from 0 to 10 degrees incidence.

Figure 3A:
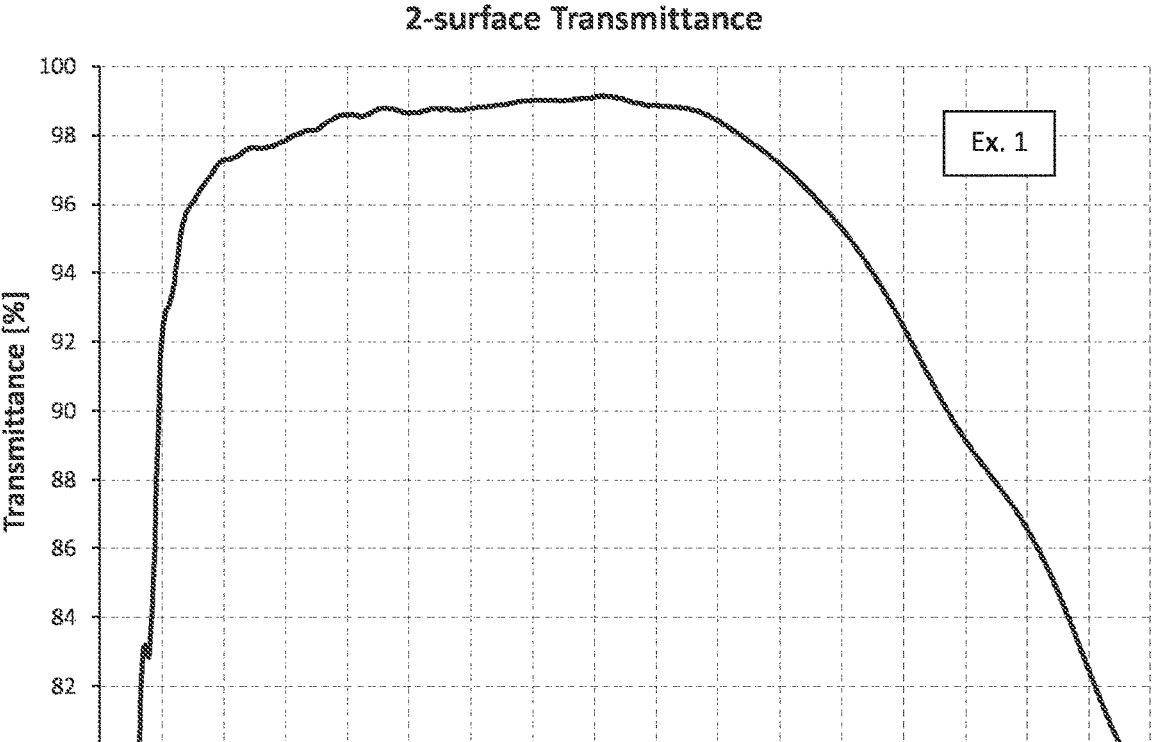
FIGS. 3A and 3C are plots of modeled, two-surface transmittance and reflectance, respectively, vs. wavelength at normal incidence of a cover glass article according to Example 1 of the disclosure.
Figure 3B:
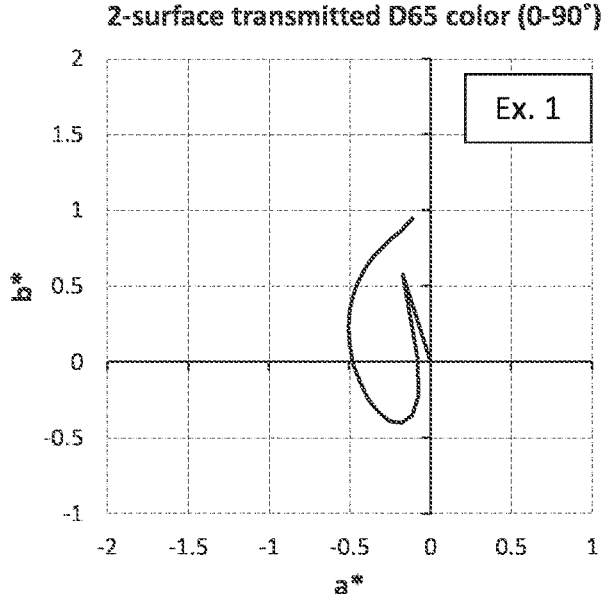
FIGS. 3B and 3D are plots of modeled, two-surface transmitted and reflected color, respectively, for all incidence angles from 0-90 degrees according to Example 1 of the disclosure.
Figure 3C:
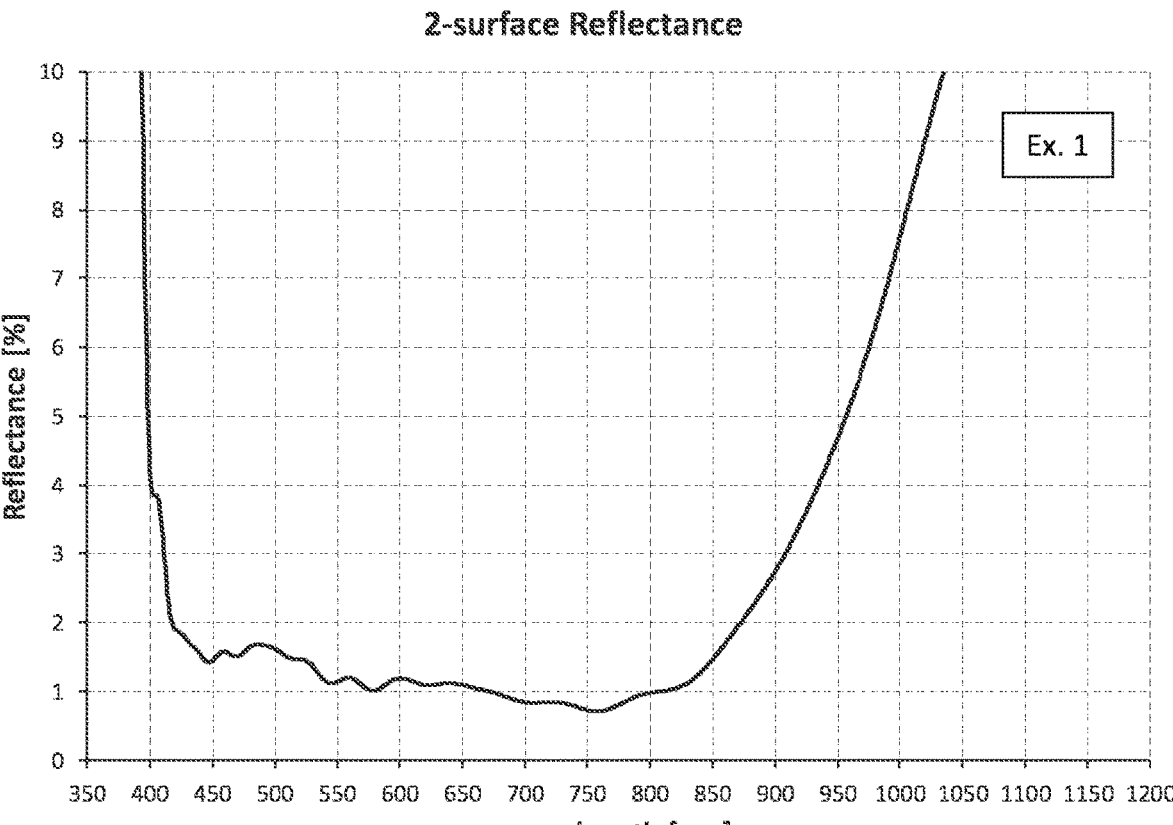
Figure 3D:
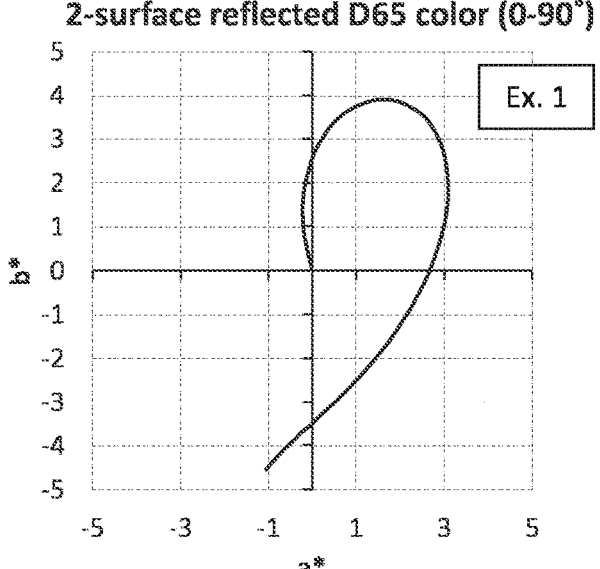

As shown in FIGS. 3A and 3C, plots are provided of modeled, two-surface transmittance and reflectance, respectively, vs. wavelength at normal incidence of the cover glass article according to this example. Further, as shown in FIGS. 3B and 3D, plots are provided of modeled, two-surface transmitted and reflected color, respectively, for all incidence angles from 0-90 degrees of the cover glass article according to this example. As is evident from FIG. 3B, the cover glass article of this example has low transmitted color, less than $\sqrt{(a^{*2}+b^{*2})}=1$, over all incidence angles from 0 to 90 degrees.

TABLE 1

| | | | Ex. 1 cover glass article design | | |
|---|---|---|---|---|---|
| Medium Type | Layer | Material | Refractive Index @550 nm | Extinction Coefficient @550 nm | Physical Thickness (nm) |
| Incident | | Air | 1.00 | 0 | |
| Front | 1 | $SiO_2$ | 1.476 | 0 | 102.3 |
| Coating | 2 | $SiN_x$ | 2.014 | 0.00003 | 152.6 |
| | 3 | $SiO_2$ | 1.476 | 0 | 44.7 |
| | 4 | $SiN_x$ | 2.014 | 0.00003 | 24.9 |
| | 5 | $SiO_2$ | 1.476 | 0 | 81.1 |
| | 6 | $SiN_x$ | 2.014 | 0.00003 | 25.2 |
| | 7 | $SiO_2$ | 1.476 | 0 | 46.3 |
| | 8 | $SiN_x$ | 2.014 | 0.00003 | 38.4 |
| | 9 | $SiO_2$ | 1.476 | 0 | 14.6 |
| | 10 | $SiO_xN_y$ | 1.943 | 0.00004 | 1500 |
| | 11 | $SiO_2$ | 1.476 | 0 | 8 |
| | 12 | $SiO_xN_y$ | 1.943 | 0.00004 | 56.09 |
| | 13 | $SiO_2$ | 1.476 | 0 | 26.68 |
| | 14 | $SiO_xN_y$ | 1.943 | 0.00004 | 39.32 |
| | 15 | $SiO_2$ | 1.476 | 0 | 50.82 |
| | 16 | $SiO_xN_y$ | 1.943 | 0.00004 | 21.57 |
| | 17 | $SiO_2$ | 1.476 | 0 | 67.12 |
| | 18 | $SiO_xN_y$ | 1.943 | 0.00004 | 8.14 |
| | 19 | $SiO_2$ | 1.476 | 0 | 20 |
| Substrate | 20 | 2320 Glass | 1.508 | 0 | 0.4 mm |
| Rear | 21 | $Nb_2O_5$ | 2.326 | 0 | 9.98 |
| Coating | 22 | $SiO_2$ | 1.460 | 0 | 41.59 |
| | 23 | $Nb_2O_5$ | 2.326 | 0 | 26.49 |
| | 24 | $SiO_2$ | 1.460 | 0 | 14.6 |
| | 25 | $Nb_2O_5$ | 2.326 | 0 | 91.02 |
| | 26 | $SiO_2$ | 1.460 | 0 | 16.48 |
| | 27 | $Nb_2O_5$ | 2.326 | 0 | 21.3 |
| | 28 | $MgF_2$ | 1.381 | 0 | 80.07 |
| | 29 | $Al_2O_3$ | 1.636 | 0 | 10 |
| Emergent | | Air | 1.00 | 0 | |

TABLE 1A

| | Optical properties of Ex. 1 | | | | | | | | |
|---|---|---|---|---|---|---|---|---|---|
| (values in %) | 0° | 10° | 20° | 30° | 40° | 50° | 60° | 70° | 80° |
| Tx(400-700 nm) | 97.93 | 97.97 | 98.03 | 97.96 | 97.44 | 95.70 | 90.77 | 77.94 | 48.69 |
| Tx(350-750 nm) | 94.18 | 94.39 | 94.91 | 95.65 | 95.88 | 94.70 | 90.15 | 77.57 | 48.44 |
| Tx(840-860 nm) | 98.41 | 98.31 | 97.97 | 97.31 | 95.98 | 92.95 | 86.48 | 72.65 | 44.46 |
| Tx(930-950 nm) | 95.71 | 95.50 | 94.81 | 93.44 | 90.88 | 86.40 | 79.28 | 66.62 | 41.37 |
| Rx(photopic, Y) | 1.28 | 1.25 | 1.20 | 1.28 | 1.83 | 3.66 | 8.75 | 21.74 | 50.97 |

Example 2

A cover glass article was prepared for this example with the structure delineated below in Table 2. The outer optical film structure has 19 layers (Layers 1-19) with a measured maximum indentation hardness of greater than 15 GPa, and a hardness at a 500 nm indentation depth that is greater than 14 GPa.

Optical properties measured for this example are summarized in Table 2A below. In particular, optical transmission vs. wavelength range data are reported. As is evident from Table 2A, this example has a 2-surface average transmission (Tx)>98% in a wavelength range from 400 to 700 nm and from 0 to 30 degrees incidence, Tx>96% from 840 to 860 nm from 0 to 20 degrees incidence, Tx>93% from 930 to 950 nm from 0 to 20 degrees incidence, and average photopic reflectance (Y), Rx<1.2% from 0 to 10 degrees incidence.

Figure 4A:
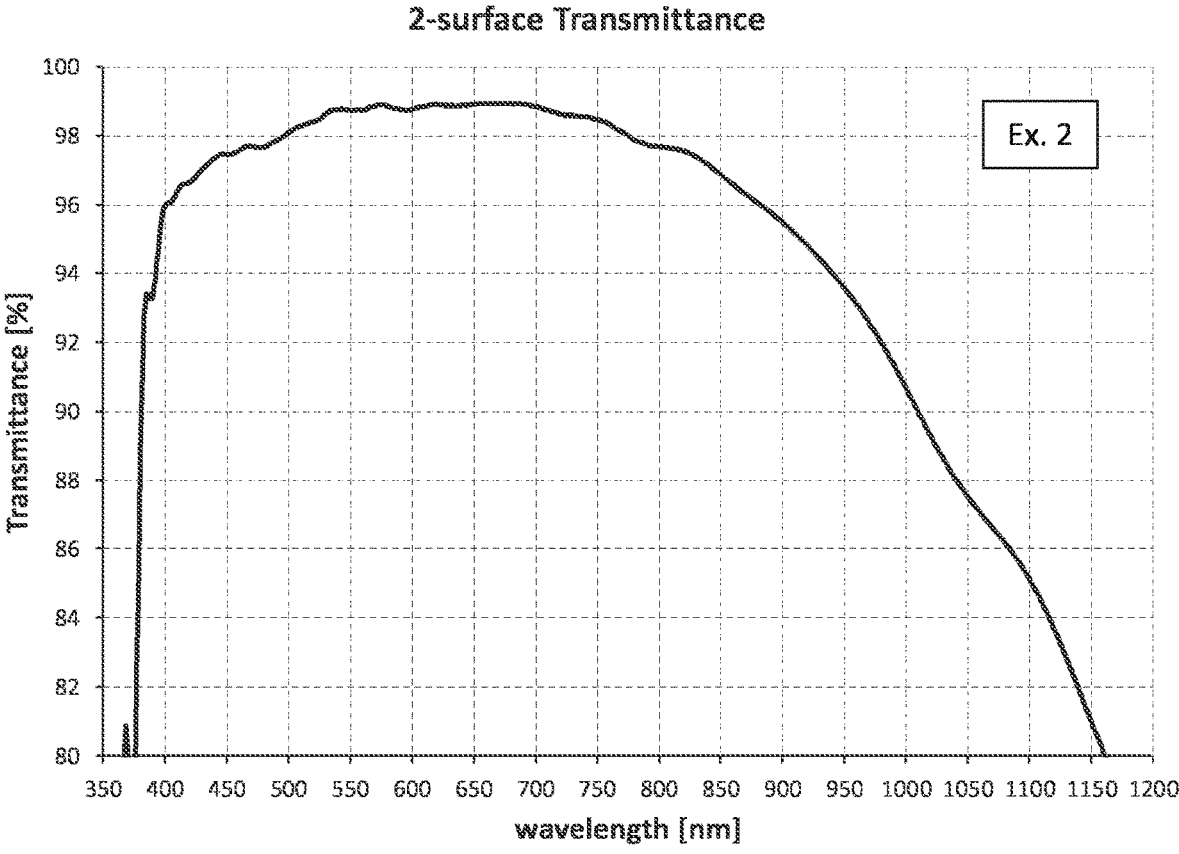
FIGS. 4A and 4C are plots of modeled, two-surface transmittance and reflectance, respectively, vs. wavelength at normal incidence of a cover glass article according to Example 2 of the disclosure.
Figure 4B:
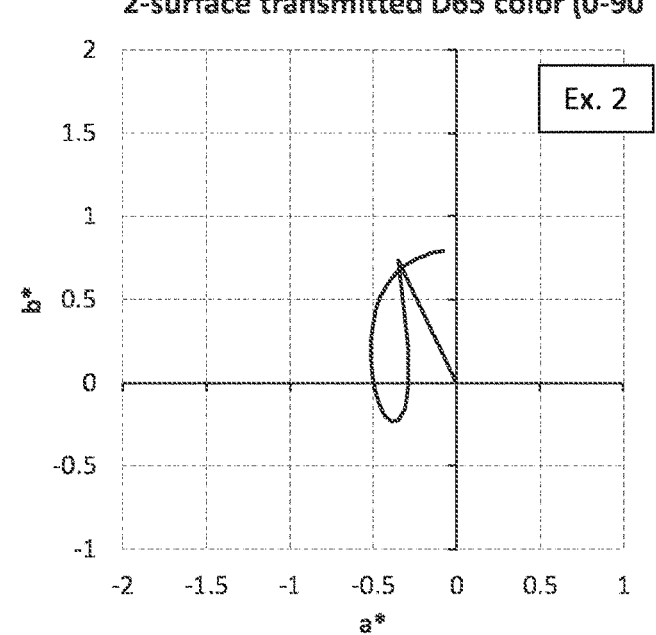
FIGS. 4B and 4D are plots of modeled, two-surface transmitted and reflected color, respectively, for all incidence angles from 0-90 degrees according to Example 2 of the disclosure.
Figure 4C:
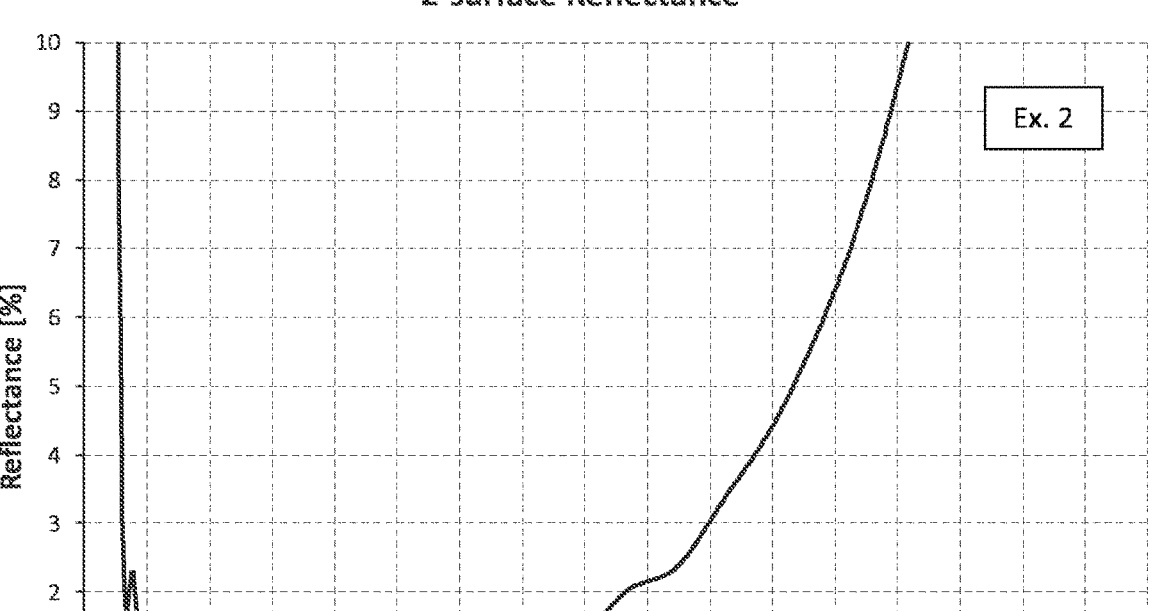
Figure 4D:
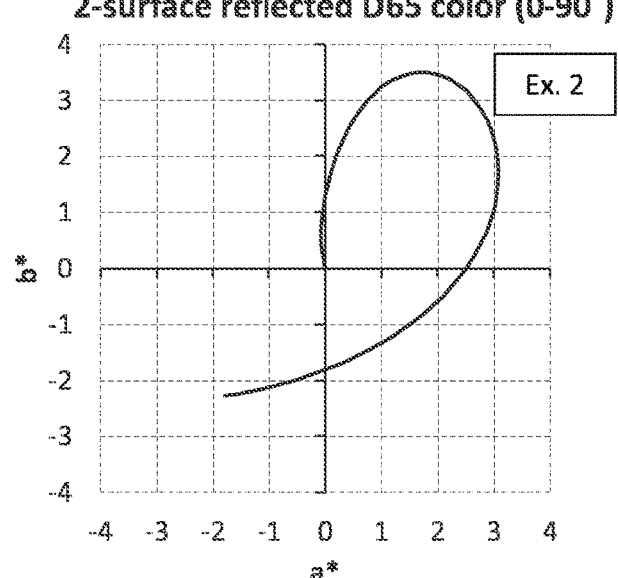

As shown in FIGS. 4A and 4C, plots are provided of modeled, two-surface transmittance and reflectance, respectively, vs. wavelength at normal incidence of the cover glass article according to this example. Further, as shown in FIGS. 4B and 4D, plots are provided of modeled, two-surface transmitted and reflected color, respectively, for all incidence angles from 0-90 degrees of the cover glass article according to this example. As is evident from FIG. 4B, the cover glass article of this example has low transmitted color, less than $\sqrt{(a^{*2}+b^{*2})}=1$, over all incidence angles from 0 to 90 degrees.

TABLE 2

| | | | Ex. 2 cover glass article design | | |
|---|---|---|---|---|---|
| Medium Type | Layer | Material | Refractive Index @550 nm | Extinction Coefficient @550 nm | Physical Thickness (nm) |
| Incident | | Air | 1.000 | 0 | |
| Front | 1 | $SiO_2$ | 1.476 | 0 | 89.85 |
| Coating | 2 | $SiN_x$ | 2.014 | 0.00003 | 146.36 |
| | 3 | $SiO_2$ | 1.476 | 0 | 42.59 |
| | 4 | $SiN_x$ | 2.014 | 0.00003 | 27.22 |
| | 5 | $SiO_2$ | 1.476 | 0 | 76.13 |
| | 6 | $SiN_x$ | 2.014 | 0.00003 | 25.17 |
| | 7 | $SiO_2$ | 1.476 | 0 | 49.66 |
| | 8 | $SiN_x$ | 2.014 | 0.00003 | 36.84 |
| | 9 | $SiO_2$ | 1.476 | 0 | 17.91 |
| | 10 | $SiO_xN_y$ | 1.943 | 0.00004 | 1500 |
| | 11 | $SiO_2$ | 1.476 | 0 | 8 |
| | 12 | $SiO_xN_y$ | 1.943 | 0.00004 | 56.09 |
| | 13 | $SiO_2$ | 1.476 | 0 | 26.68 |
| | 14 | $SiO_xN_y$ | 1.943 | 0.00004 | 39.32 |
| | 15 | $SiO_2$ | 1.476 | 0 | 50.82 |
| | 16 | $SiO_xN_y$ | 1.943 | 0.00004 | 21.57 |
| | 17 | $SiO_2$ | 1.476 | 0 | 67.12 |
| | 18 | $SiO_xN_y$ | 1.943 | 0.00004 | 8.14 |
| | 19 | $SiO_2$ | 1.476 | 0 | 20 |
| Substrate | 20 | 2320 Glass | 1.508 | 0 | 0.4 mm |

TABLE 2-continued

| | | | Ex. 2 cover glass article design | | |
|---|---|---|---|---|---|
| Medium Type | Layer | Material | Refractive Index @550 nm | Extinction Coefficient @550 nm | Physical Thickness (nm) |
| Rear | 21 | $Nb_2O_5$ | 2.326 | 0 | 9.98 |
| Coating | 22 | $SiO_2$ | 1.460 | 0 | 41.59 |
| | 23 | $Nb_2O_5$ | 2.326 | 0 | 26.49 |
| | 24 | $SiO_2$ | 1.460 | 0 | 14.6 |
| | 25 | $Nb_2O_5$ | 2.326 | 0 | 91.02 |
| | 26 | $SiO_2$ | 1.460 | 0 | 16.48 |
| | 27 | $Nb_2O_5$ | 2.326 | 0 | 21.3 |
| | 28 | $MgF_2$ | 1.381 | 0 | 80.07 |
| | 29 | $Al_2O_3$ | 1.636 | 0 | 10 |
| Emergent | | Air | 1.000 | 0 | |

TABLE 2A

| (values in %) | 0° | 10° | 20° | 30° | 40° | 50° | 60° | 70° | 80° |
|---|---|---|---|---|---|---|---|---|---|
| | | | | Optical properties of Ex. 2 | | | | | |
| Tx(400-700 nm) | 98.27 | 98.27 | 98.24 | 98.03 | 97.35 | 95.43 | 90.30 | 77.35 | 48.23 |
| Tx(350-750 nm) | 95.79 | 95.95 | 96.30 | 96.72 | 96.47 | 94.78 | 89.79 | 76.93 | 47.89 |
| Tx(840-860 nm) | 96.88 | 96.75 | 96.35 | 95.62 | 94.19 | 91.01 | 84.54 | 71.00 | 43.54 |
| Tx(930-950 nm) | 94.00 | 93.79 | 93.09 | 91.70 | 89.10 | 84.69 | 77.97 | 65.92 | 41.21 |
| Rx(photopic, Y) | 1.09 | 1.08 | 1.08 | 1.24 | 1.90 | 3.84 | 9.03 | 22.07 | 51.22 |

Example 3

A cover glass article was prepared for this example with the structure delineated below in Table 3. The outer optical film structure has 5 layers (Layers 1-5) with a measured maximum indentation hardness of greater than 15 GPa, and the inner optical film structure (Layers 7-15) is configured to exhibit a similar or higher hardness than the outer optical film structure.

Optical properties measured for this example are summarized in Table 3A below. In particular, optical transmission vs. wavelength range data are reported. As is evident from Table 3A, this example has a 2-surface average transmission (Tx)>98.4% in a wavelength range from 400 to 700 nm and from 0 to 20 degrees incidence, Tx>90% from 840 to 860 nm from 0 to 30 degrees incidence, Tx>87% from 930 to 950 nm from 0 to 20 degrees incidence, and average photopic reflectance (Y), Rx<1.3% from 0 to 10 degrees incidence.

Figure 5A:
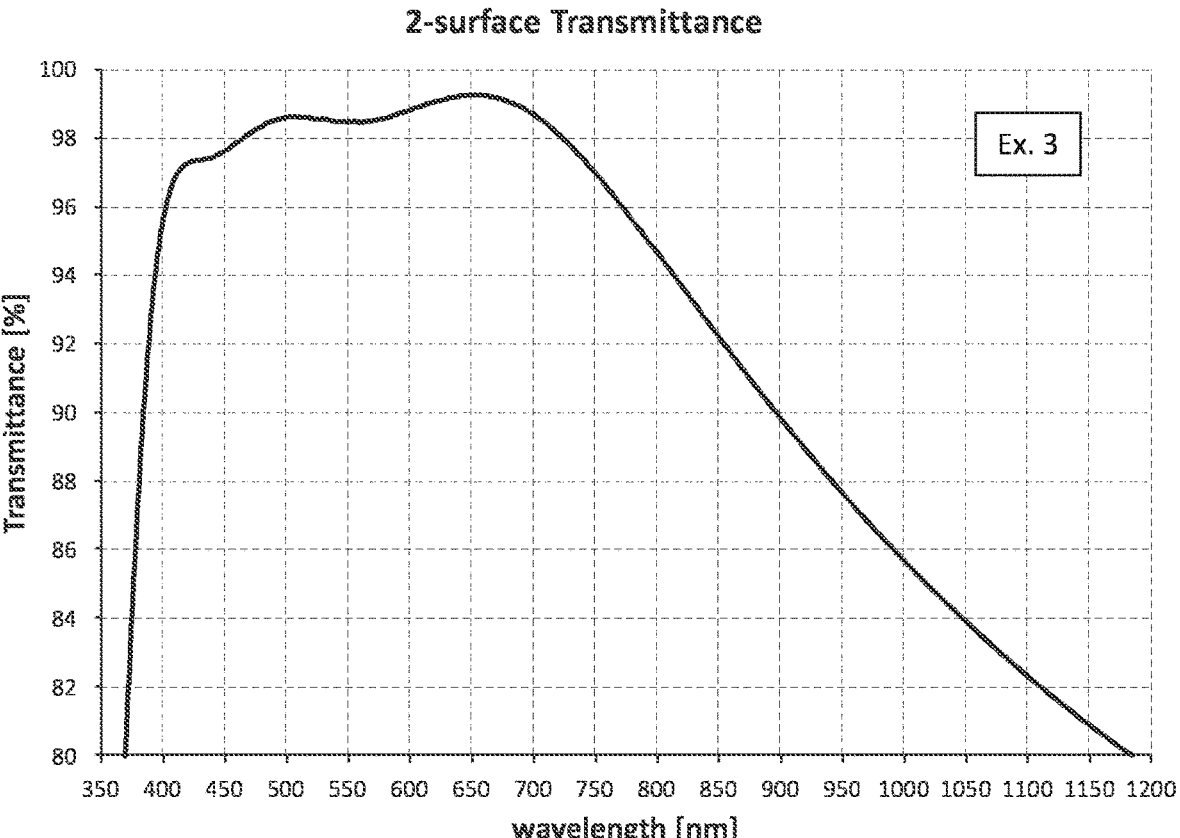
FIGS. 5A and 5C are plots of modeled, two-surface transmittance and reflectance, respectively, vs. wavelength at normal incidence of a cover glass article according to Example 3 of the disclosure.
Figure 5B:
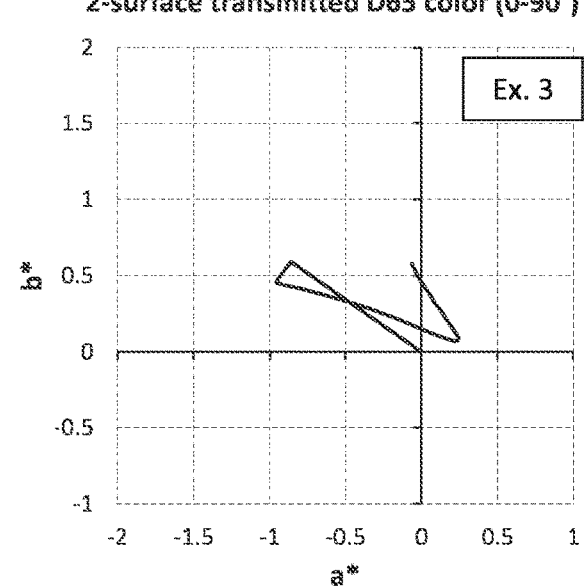
FIGS. 5B and 5D are plots of modeled, two-surface transmitted and reflected color, respectively, for all incidence angles from 0-90 degrees according to Example 3 of the disclosure.
Figure 5C:
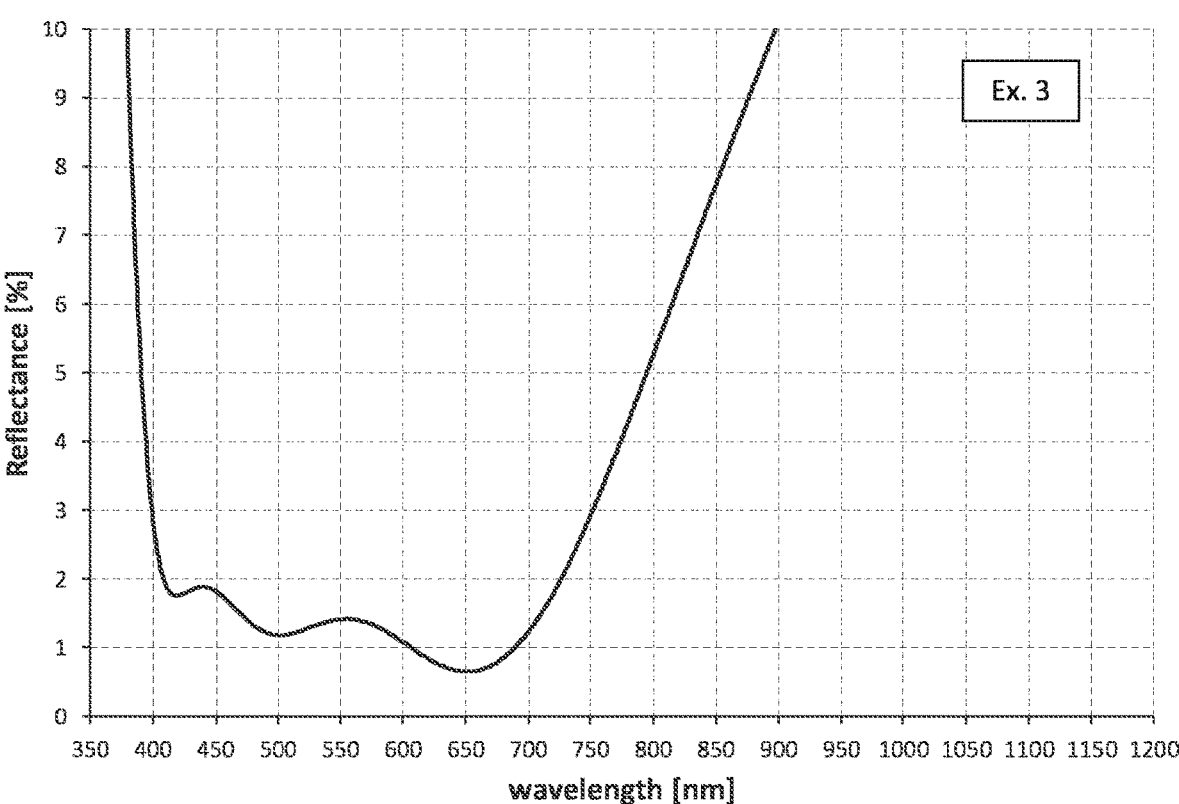
Figure 5D:
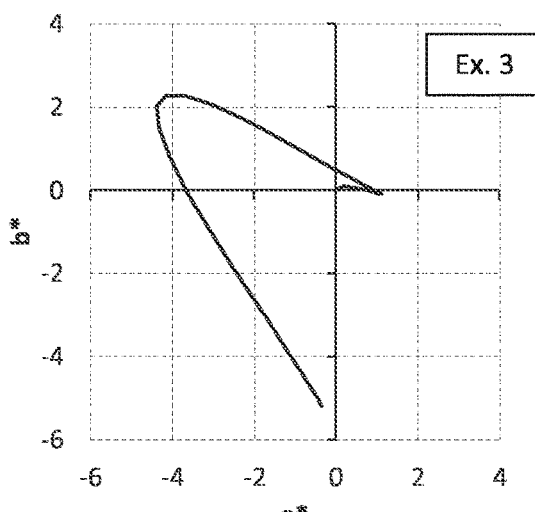

As shown in FIGS. 5A and 5C, plots are provided of modeled, two-surface transmittance and reflectance, respectively, vs. wavelength at normal incidence of the cover glass article according to this example. Further, as shown in FIGS. 5B and 5D, plots are provided of modeled, two-surface transmitted and reflected color, respectively, for all incidence angles from 0-90 degrees of the cover glass article according to this example. As is evident from FIG. 5B, the cover glass article of this example has low transmitted color, less than $\sqrt{(a*^2+b*^2)}$=1.5, over all incidence angles from 0 to 90 degrees.

TABLE 3

Ex. 3 cover glass article design

| Medium Type | Layer | Material | Refractive Index @550 nm | Extinction Coefficient @550 nm | Physical Thickness (nm) |
|---|---|---|---|---|---|
| Incident | | Air | 1.000 | 0 | |
| Front or | 1 | SiO₂ | 1.465 | 0 | 84.7 |
| Rear | 2 | SiNₓ | 2.043 | 0.00009 | 119.6 |
| Coating | 3 | SiO₂ | 1.465 | 0 | 30.6 |
| | 4 | SiNₓ | 2.043 | 0.00009 | 15.0 |
| | 5 | SiO₂ | 1.465 | 0 | 24.8 |
| Substrate | 6 | 2320 Glass | 1.508 | 0 | 0.4 mm |
| Front or | 7 | SiO₂ | 1.476 | 0 | 25.0 |
| Rear | 8 | SiNₓ | 2.014 | 0.00003 | 8.0 |

TABLE 3-continued

Ex. 3 cover glass article design

| Medium Type | Layer | Material | Refractive Index @550 nm | Extinction Coefficient @550 nm | Physical Thickness (nm) |
|---|---|---|---|---|---|
| Coating | 9 | SiO₂ | 1.476 | 0 | 21.8 |
| | 10 | SiNₓ | 2.014 | 0.00003 | 8.0 |
| | 11 | SiO₂ | 1.476 | 0 | 49.0 |
| | 12 | SiNₓ | 2.014 | 0.00003 | 30.9 |
| | 13 | SiO₂ | 1.476 | 0 | 32.0 |
| | 14 | SiNₓ | 2.014 | 0.00003 | 152.4 |
| | 15 | SiO₂ | 1.476 | 0 | 94.9 |
| Emergent | | Air | 1.000 | 0 | |

TABLE 3A

| (values in %) | 0° | 10° | 20° | 30° | 40° | 50° | 60° | 70° | 80° |
|---|---|---|---|---|---|---|---|---|---|
| | | | | Optical properties of Ex. 3 | | | | | |
| Tx(400-700 nm) | 98.43 | 98.44 | 98.44 | 98.28 | 97.61 | 95.64 | 90.35 | 77.09 | 47.83 |
| Tx(350-750 nm) | 96.31 | 96.42 | 96.68 | 96.86 | 96.49 | 94.70 | 89.52 | 76.40 | 47.39 |
| Tx(840-860 nm) | 92.24 | 92.01 | 91.29 | 90.02 | 87.99 | 84.70 | 78.82 | 67.00 | 42.10 |
| Tx(930-950 nm) | 88.11 | 87.89 | 87.21 | 86.02 | 84.16 | 81.21 | 76.00 | 65.32 | 41.67 |
| Rx(photopic, Y) | 1.26 | 1.26 | 1.27 | 1.42 | 2.0 | 3.8 | 8.8 | 22.0 | 51.5 |

Example 4

A cover glass article was prepared for this example with the structure delineated below in Table 4. The outer optical film structure has 7 layers (Layers 1-7) with a measured maximum indentation hardness of greater than 14 GPa, and a hardness at 500 nm indentation depth that is greater than 10 GPa. Further, the inner optical film structure (Layers 9-17) is configured to exhibit a similar or higher hardness than the outer optical film structure.

Optical properties measured for this example are summarized in Table 4A below. In particular, optical transmission vs. wavelength range data are reported. As is evident from Table 4A, this example has a 2-surface average transmission (Tx)>9800 in a wavelength range from 400 to 700 nm and from 0 to 20 degrees incidence, Tx>91.5% from 840 to 860 nm from 0 to 40 degrees incidence, Tx>93.5% from 930 to 950 nm from 0 to 20 degrees incidence, and average photopic reflectance (Y), Rx<1.4% from 0 to 10 degrees incidence.

Figure 6A:
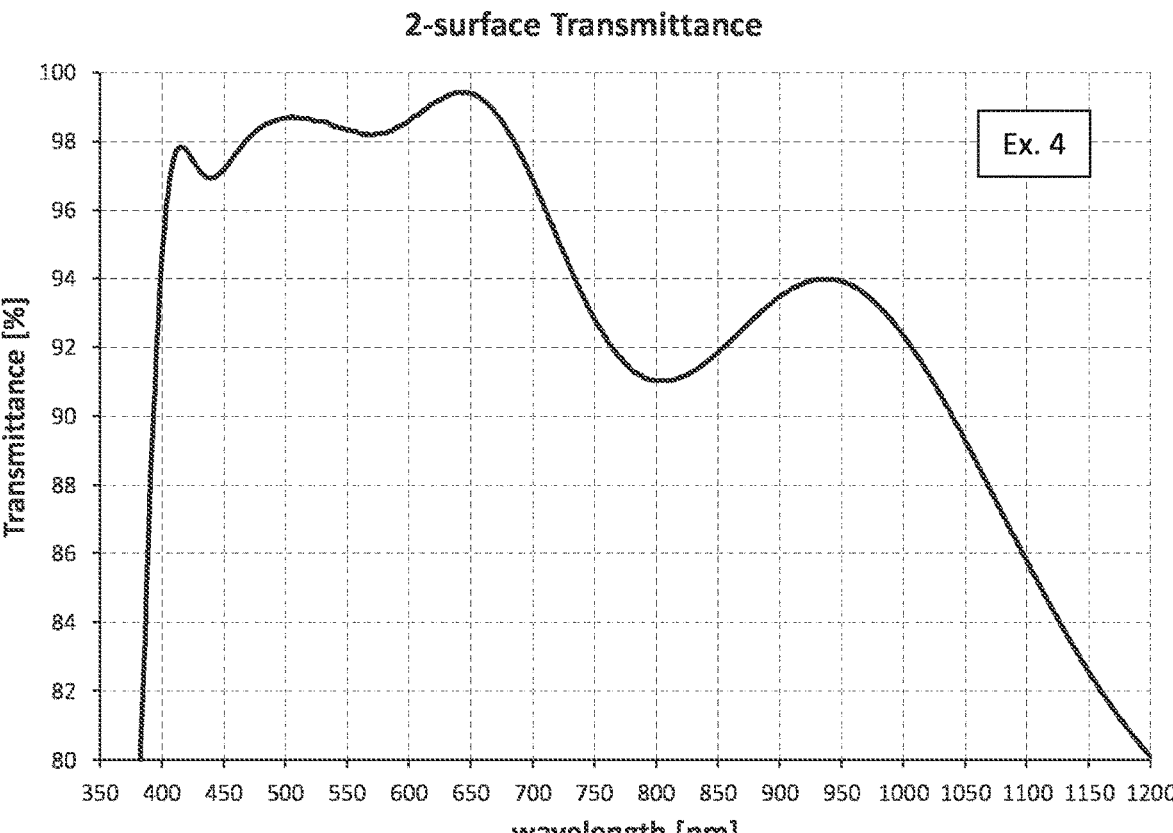
FIGS. 6A and 6C are plots of modeled, two-surface transmittance and reflectance, respectively, vs. wavelength at normal incidence of a cover glass article according to Example 4 of the disclosure.
Figure 6B:
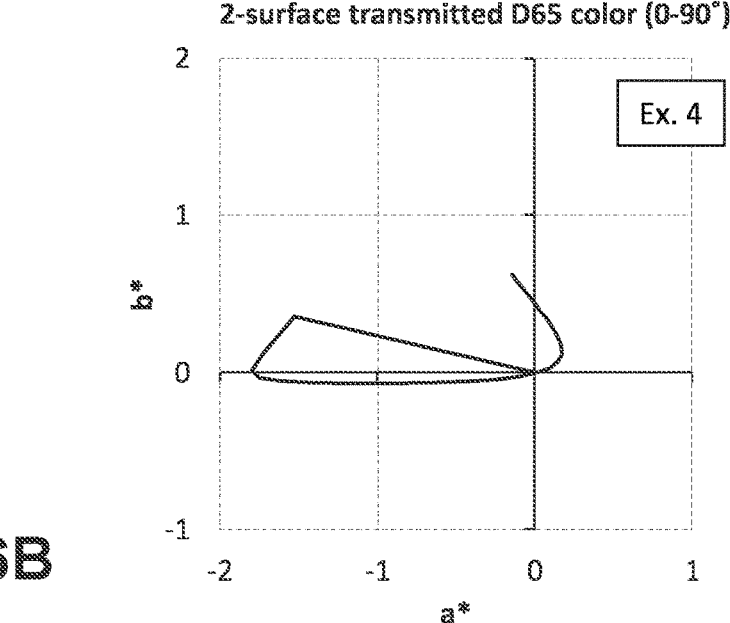
FIGS. 6B and 6D are plots of modeled, two-surface transmitted and reflected color, respectively, for all incidence angles from 0-90 degrees according to Example 4 of the disclosure.
Figure 6C:
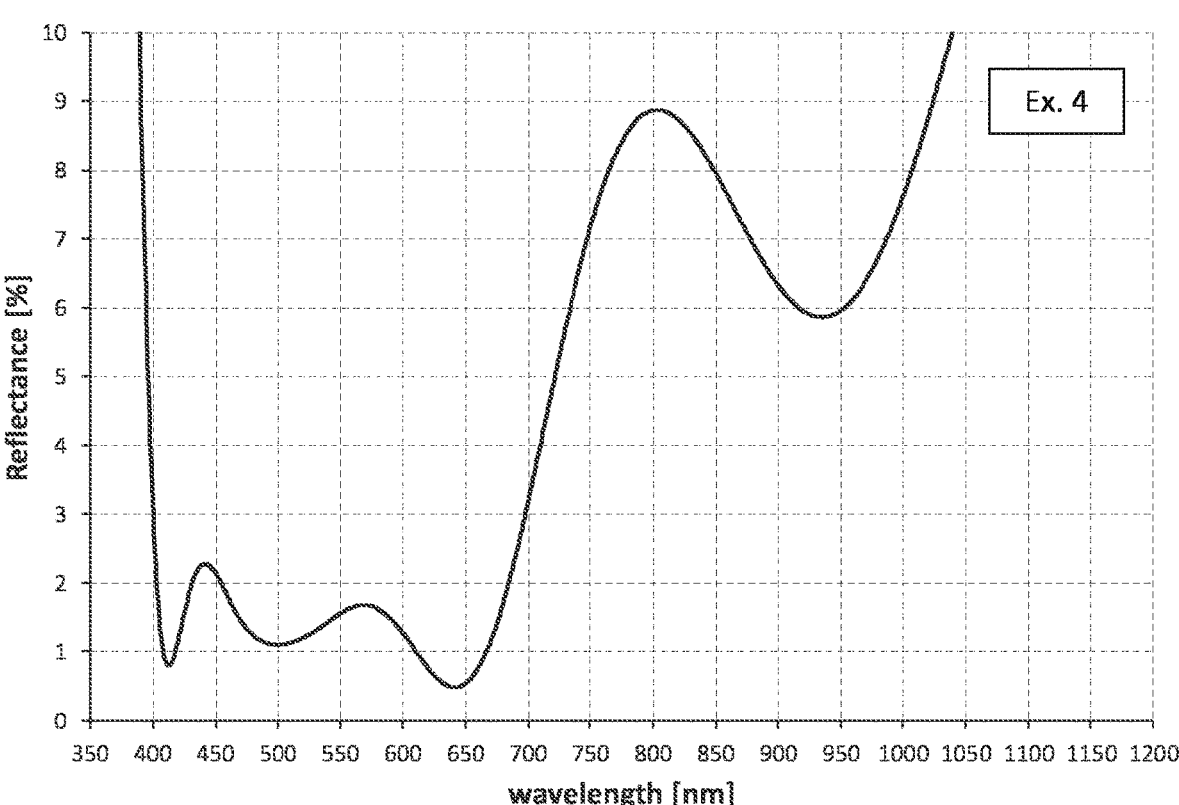
Figure 6D:
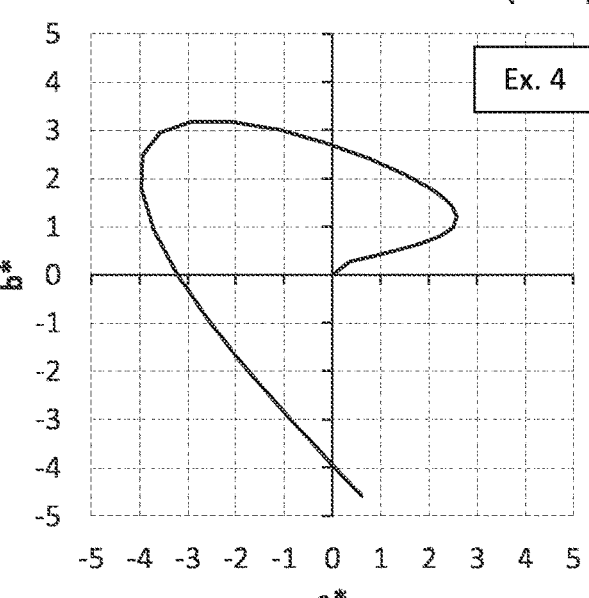

As shown in FIGS. 6A and 6C, plots are provided of modeled, two-surface transmittance and reflectance, respectively, vs. wavelength at normal incidence of the cover glass article according to this example. Further, as shown in FIGS. 6B and 6D, plots are provided of modeled, two-surface transmitted and reflected color, respectively, for all incidence angles from 0-90 degrees of the cover glass article according to this example. As is evident from FIG. 6B, the cover glass article of this example has low transmitted color, less than $\sqrt{(a^{*2}+b^{*2})}=2$, over all incidence angles from 0 to 90 degrees.

TABLE 4

Ex. 4 cover glass article design

| Medium Type | Layer | Material | Refractive Index @550 nm | Extinction Coefficient @550 nm | Physical Thickness (nm) |
|---|---|---|---|---|---|
| Incident | | Air | 1.000 | 0 | |
| Front or | 1 | SiO$_2$ | 1.476 | 0 | 89.41 |
| Rear | 2 | SiN$_x$ | 2.058 | 0.00002 | 146.34 |
| Coating | 3 | SiO$_2$ | 1.476 | 0 | 11.24 |
| | 4 | SiN$_x$ | 2.058 | 0.00002 | 270 |
| | 5 | SiO$_2$ | 1.476 | 0 | 31.04 |
| | 6 | SiN$_x$ | 2.014 | 0.00003 | 19.91 |
| | 7 | SiO$_2$ | 1.476 | 0 | 25 |

TABLE 4-continued

Ex. 4 cover glass article design

| Medium Type | Layer | Material | Refractive Index @550 nm | Extinction Coefficient @550 nm | Physical Thickness (nm) |
|---|---|---|---|---|---|
| Substrate | 8 | 2320 Glass | 1.508 | 0 | 0.4 mm |
| Front or | 9 | SiO$_2$ | 1.476 | 0 | 25 |
| Rear | 10 | SiN$_x$ | 2.014 | 0.00003 | 8.01 |
| Coating | 11 | SiO$_2$ | 1.476 | 0 | 21.77 |
| | 12 | SiN$_x$ | 2.014 | 0.00003 | 8 |
| | 13 | SiO$_2$ | 1.476 | 0 | 48.95 |
| | 14 | SiN$_x$ | 2.014 | 0.00003 | 30.9 |
| | 15 | SiO$_2$ | 1.476 | 0 | 31.98 |
| | 16 | SiN$_x$ | 2.014 | 0.00003 | 152.41 |
| | 17 | SiO$_2$ | 1.476 | 0 | 94.91 |
| Emergent | | Air | 1.000 | 0 | |

TABLE 4A

Optical properties of Ex. 4

| (values in %) | 0° | 10° | 20° | 30° | 40° | 50° | 60° | 70° | 80° |
|---|---|---|---|---|---|---|---|---|---|
| Tx(400-700 nm) | 98.27 | 98.28 | 98.23 | 97.94 | 97.08 | 94.85 | 89.32 | 76.04 | 47.17 |
| Tx(350-750 nm) | 94.88 | 94.98 | 95.22 | 95.38 | 95.02 | 93.29 | 88.25 | 75.47 | 46.96 |
| Tx(840-860 nm) | 91.85 | 91.88 | 91.97 | 92.04 | 91.72 | 90.09 | 85.07 | 72.42 | 44.97 |
| Tx(930-950 nm) | 93.96 | 93.90 | 93.63 | 92.88 | 91.14 | 87.62 | 80.93 | 68.04 | 42.37 |
| Rx(photopic, Y) | 1.36 | 1.35 | 1.34 | 1.46 | 2.02 | 3.8 | 8.8 | 22.1 | 51.5 |

Example 5

A cover glass article was prepared for this example with the structure delineated below in Table 5. The outer optical film structure has 5 layers (Layers 1-5) with a measured maximum indentation hardness of greater than 10 GPa.

Optical properties measured for this example are summarized in Table 5A below. In particular, optical transmission vs. wavelength range data are reported. As is evident from Table 5A, this example has a 2-surface average transmission (Tx)>98.5% in a wavelength range from 400 to 700 nm and from 0 to 30 degrees incidence, Tx>93.5% from 840 to 860 nm from 0 to 10 degrees incidence, Tx>88% from 930 to 950 nm from 0 to 10 degrees incidence, and average photopic reflectance (Y), Rx<0.9% from 0 to 10 degrees incidence.

Figure 7A:
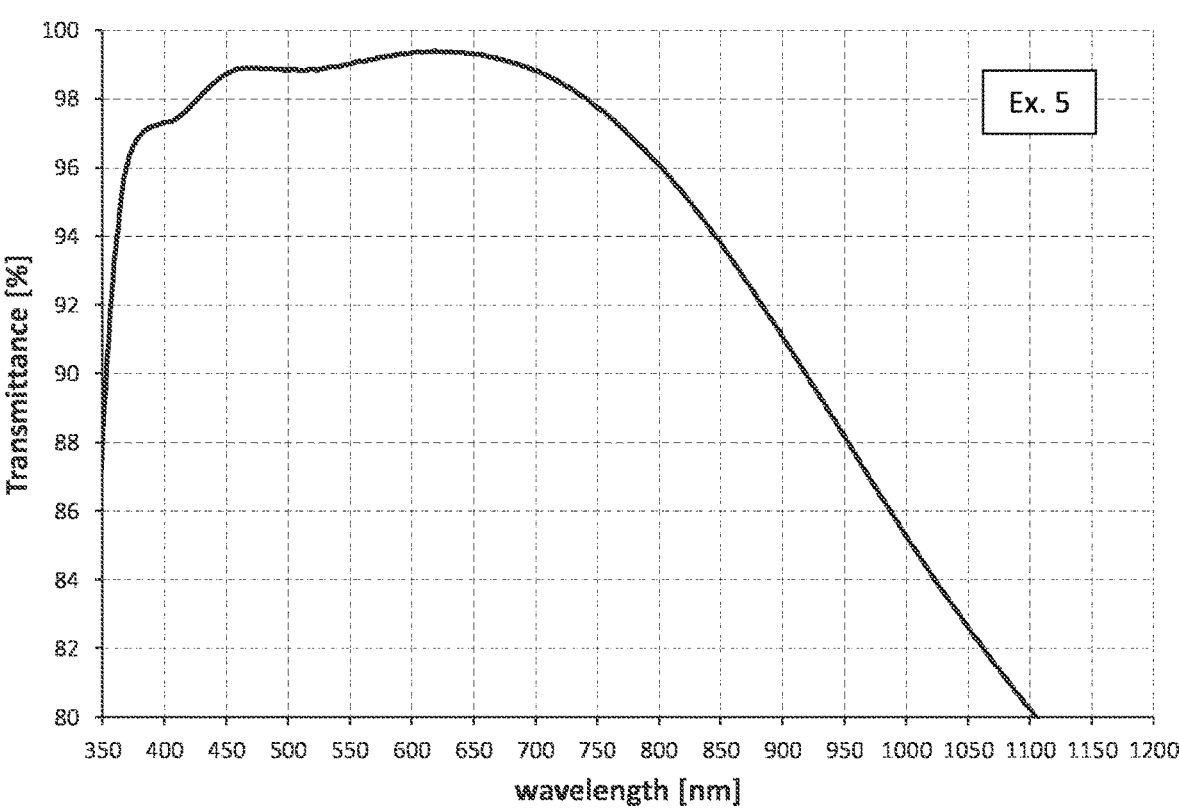
FIGS. 7A and 7C are plots of modeled, two-surface transmittance and reflectance, respectively, vs. wavelength at normal incidence of a cover glass article according to Example 5 of the disclosure.
Figure 7B:
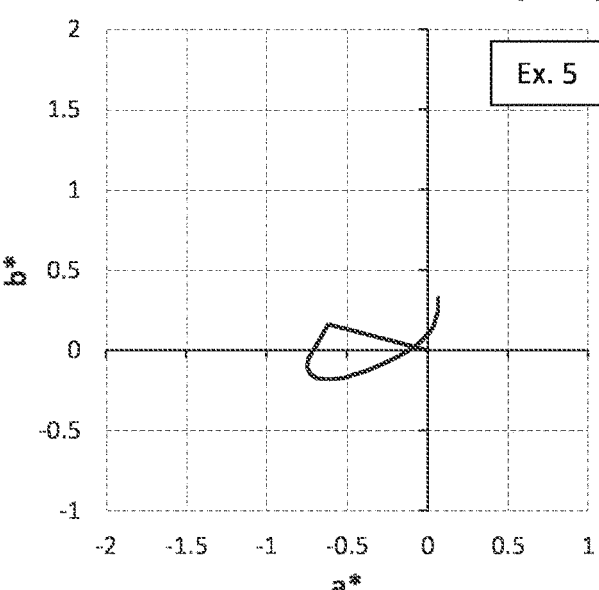
FIGS. 7B and 7D are plots of modeled, two-surface transmitted and reflected color, respectively, for all incidence angles from 0-90 degrees according to Example 5 of the disclosure.
Figure 7C:
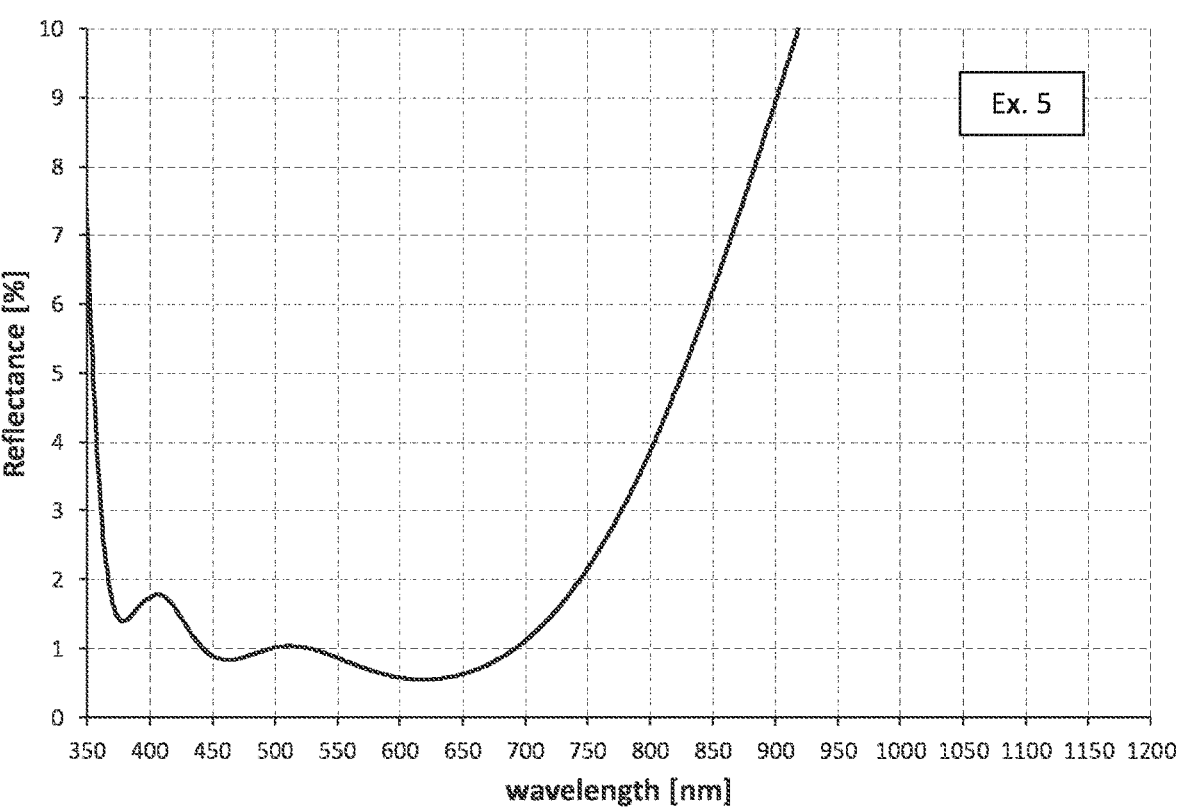
Figure 7D:
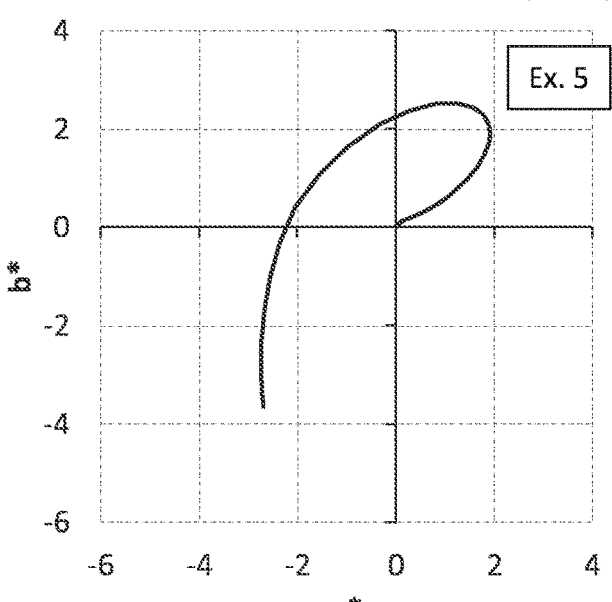

As shown in FIGS. 7A and 7C, plots are provided of modeled, two-surface transmittance and reflectance, respectively, vs. wavelength at normal incidence of the cover glass article according to this example. Further, as shown in FIGS. 7B and 7D, plots are provided of modeled, two-surface transmitted and reflected color, respectively, for all incidence angles from 0-90 degrees of the cover glass article according to this example. As is evident from FIG. 7B, the cover glass article of this example has low transmitted color, less than $\sqrt{(a^{*2}+b^{*2})}=0.9$, over all incidence angles from 0 to 90 degrees, and less than $\sqrt{(a^{*2}+b^{*2})}=0.5$ from 0 to 20 degrees incidence.

TABLE 5

Ex. 5 cover glass article design

| Medium Type | Layer | Material | Refractive Index @550 nm | Extinction Coefficient @550 nm | Physical Thickness (nm) |
|---|---|---|---|---|---|
| Incident | | Air | 1.00 | 0 | |
| Front | 1 | SiO$_2$ | 1.465 | 0 | 84.7 |
| Coating | 2 | SiN$_x$ | 2.043 | 0.00009 | 119.62 |
| | 3 | SiO$_2$ | 1.465 | 0 | 30.6 |
| | 4 | SiN$_x$ | 2.043 | 0.00009 | 14.98 |
| | 5 | SiO$_2$ | 1.465 | 0 | 24.77 |
| Substrate | 6 | 2320 Glass | 1.508 | 0 | 0.4 mm |
| Rear | 7 | Nb$_2$O$_5$ | 2.326 | 0 | 9.98 |
| Coating | 8 | SiO$_2$ | 1.460 | 0 | 41.59 |
| | 9 | Nb$_2$O$_5$ | 2.326 | 0 | 26.49 |
| | 10 | SiO$_2$ | 1.460 | 0 | 14.6 |
| | 11 | Nb$_2$O$_5$ | 2.326 | 0 | 91.02 |
| | 12 | SiO$_2$ | 1.460 | 0 | 16.48 |
| | 13 | Nb$_2$O$_5$ | 2.326 | 0 | 21.3 |
| | 14 | MgF$_2$ | 1.381 | 0 | 80.07 |
| | 15 | Al$_2$O$_3$ | 1.636 | 0 | 10 |
| Emergent | | Air | 1.00 | 0 | |

TABLE 5A

Optical properties of Ex. 5

| (values in %) | 0° | 10° | 20° | 30° | 40° | 50° | 60° | 70° | 80° |
|---|---|---|---|---|---|---|---|---|---|
| Tx(400-700 nm) | 98.88 | 98.88 | 98.86 | 98.68 | 98.00 | 96.07 | 90.90 | 77.83 | 48.52 |
| Tx(350-750 nm) | 98.37 | 98.39 | 98.39 | 98.21 | 97.52 | 95.56 | 90.40 | 77.38 | 48.21 |
| Tx(840-860 nm) | 93.78 | 93.55 | 92.83 | 91.52 | 89.33 | 85.66 | 79.16 | 66.55 | 41.30 |
| Tx(930-950 nm) | 88.74 | 88.46 | 87.59 | 86.07 | 83.73 | 80.17 | 74.40 | 63.47 | 40.31 |
| Rx(photopic, Y) | 0.82 | 0.82 | 0.83 | 0.99 | 1.6 | 3.2 | 8.6 | 21.5 | 51.0 |

Example 6

A cover glass article was prepared for this example with the structure delineated below in Table 6. The outer optical film structure has 7 layers (Layers 1-7) with a measured maximum indentation hardness of greater than 14 GPa, and a hardness at 500 nm indentation depth that is greater than 10 GPa.

Optical properties measured for this example are summarized in Table 6A below. In particular, optical transmission vs. wavelength range data are reported. As is evident from Table 6A, this example has a 2-surface average transmission (Tx)>98.500 in a wavelength range from 400 to 700 nm and from 0 to 20 degrees incidence, Tx>93.0% from 840 to 860 nm from 0 to 40 degrees incidence, Tx>94.5% from 930 to 950 nm from 0 to 10 degrees incidence, and average photopic reflectance (Y), Rx<100 from 0 to 10 degrees incidence.

Figure 8A:
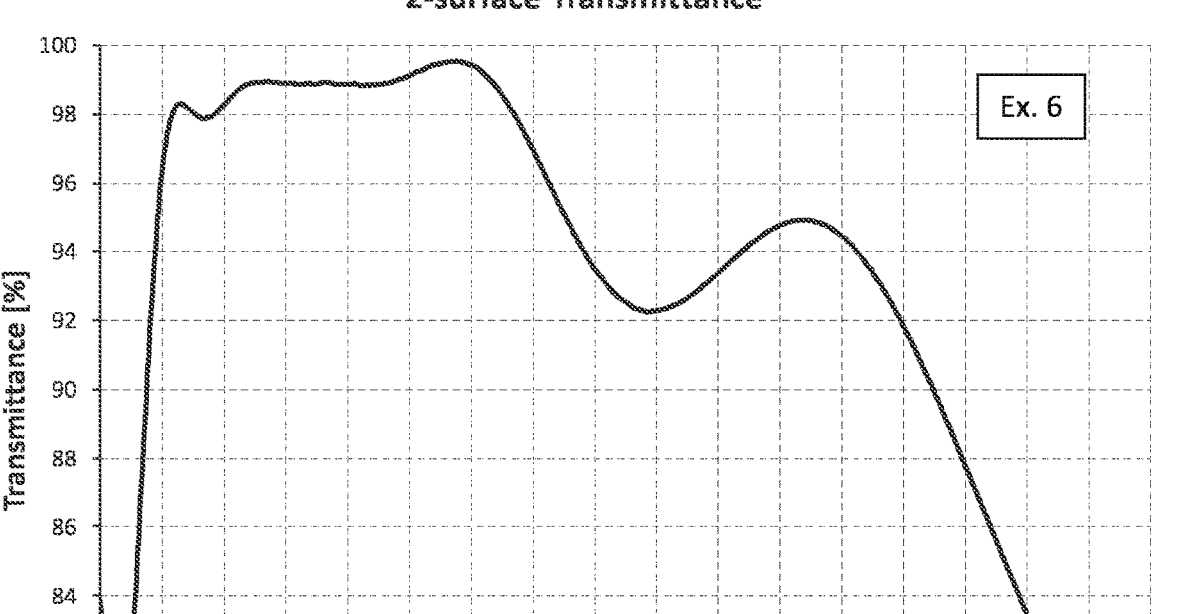
FIGS. 8A and 8C are plots of modeled, two-surface transmittance and reflectance, respectively, vs. wavelength at normal incidence of a cover glass article according to Example 6 of the disclosure.
Figure 8B:
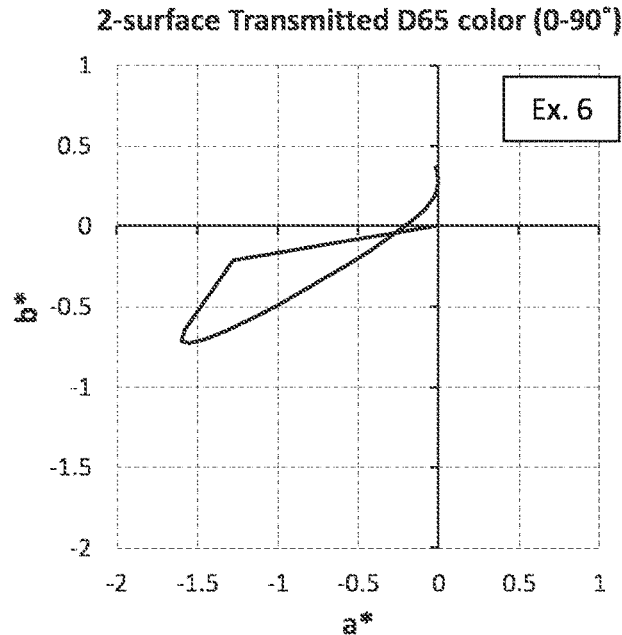
FIGS. 8B and 8D are plots of modeled, two-surface transmitted and reflected color, respectively, for all incidence angles from 0-90 degrees according to Example 6 of the disclosure.
Figure 8C:
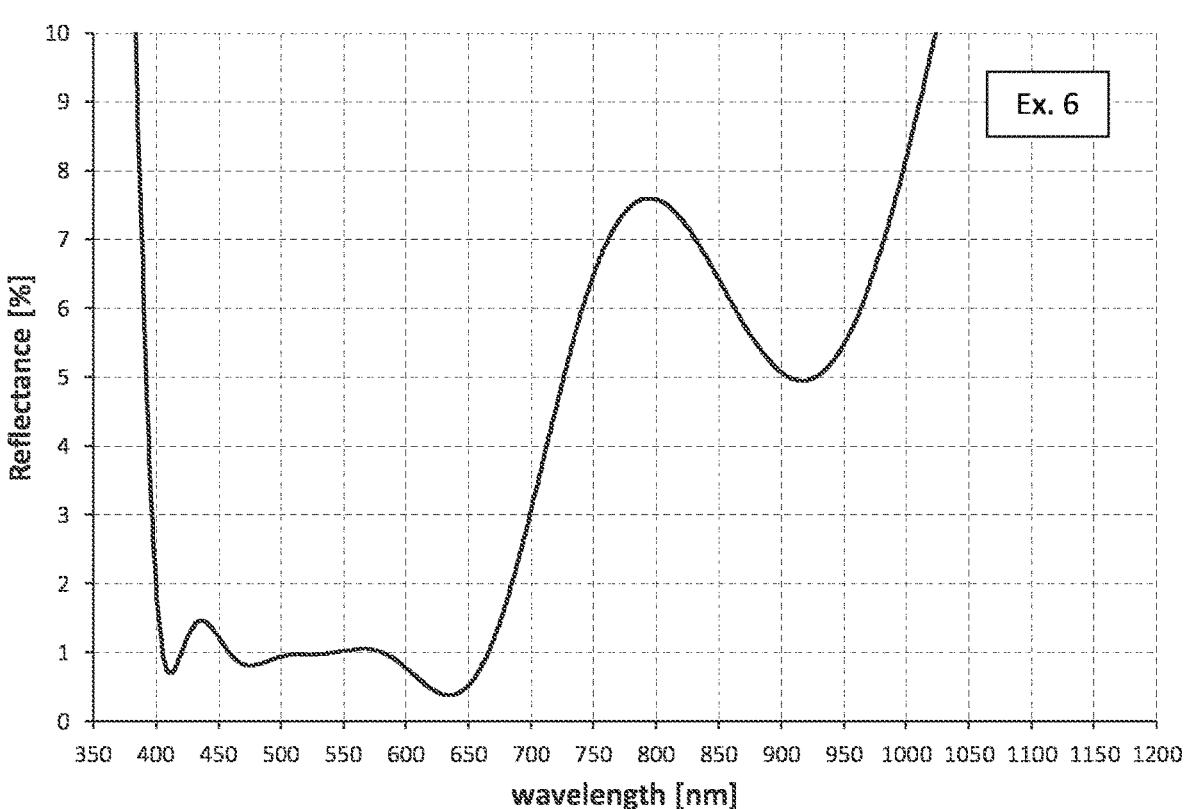
Figure 8D:
Figure 8D:
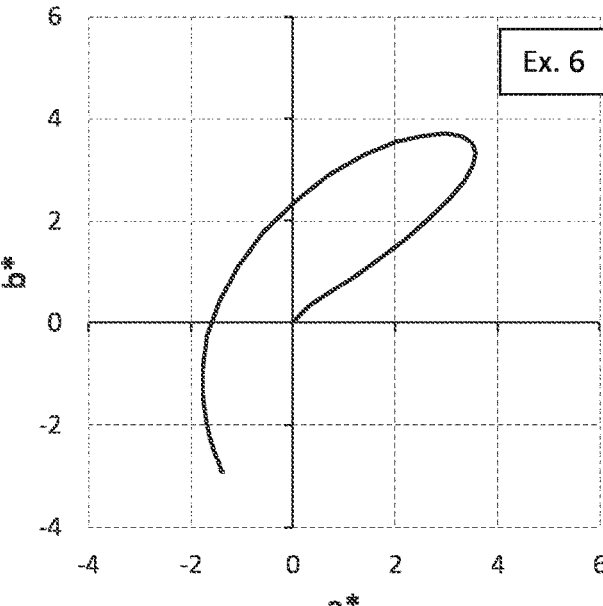

As shown in FIGS. 8A and 8C, plots are provided of modeled, two-surface transmittance and reflectance, respectively, vs. wavelength at normal incidence of the cover glass article according to this example. Further, as shown in FIGS.

8B and 8D, plots are provided of modeled, two-surface transmitted and reflected color, respectively, for all incidence angles from 0-90 degrees of the cover glass article according to this example. As is evident from FIG. 81B, the cover glass article of this example has low transmitted color, less than $\sqrt{(a^{*2}+b^{*2})}=2$, over all incidence angles from 0 to 90 degrees, and less than $\sqrt{(a^{*2}+b^{*2})}=0.5$ for incidence angles from 0 to 20 degrees.

TABLE 6

Ex. 6 cover glass article design

| Medium Type | Layer | Material | Refractive Index @550 nm | Extinction Coefficient @550 nm | Physical Thickness (nm) |
|---|---|---|---|---|---|
| Incident | | Air | 1.00 | 0 | |
| Front | 1 | SiO$_2$ | 1.476 | 0 | 89.41 |
| Coating | 2 | SiN$_x$ | 2.058 | 0.00002 | 146.34 |
| | 3 | SiO$_2$ | 1.476 | 0 | 11.24 |
| | 4 | SiN$_x$ | 2.058 | 0.00002 | 270 |
| | 5 | SiO$_2$ | 1.476 | 0 | 31.04 |
| | 6 | SiN$_x$ | 2.014 | 0.00003 | 19.91 |

TABLE 6-continued

Ex. 6 cover glass article design

| Medium Type | Layer | Material | Refractive Index @550 nm | Extinction Coefficient @550 nm | Physical Thickness (nm) |
|---|---|---|---|---|---|
| | 7 | SiO$_2$ | 1.476 | 0 | 25 |
| Substrate | 8 | 2320 Glass | 1.508 | 0 | 0.4 mm |
| Rear | 9 | Nb$_2$O$_5$ | 2.326 | 0 | 9.98 |
| Coating | 10 | SiO$_2$ | 1.460 | 0 | 41.59 |
| | 11 | Nb$_2$O$_5$ | 2.326 | 0 | 26.49 |
| | 12 | SiO$_2$ | 1.460 | 0 | 14.6 |
| | 13 | Nb$_2$O$_5$ | 2.326 | 0 | 91.02 |
| | 14 | SiO$_2$ | 1.460 | 0 | 16.48 |
| | 15 | Nb$_2$O$_5$ | 2.326 | 0 | 21.3 |
| | 16 | MgF$_2$ | 1.381 | 0 | 80.07 |
| | 17 | Al$_2$O$_3$ | 1.636 | 0 | 10 |
| Emergent | | Air | 1.00 | 0 | |

TABLE 6A

Optical properties of Ex. 6

| (values in %) | 0° | 10° | 20° | 30° | 40° | 50° | 60° | 70° | 80° |
|---|---|---|---|---|---|---|---|---|---|
| Tx(400-700 nm) | 98.72 | 98.72 | 98.65 | 98.34 | 97.47 | 95.26 | 89.83 | 76.69 | 47.77 |
| Tx(350-750 nm) | 96.60 | 96.62 | 96.65 | 96.53 | 95.93 | 94.07 | 89.04 | 76.30 | 47.64 |
| Tx(840-860 nm) | 93.37 | 93.42 | 93.54 | 93.60 | 93.20 | 91.32 | 85.84 | 72.56 | 44.65 |
| Tx(930-950 nm) | 94.67 | 94.55 | 94.08 | 92.96 | 90.68 | 86.51 | 79.23 | 66.12 | 40.99 |
| Rx(photopic, Y) | 0.93 | 0.91 | 0.90 | 1.03 | 1.6 | 3.2 | 8.6 | 21.9 | 51.3 |

Example 7

A cover glass article was prepared for this example with the structure delineated below in Table 7. The outer optical film structure has 19 layers (Layers 1-19) with a measured maximum indentation hardness of greater than 15 GPa, and a hardness at 500 nm indentation depth that is greater than 14 GPa.

Optical properties measured for this example are summarized in Table 7A below. In particular, optical transmission vs. wavelength range data are reported. As is evident from Table 7A, this example has a 2-surface average transmission (Tx)>98.5% in a wavelength range from 400 to 700 nm and from 0 to 20 degrees incidence, Tx>92.0% from 840 to 860 nm from 0 to 20 degrees incidence, Tx>92.5% from 930 to 950 nm from 0 to 20 degrees incidence, and average photopic reflectance (Y), Rx<1.3% from 0 to 10 degrees incidence.

Figure 9A:
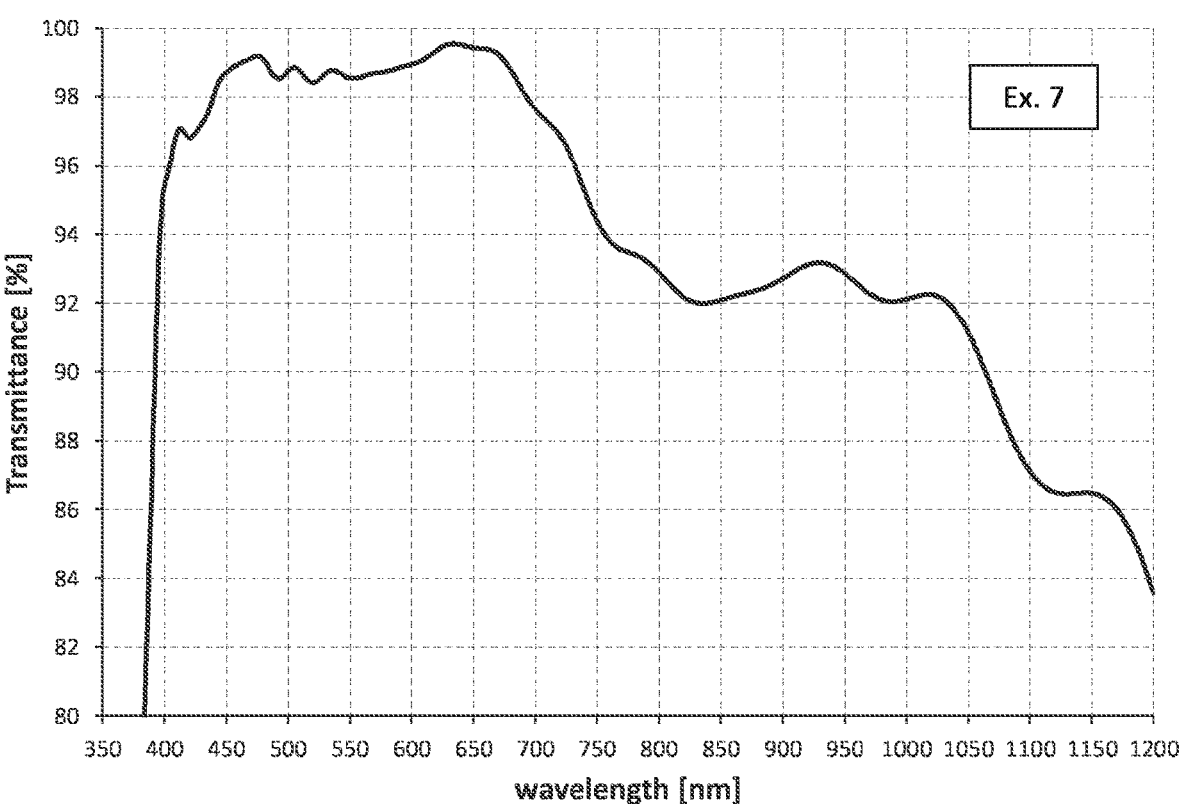
FIGS. 9A and 9C are plots of modeled, two-surface transmittance and reflectance, respectively, vs. wavelength at normal incidence of a cover glass article according to Example 7 of the disclosure.
Figure 9B:
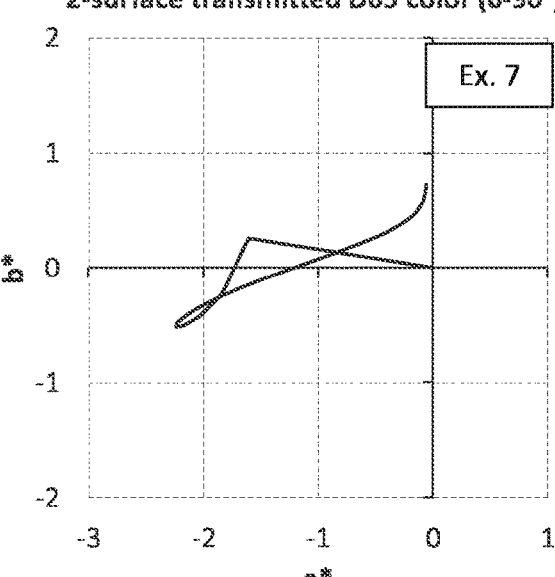
FIGS. 9B and 9D are plots of modeled, two-surface transmitted and reflected color, respectively, for all incidence angles from 0-90 degrees according to Example 7 of the disclosure.
Figure 9C:
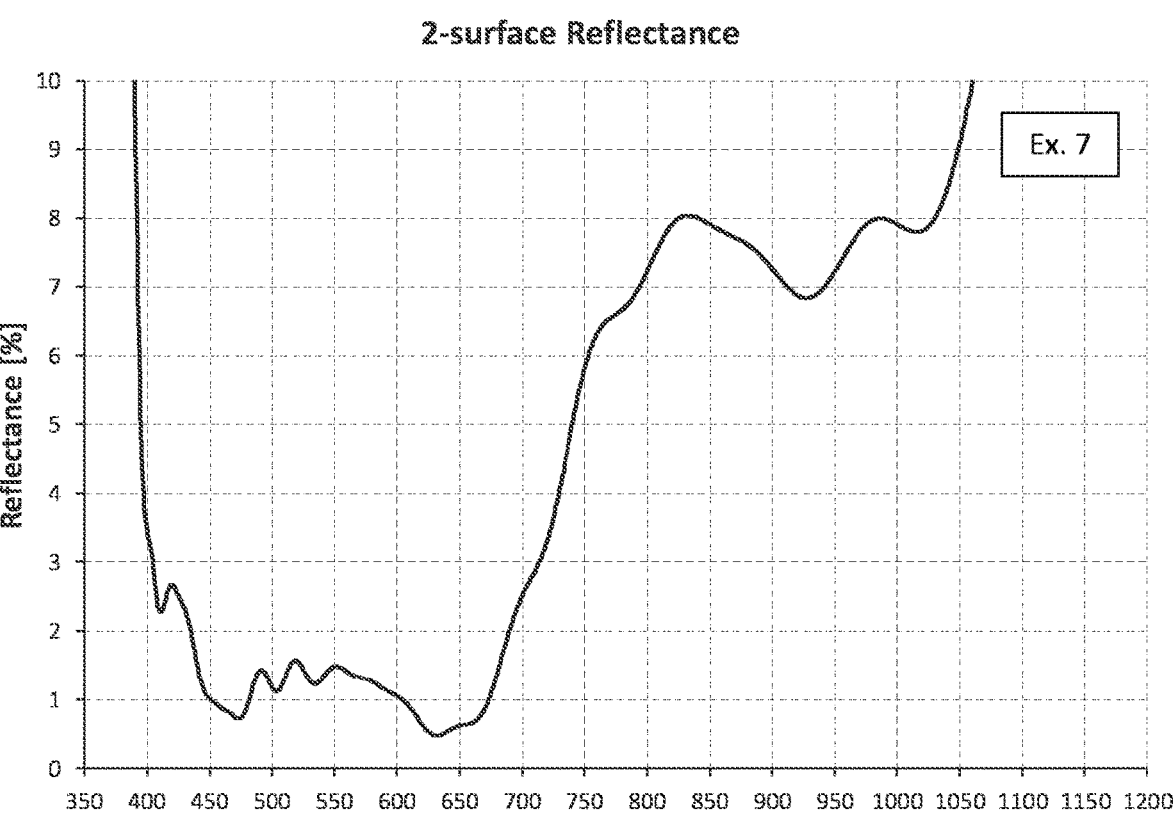
Figure 9D:
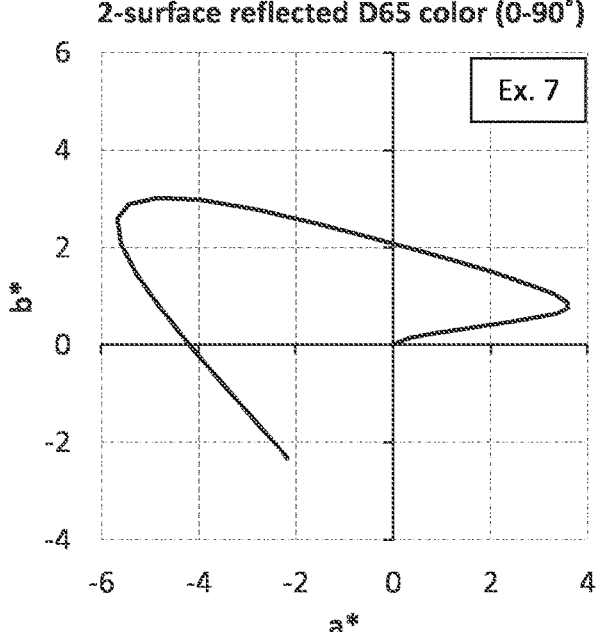

As shown in FIGS. 9A and 9C, plots are provided of modeled, two-surface transmittance and reflectance, respectively, vs. wavelength at normal incidence of the cover glass article according to this example. Further, as shown in FIGS. 9B and 9D, plots are provided of modeled, two-surface transmitted and reflected color, respectively, for all incidence angles from 0-90 degrees of the cover glass article according to this example. As is evident from FIG. 9B, the cover glass article of this example has low transmitted color, less than $\sqrt{(a^{*2}+b^{*2})}=2.5$, over all incidence angles from 0 to 90 degrees, and less than $\sqrt{(a^{*2}+b^{*2})}=1.0$ for incidence angles from 0 to 20 degrees.

TABLE 7-continued

| | | | Refractive Index @550 nm | Extinction Coefficient @550 nm | Physical Thickness (nm) |
|---|---|---|---|---|---|
| Medium Type | Layer | Material | | | |
| Substrate | 20 | 7321 Glass | 1.512 | 0.00000 | 0.4 mm |
| Rear | 21 | SiO₂ | 1.476 | 0.00000 | 13.72 |
| Coating | 22 | SiNₓ | 2.058 | 0.00002 | 10.58 |
| | 23 | SiO₂ | 1.476 | 0.00000 | 56.73 |
| | 24 | SiNₓ | 2.058 | 0.00002 | 12.93 |
| | 25 | SiO₂ | 1.476 | 0.00000 | 8.09 |
| | 26 | SiNₓ | 2.058 | 0.00002 | 12.18 |
| | 27 | SiO₂ | 1.476 | 0.00000 | 43.31 |
| | 28 | SiNₓ | 2.058 | 0.00002 | 14.72 |
| | 29 | SiO₂ | 1.476 | 0.00000 | 30.56 |
| | 30 | SiNₓ | 2.058 | 0.00002 | 14.03 |
| | 31 | SiO₂ | 1.476 | 0.00000 | 8.51 |
| | 32 | SiNₓ | 2.058 | 0.00002 | 8.55 |
| | 33 | SiO₂ | 1.476 | 0.00000 | 45.64 |
| | 34 | SiNₓ | 2.058 | 0.00002 | 37.96 |
| | 35 | SiO₂ | 1.476 | 0.00000 | 28.88 |
| | 36 | SiNₓ | 2.058 | 0.00002 | 157.91 |
| | 37 | SiO₂ | 1.476 | 0.00000 | 93.65 |
| Emergent | | Air | 1.00 | 0 | |

TABLE 7A

| | | | | | | | | | |
|---|---|---|---|---|---|---|---|---|---|
| Optical properties of Ex. 7 | | | | | | | | | |
| (values in %) | 0° | 10° | 20° | 30° | 40° | 50° | 60° | 70° | 80° |
| Tx(400-700 nm) | 98.59 | 98.58 | 98.52 | 98.23 | 97.36 | 95.06 | 89.44 | 76.07 | 47.16 |
| Tx(350-750 nm) | 93.72 | 93.94 | 94.52 | 95.17 | 95.31 | 93.85 | 88.88 | 76.01 | 47.35 |
| Tx(840-860 nm) | 92.09 | 92.09 | 92.06 | 91.83 | 91.14 | 89.51 | 84.39 | 71.15 | 43.91 |
| Tx(930-950 nm) | 93.06 | 92.98 | 92.59 | 91.65 | 90.13 | 87.72 | 81.88 | 68.49 | 42.30 |
| Rx(photopic, Y) | 1.22 | 1.23 | 1.26 | 1.45 | 2.1 | 4.1 | 9.4 | 23.3 | 52.2 |

TABLE 7

| | | | Refractive Index @550 nm | Extinction Coefficient @550 nm | Physical Thickness (nm) |
|---|---|---|---|---|---|
| Medium Type | Layer | Material | | | |
| Incident | | Air | 1.00 | 0 | |
| Front | 1 | SiO₂ | 1.467 | 0.00000 | 87.8 |
| Coating | 2 | AlNₓ/SiAlₓNᵧ | 2.122 | 0.00000 | 155.43 |
| | 3 | SiO₂ | 1.467 | 0.00000 | 26.8 |
| | 4 | AlNₓ/SiAlₓNᵧ | 2.122 | 0.00000 | 43.65 |
| | 5 | SiO₂ | 1.467 | 0.00000 | 40.46 |
| | 6 | AlNₓ/SiAlₓNᵧ | 2.122 | 0.00000 | 33.17 |
| | 7 | SiO2 | 1.467 | 0.00000 | 49.82 |
| | 8 | AlNₓ/SiAlₓNᵧ | 2.122 | 0.00000 | 38.7 |
| | 9 | SiO₂ | 1.467 | 0.00000 | 21.12 |
| | 10 | AlNₓ/SiAlₓNᵧ | 2.122 | 0.00000 | 1500 |
| | 11 | SiO₂ | 1.467 | 0.00000 | 8 |
| | 12 | AlNₓ/SiAlₓNᵧ | 2.122 | 0.00000 | 41.72 |
| | 13 | SiO₂ | 1.467 | 0.00000 | 21.68 |
| | 14 | AlNₓ/SiAlₓNᵧ | 2.122 | 0.00000 | 29 |
| | 15 | SiO₂ | 1.467 | 0.00000 | 38.34 |
| | 16 | AlNₓ/SiAlₓNᵧ | 2.122 | 0.00000 | 17.66 |
| | 17 | SiO₂ | 1.467 | 0.00000 | 54.33 |
| | 18 | AlNₓ/SiAlₓNᵧ | 2.122 | 0.00000 | 8 |
| | 19 | SiO₂ | 1.467 | 0.00000 | 20 |

Example 8

A cover glass article was prepared for this example with the structure delineated below in Table 8. The outer optical film structure has 11 layers (Layers 1-11) with a measured maximum indentation hardness of greater than 14 GPa, and a hardness at 500 nm indentation depth that is greater than 10 GPa.

Optical properties measured for this example are summarized in Table 8A below. In particular, optical transmission vs. wavelength range data are reported. As is evident from Table 8A, this example has a 2-surface average transmission (Tx)>98.0% in a wavelength range from 400 to 700 nm and from 0 to 20 degrees incidence, Tx>⁹1.0% from 840 to 860 nm from 0 to 40 degrees incidence, Tx>93.0% from 930 to 950 nm from 0 to 10 degrees incidence, and average photopic reflectance (Y), Rx<1% from 0 to 10 degrees incidence.

Figure 10A:
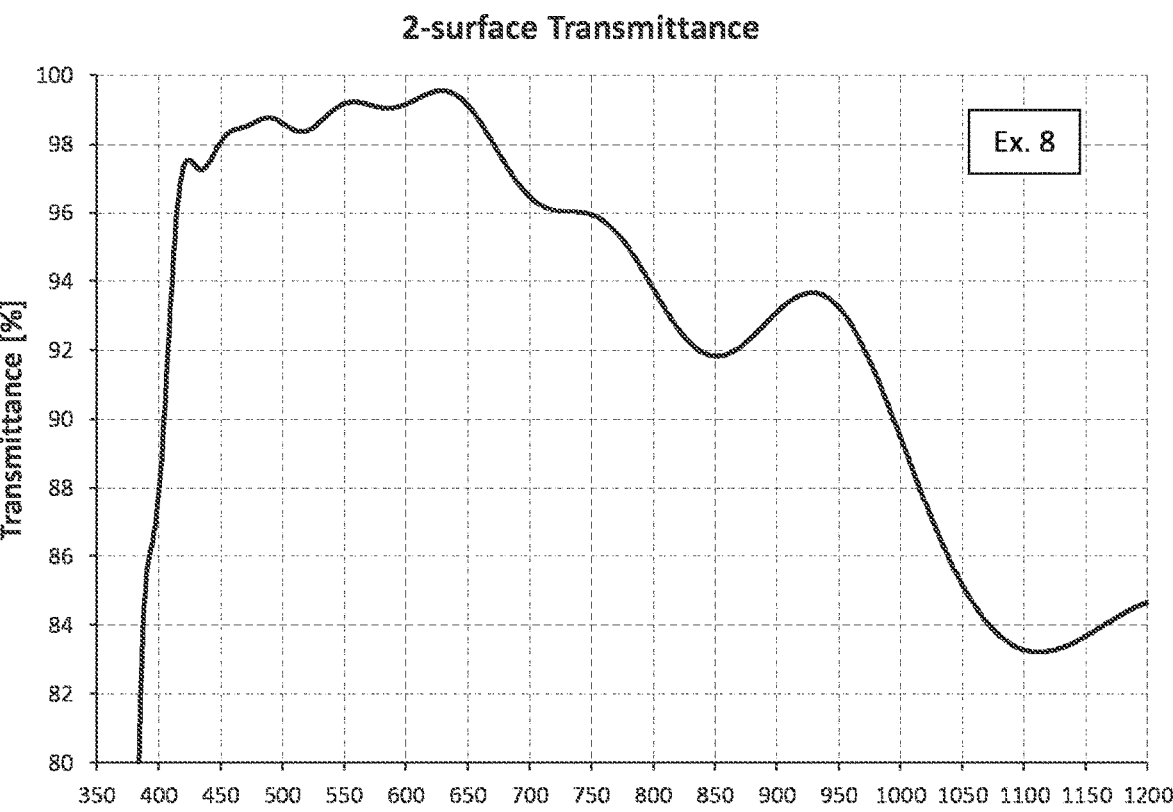
FIGS. 10A and 10C are plots of modeled, two-surface transmittance and reflectance, respectively, vs. wavelength at normal incidence of a cover glass article according to Example 8 of the disclosure.
Figure 10B:
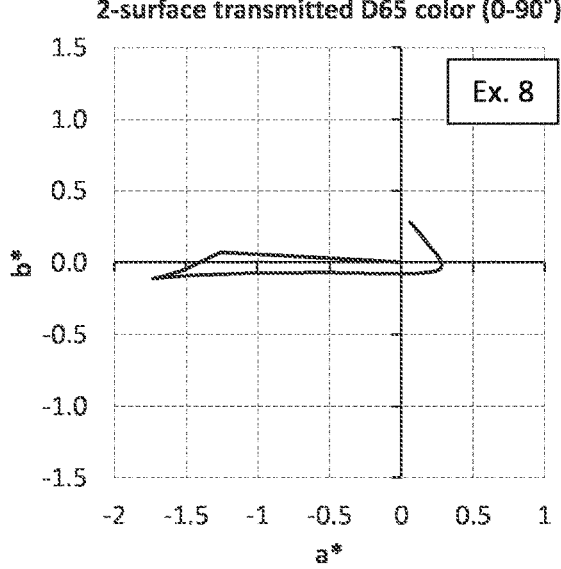
FIGS. 10B and 10D are plots of modeled, two-surface transmitted and reflected color, respectively, for all incidence angles from 0-90 degrees according to Example 8 of the disclosure.
Figure 10C:
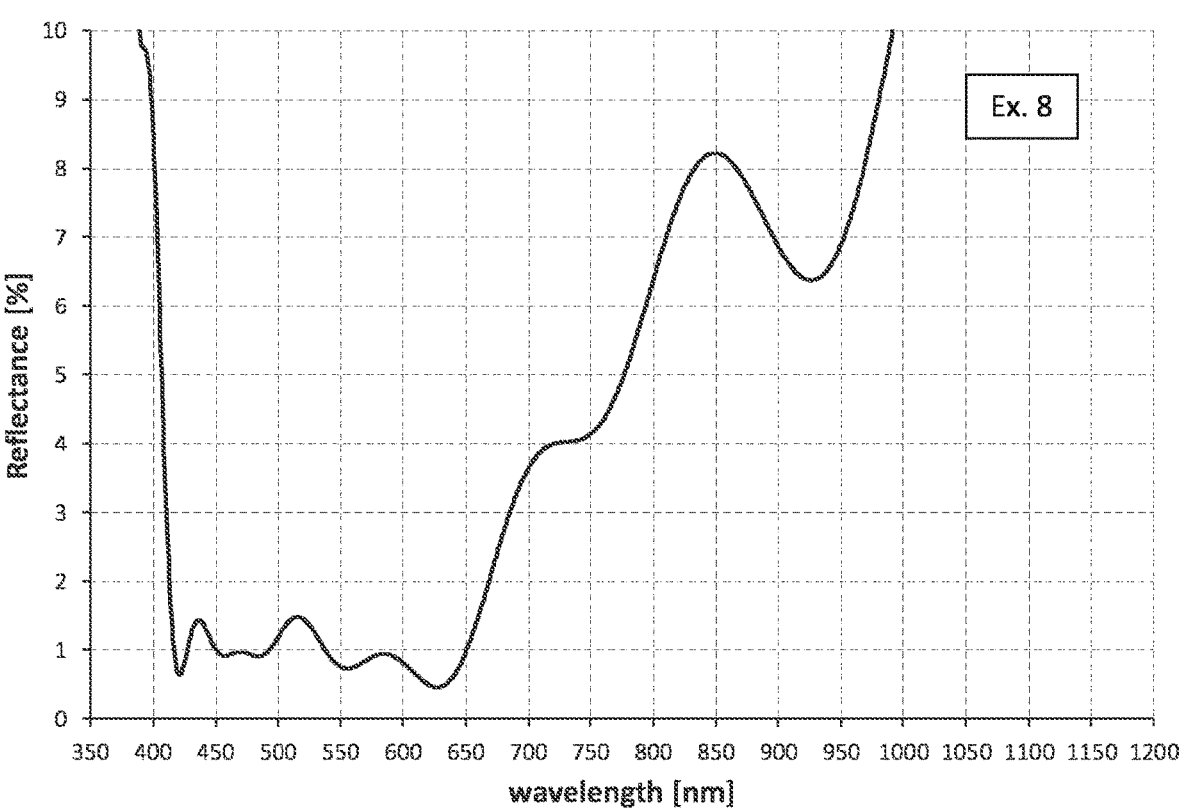
Figure 10D:
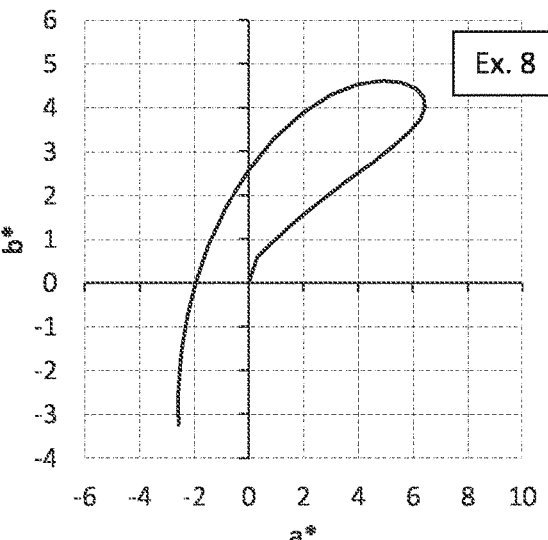

As shown in FIGS. 10A and 10C, plots are provided of modeled, two-surface transmittance and reflectance, respectively, vs. wavelength at normal incidence of the cover glass article according to this example. Further, as shown in FIGS. 10B and 10D, plots are provided of modeled, two-surface transmitted and reflected color, respectively, for all incidence angles from 0-90 degrees of the cover glass article according to this example. As is evident from FIG. 10B, the cover glass article of this example has low transmitted color, less than $\sqrt{(a^{*2}+b^{*2})}=2$, over all incidence angles from 0 to 90 degrees, and less than $\sqrt{(a^{*2}+b^{*2})}=0.5$ for incidence angles from 0 to 20 degrees.

TABLE 8

Ex. 8 cover glass article design

| Medium Type | Layer | Material | Refractive Index @550 nm | Extinction Coefficient @550 nm | Physical Thickness (nm) |
|---|---|---|---|---|---|
| Incident | | Air | 1.00 | 0 | |
| Front | 1 | SiO$_2$ | 1.476 | 0.00000 | 87.85 |
| Coating | 2 | SiN$_x$ | 2.058 | 0.00002 | 149.25 |
| | 3 | SiO$_2$ | 1.476 | 0.00000 | 8.14 |
| | 4 | SiN$_x$ | 2.058 | 0.00002 | 628.2 |
| | 5 | SiO$_2$ | 1.476 | 0.00000 | 8.5 |
| | 6 | SiN$_x$ | 2.058 | 0.00002 | 62.18 |
| | 7 | SiO$_2$ | 1.476 | 0.00000 | 28.94 |
| | 8 | SiN$_x$ | 2.058 | 0.00002 | 32.18 |
| | 9 | SiO$_2$ | 1.476 | 0.00000 | 66.06 |
| | 10 | SiN$_x$ | 2.058 | 0.00002 | 10.42 |
| | 11 | SiO$_2$ | 1.476 | 0.00000 | 54.41 |
| Substrate | 12 | 7321 Glass | 1.512 | 0.00000 | 0.4 mm |
| Rear | 13 | SiO$_2$ | 1.476 | 0.00000 | 13.72 |
| Coating | 14 | SiN$_x$ | 2.058 | 0.00002 | 10.58 |
| | 15 | SiO$_2$ | 1.476 | 0.00000 | 56.73 |
| | 16 | SiN$_x$ | 2.058 | 0.00002 | 12.93 |
| | 17 | SiO$_2$ | 1.476 | 0.00000 | 8.09 |
| | 18 | SiN$_x$ | 2.058 | 0.00002 | 12.18 |
| | 19 | SiO$_2$ | 1.476 | 0.00000 | 43.31 |
| | 20 | SiN$_x$ | 2.058 | 0.00002 | 14.72 |
| | 21 | SiO$_2$ | 1.476 | 0.00000 | 30.56 |
| | 22 | SiN$_x$ | 2.058 | 0.00002 | 14.03 |
| | 23 | SiO$_2$ | 1.476 | 0.00000 | 8.51 |
| | 24 | SiN$_x$ | 2.058 | 0.00002 | 8.55 |
| | 25 | SiO$_2$ | 1.476 | 0.00000 | 45.64 |
| | 26 | SiN$_x$ | 2.058 | 0.00002 | 37.96 |
| | 27 | SiO$_2$ | 1.476 | 0.00000 | 28.88 |
| | 28 | SiN$_x$ | 2.058 | 0.00002 | 157.91 |
| | 29 | SiO$_2$ | 1.476 | 0.00000 | 93.65 |
| Emergent | | Air | 1.00 | 0 | |

TABLE 8A

Optical properties of Ex. 8

| (values in %) | 0° | 10° | 20° | 30° | 40° | 50° | 60° | 70° | 80° |
|---|---|---|---|---|---|---|---|---|---|
| Tx(400-700 nm) | 98.20 | 98.21 | 98.19 | 97.92 | 97.05 | 94.84 | 89.39 | 76.14 | 47.20 |
| Tx(350-750 nm) | 93.62 | 93.80 | 94.26 | 94.77 | 94.83 | 93.41 | 88.43 | 75.50 | 46.87 |
| Tx(840-860 nm) | 91.85 | 91.79 | 91.67 | 91.60 | 91.34 | 89.70 | 84.20 | 70.86 | 43.67 |
| Tx(930-950 nm) | 93.50 | 93.36 | 92.78 | 91.25 | 88.22 | 83.42 | 76.64 | 65.48 | 42.06 |
| Rx(photopic, Y) | 0.97 | 0.96 | 0.97 | 1.15 | 1.9 | 3.9 | 9.4 | 23.0 | 52.4 |

Example 9

A cover glass article was prepared for this example with the structure delineated below in Table 9. The outer optical film structure has 19 layers (Layers 1-19) with a measured maximum indentation hardness of greater than 15 GPa, and a hardness at 500 nm indentation depth that is greater than 14 GPa.

Optical properties measured for this example are summarized in Table 9A below. In particular, optical transmission vs. wavelength range data are reported. As is evident from Table 9A, this example has a 2-surface average transmission (Tx)>98.0% in a wavelength range from 400 to 700 nm and from 0 to 20 degrees incidence, Tx>96.0% from 840 to 860 nm from 0 to 40 degrees incidence, Tx>96.0% from 930 to 950 nm from 0 to 10 degrees incidence, and average photopic reflectance (Y), Rx<1.2% from 0 to 10 degrees incidence.

Figure 11A:
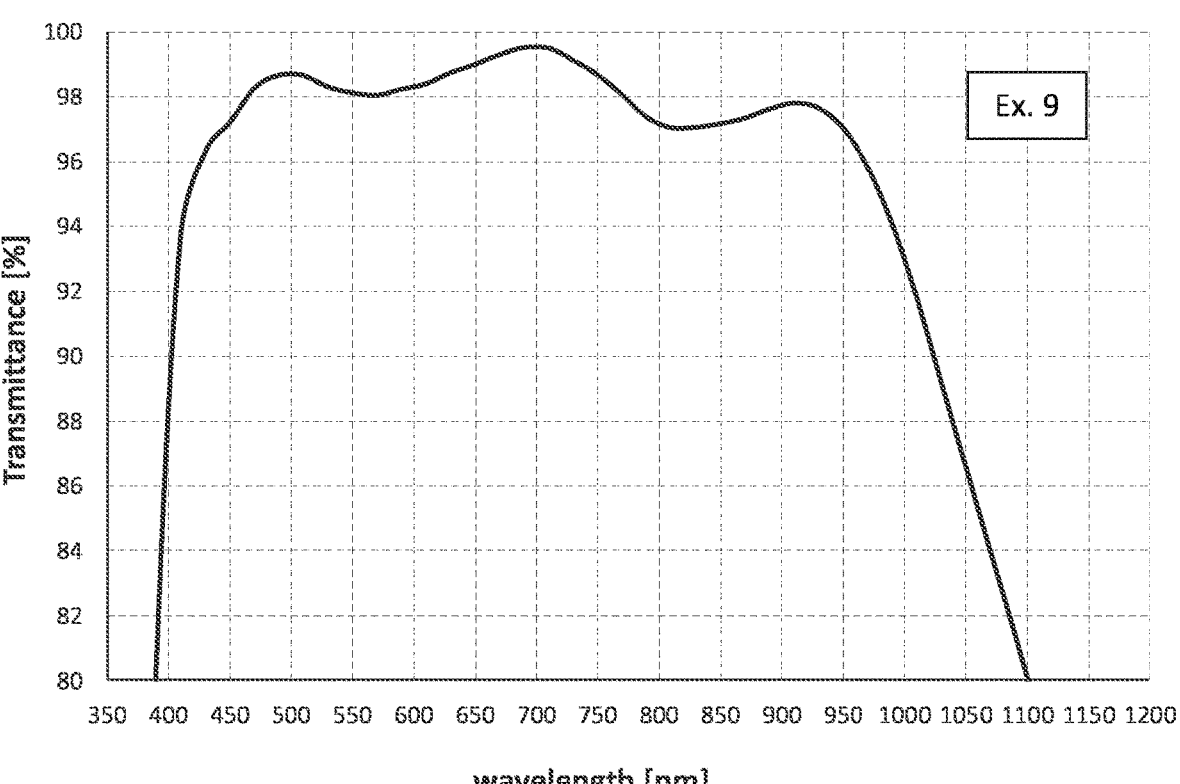
FIGS. 11A and 11C are plots of modeled, two-surface transmittance and reflectance, respectively, vs. wavelength at normal incidence of a cover glass article according to Example 9 of the disclosure.
Figure 11B:
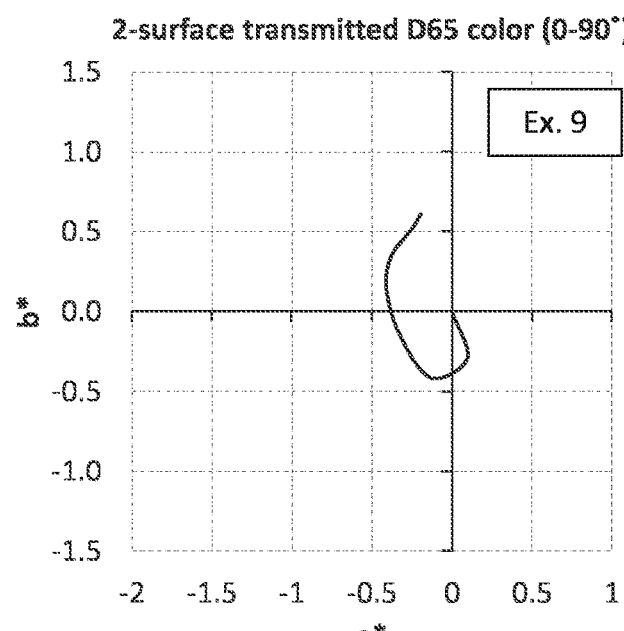
FIGS. 11B and 11D are plots of modeled, two-surface transmitted and reflected color, respectively, for all incidence angles from 0-90 degrees according to Example 9 of the disclosure.
Figure 11C:
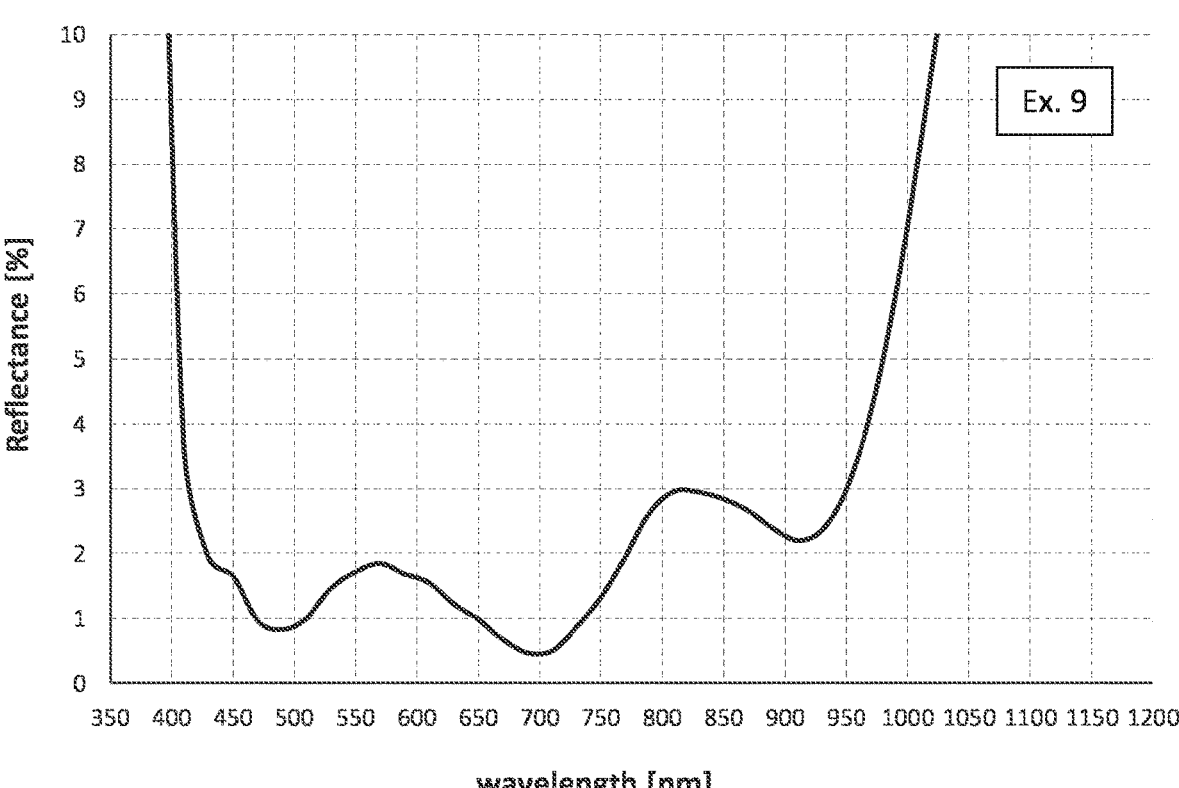
Figure 11D:
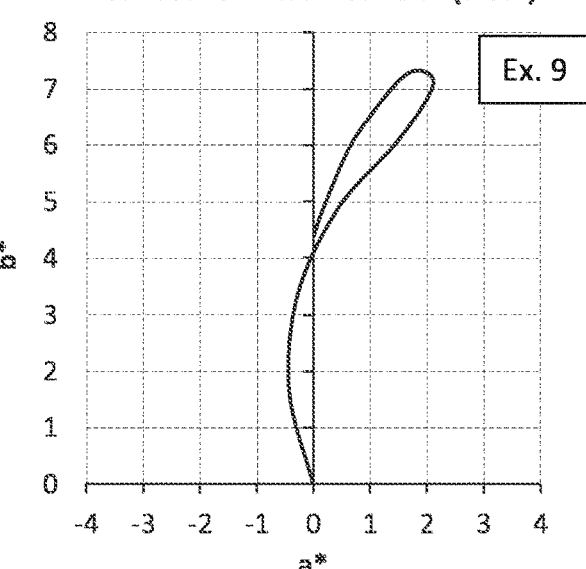

As shown in FIGS. 11A and 11C, plots are provided of modeled, two-surface transmittance and reflectance, respectively, vs. wavelength at normal incidence of the cover glass article according to this example. Further, as shown in FIGS. 11B and 11D, plots are provided of modeled, two-surface transmitted and reflected color, respectively, for all incidence angles from 0-90 degrees of the cover glass article according to this example. As is evident from FIG. 111B, the cover glass article of this example has low transmitted color, less than $\sqrt{(a^{*2}+b^{*2})}=0.7$, over all incidence angles from 0 to 90 degrees, and less than $\sqrt{(a^{*2}+b^{*2})}=0.7$ for incidence angles from 0 to 20 degrees.

TABLE 9

Ex. 9 cover glass article design

| Medium Type | Layer | Material | Refractive Index @550 nm | Extinction Coefficient @550 nm | Physical Thickness (nm) |
|---|---|---|---|---|---|
| Incident | | Air | 1.00 | 0 | |
| Front | 1 | SiO$_2$ | 1.476 | 0 | 89.4 |
| Coating | 2 | SiN$_x$ | 2.014 | 0.00003 | 152.6 |
| | 3 | SiO$_2$ | 1.476 | 0 | 44.7 |
| | 4 | SiN$_x$ | 2.014 | 0.00003 | 24.9 |
| | 5 | SiO$_2$ | 1.476 | 0 | 81.1 |
| | 6 | SiN$_x$ | 2.014 | 0.00003 | 25.2 |
| | 7 | SiO$_2$ | 1.476 | 0 | 46.3 |
| | 8 | SiN$_x$ | 2.014 | 0.00003 | 38.4 |
| | 9 | SiO$_2$ | 1.476 | 0 | 14.6 |
| | 10 | SiO$_x$N$_y$ | 1.943 | 0.00004 | 2000 |
| | 11 | SiO$_2$ | 1.476 | 0 | 8 |
| | 12 | SiO$_x$N$_y$ | 1.943 | 0.00004 | 56.1 |
| | 13 | SiO$_2$ | 1.476 | 0 | 26.7 |
| | 14 | SiO$_x$N$_y$ | 1.943 | 0.00004 | 39.3 |
| | 15 | SiO$_2$ | 1.476 | 0 | 50.8 |
| | 16 | SiO$_x$N$_y$ | 1.943 | 0.00004 | 21.6 |
| | 17 | SiO$_2$ | 1.476 | 0 | 67.1 |
| | 18 | SiO$_x$N$_y$ | 1.943 | 0.00004 | 8.1 |
| | 19 | SiO$_2$ | 1.476 | 0 | 20 |

TABLE 9-continued

Ex. 9 cover glass article design

| Medium Type | Layer | Material | Refractive Index @550 nm | Extinction Coefficient @550 nm | Physical Thickness (nm) |
|---|---|---|---|---|---|
| Substrate | 20 | 2320 Glass | 1.508 | 0 | 0.4 mm |
| Rear | 21 | SiO$_2$ | 1.451 | 0 | 203.7 |
| Coating | 22 | Nb$_2$O$_5$ | 2.351 | 0 | 11.4 |
| | 23 | SiO$_2$ | 1.451 | 0 | 56.7 |
| | 24 | Nb$_2$O$_5$ | 2.351 | 0 | 22.8 |
| | 25 | SiO$_2$ | 1.451 | 0 | 55.3 |
| | 26 | Nb$_2$O$_5$ | 2.351 | 0 | 15.0 |
| | 27 | SiO$_2$ | 1.451 | 0 | 229.6 |
| | 28 | Nb$_2$O$_5$ | 2.351 | 0 | 18.8 |

TABLE 9-continued

| | | | Refractive Index @550 nm | Extinction Coefficient @550 nm | Physical Thickness (nm) |
|---|---|---|---|---|---|
| Medium Type | Layer | Material | | | |
| | 29 | $SiO_2$ | 1.451 | 0 | 28.9 |
| | 30 | $Nb_2O_5$ | 2.351 | 0 | 83.1 |
| | 31 | $SiO_2$ | 1.451 | 0 | 8.9 |
| | 32 | $Nb_2O_5$ | 2.351 | 0 | 28.8 |
| | 33 | $SiO_2$ | 1.451 | 0 | 94.2 |
| Emergent | | Air | 1.00 | 0 | |

*Ex. 9 cover glass article design*

TABLE 9A

Optical properties of Ex. 9

| (values in %) | 0° | 10° | 20° | 30° | 40° | 50° | 60° | 70° | 80° |
|---|---|---|---|---|---|---|---|---|---|
| Tx(400-700 nm) | 98.2 | 98.2 | 98.2 | 97.9 | 97.1 | 94.9 | 89.4 | 76.0 | 47.1 |
| Tx(350-750 nm) | 93.8 | 94.1 | 94.8 | 95.6 | 95.6 | 93.9 | 88.8 | 75.9 | 47.0 |
| Tx(840-860 nm) | 96.6 | 96.6 | 96.7 | 96.8 | 96.3 | 93.5 | 85.7 | 69.4 | 40.9 |
| Tx(930-950 nm) | 96.3 | 96.1 | 95.3 | 93.2 | 88.5 | 80.7 | 70.7 | 57.4 | 35.6 |
| Rx(photopic, Y) | 1.18 | 1.18 | 1.25 | 1.50 | 2.3 | 4.5 | 10.1 | 23.5 | 52.5 |

Example 10

A cover glass article was prepared for this example with the structure delineated below in Table 10. The outer optical film structure has 19 layers (Layers 1-19) with a measured maximum indentation hardness of greater than 15 GPa, and a hardness at 500 nm indentation depth that is greater than 14 GPa.

Optical properties measured for this example are summarized in Table 10A below. In particular, optical transmission vs. wavelength range data are reported. As is evident from Table 10A, this example has a 2-surface average transmission (Tx)>98.0% in a wavelength range from 400 to 700 nm and from 0 to 20 degrees incidence, Tx>98.0% from 840 to 860 nm from 0 to 10 degrees incidence, Tx>96.5% from 930 to 950 nm from 0 to 10 degrees incidence, and average photopic reflectance (Y), Rx<1.4% from 0 to 10 degrees incidence.

Figure 12A:
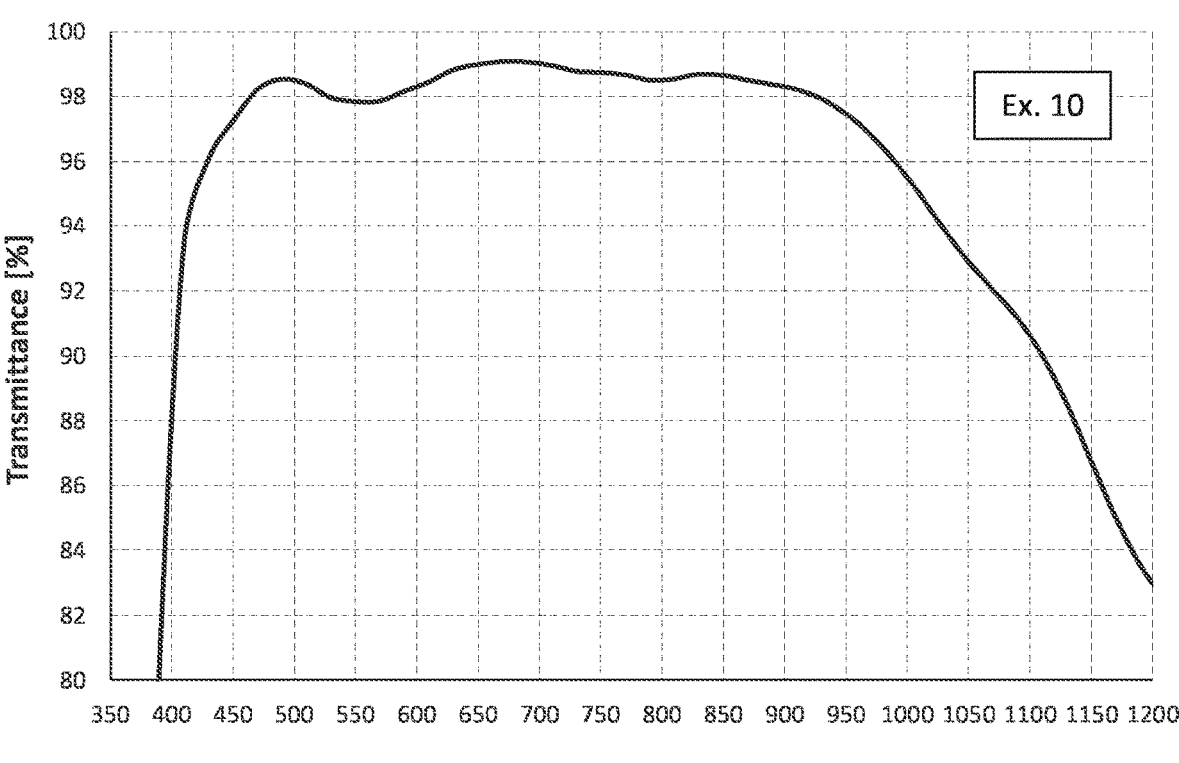
FIGS. 12A and 12C are plots of modeled, two-surface transmittance and reflectance, respectively, vs. wavelength at normal incidence of a cover glass article according to Example 10 of the disclosure.
Figure 12B:
FIGS. 12B and 12D are plots of modeled, two-surface transmitted and reflected color, respectively, for all incidence angles from 0-90 degrees according to Example 10 of the disclosure.
Figure 12B:
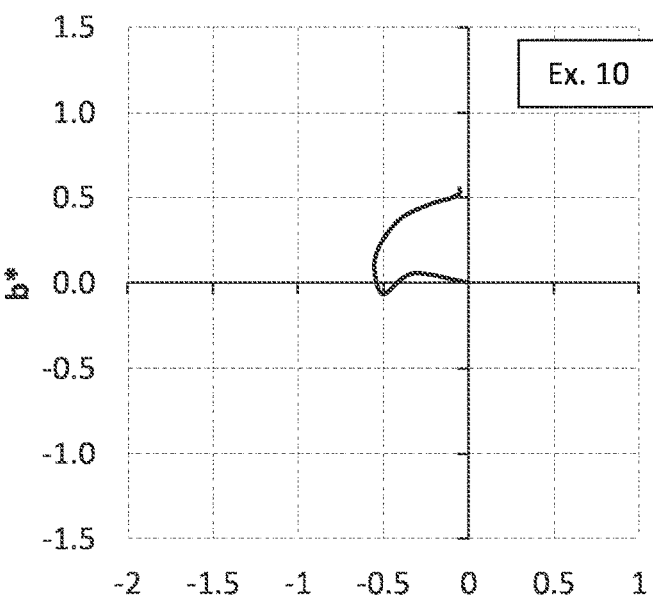
Figure 12C:
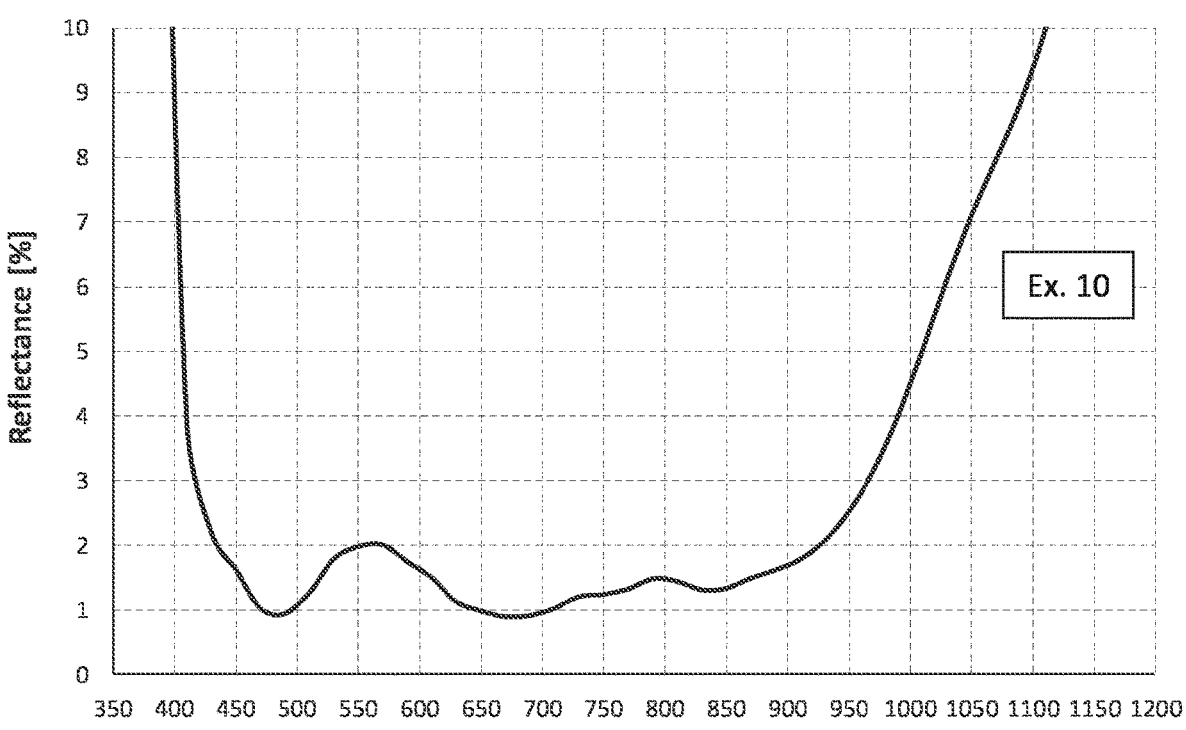
Figure 12D:
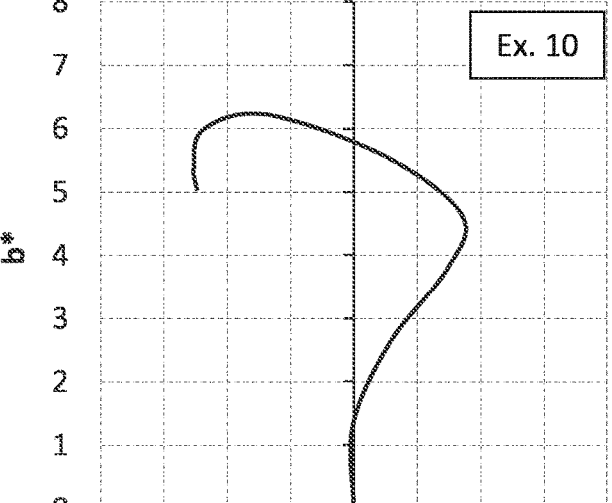

As shown in FIGS. 12A and 12C, plots are provided of modeled, two-surface transmittance and reflectance, respectively, vs. wavelength at normal incidence of the cover glass article according to this example. Further, as shown in FIGS. 12B and 12D, plots are provided of modeled, two-surface transmitted and reflected color, respectively, for all incidence angles from 0-90 degrees of the cover glass article according to this example. As is evident from FIG. 12B, the cover glass article of this example has low transmitted color, less than $\sqrt{(a*^2+b*^2)}=0.6$, over all incidence angles from 0 to 90 degrees, and less than $\sqrt{(a*^2+b*^2)}=0.6$ for incidence angles from 0 to 20 degrees.

TABLE 10

Ex. 10 cover glass article design

| Medium Type | Layer | Material | Refractive Index @550 nm | Extinction Coefficient @550 nm | Physical Thickness (nm) |
|---|---|---|---|---|---|
| Incident | | Air | 1.00 | 0 | |
| Front | 1 | $SiO_2$ | 1.476 | 0 | 89.4 |

TABLE 10-continued

Ex. 10 cover glass article design

| Medium Type | Layer | Material | Refractive Index @550 nm | Extinction Coefficient @550 nm | Physical Thickness (nm) |
|---|---|---|---|---|---|
| Coating | 2 | $SiN_x$ | 2.014 | 0.00003 | 152.6 |
| | 3 | $SiO_2$ | 1.476 | 0 | 44.7 |
| | 4 | $SiN_x$ | 2.014 | 0.00003 | 24.9 |
| | 5 | $SiO_2$ | 1.476 | 0 | 81.1 |

TABLE 10-continued

Ex. 10 cover glass article design

| Medium Type | Layer | Material | Refractive Index @550 nm | Extinction Coefficient @550 nm | Physical Thickness (nm) |
|---|---|---|---|---|---|
| | 6 | $SiN_x$ | 2.014 | 0.00003 | 25.2 |
| | 7 | $SiO_2$ | 1.476 | 0 | 46.3 |
| | 8 | $SiN_x$ | 2.014 | 0.00003 | 38.4 |
| | 9 | $SiO_2$ | 1.476 | 0 | 14.6 |
| | 10 | $SiO_xN_y$ | 1.943 | 0.00004 | 2000 |
| | 11 | $SiO_2$ | 1.476 | 0 | 8 |
| | 12 | $SiO_xN_y$ | 1.943 | 0.00004 | 56.1 |
| | 13 | $SiO_2$ | 1.476 | 0 | 26.7 |
| | 14 | $SiO_xN_y$ | 1.943 | 0.00004 | 39.3 |
| | 15 | $SiO_2$ | 1.476 | 0 | 50.8 |
| | 16 | $SiO_xN_y$ | 1.943 | 0.00004 | 21.6 |
| | 17 | $SiO_2$ | 1.476 | 0 | 67.1 |
| | 18 | $SiO_xN_y$ | 1.943 | 0.00004 | 8.1 |
| | 19 | $SiO_2$ | 1.476 | 0 | 20 |
| Substrate | 20 | 2320 Glass | 1.508 | 0 | 0.4 mm |
| Rear | 21 | $Ta_2O_5$ | 2.187 | 0 | 13.4 |
| Coating | 22 | $SiO_2$ | 1.462 | 0 | 42.1 |
| | 23 | $Ta_2O_5$ | 2.187 | 0 | 35.8 |
| | 24 | $SiO_2$ | 1.462 | 0 | 14.6 |
| | 25 | $Ta_2O_5$ | 2.187 | 0 | 87.2 |
| | 26 | $SiO_2$ | 1.462 | 0 | 19.9 |
| | 27 | $Ta_2O_5$ | 2.187 | 0 | 27.5 |
| | 28 | $MgF_2$ | 1.382 | 0 | 82.0 |
| | 29 | $SiO_2$ | 1.462 | 0 | 20.0 |
| Emergent | | Air | 1.00 | 0 | |

TABLE 10A

| | | | | Optical properties of Ex. 10 | | | | | |
|---|---|---|---|---|---|---|---|---|---|
| (values in %) | 0° | 10° | 20° | 30° | 40° | 50° | 60° | 70° | 80° |
| Tx(400-700 nm) | 98.0 | 98.0 | 98.0 | 97.8 | 97.1 | 95.1 | 90.1 | 77.3 | 48.3 |
| Tx(350-750 nm) | 94.4 | 94.5 | 95.0 | 95.7 | 95.6 | 94.3 | 89.6 | 76.9 | 48.0 |
| Tx(840-860 nm) | 98.0 | 98.0 | 97.8 | 97.3 | 96.2 | 93.5 | 87.3 | 73.7 | 45.2 |
| Tx(930-950 nm) | 96.6 | 96.5 | 95.9 | 94.7 | 92.4 | 88.3 | 81.8 | 68.5 | 42.1 |
| Rx(photopic, Y) | 1.35 | 1.35 | 1.38 | 1.55 | 2.2 | 4.1 | 9.2 | 22.2 | 51.3 |

As outlined herein, a first aspect of the disclosure is a cover glass article that includes: a substrate comprising an outer primary surface and an inner primary surface, wherein the outer primary surface and the inner primary surface are opposite of one another; the outer primary surface of the substrate has an outer optical film structure disposed thereon; and the inner primary surface of the substrate has an inner optical film structure disposed thereon. The outer optical film structure comprises a first plurality of alternating high index and low index layers, the first plurality comprising an outermost low index layer. Further, the inner optical film structure comprises a second plurality of alternating high index and low index layers, the second plurality comprising a low or high index layer disposed on the inner primary surface of the substrate, and an innermost low or high index layer. Each high index layer of the first plurality comprises a nitride or an oxynitride, and each high index layer of the second plurality comprises an oxide or a nitride. In addition, the cover glass article exhibits an average photopic transmittance of greater than 95%, as measured through the primary surfaces of the substrate at an incident angle from 0 to 40 degrees, and the cover glass article exhibits a maximum hardness of greater than 10 GPa, as measured by a Berkovich Hardness Test over an indentation depth range from about 100 nm to about 500 nm in the outer optical film structure.

As outlined herein, a second aspect of the disclosure is a cover glass article according to the first aspect, wherein the cover glass article further exhibits an infrared transmittance of greater than 85%, as measured from 840 nm to 860 nm or 930 nm to 950 nm through the primary surfaces of the substrate at an incident angle from 0 to 10 degrees.

As outlined herein, a third aspect of the disclosure is a cover glass article according to the first or the second aspects, wherein the first plurality of alternating high index and low index layers further comprises a low index layer in contact with the outer primary surface of the substrate, and further wherein the second plurality of alternating high index and low index layers comprises a low or high index layer in contact with the inner primary surface of the substrate.

As outlined herein, a fourth aspect of the disclosure is a cover glass article according to any one of the first through the third aspects, wherein the first plurality of alternating high index and low index layers further comprises a first scratch-resistant high index layer having a physical thickness of at least 50 nm.

As outlined herein, a fifth aspect of the disclosure is a cover glass article according to any one of the first through the fourth aspects, wherein each of the first and second plurality of alternating high index and low index layers is at least five (5) layers.

As outlined herein, a sixth aspect of the disclosure is a cover glass article according to any one of the first through the fifth aspects, wherein the second plurality of alternating high index and low index layers further comprises a second scratch-resistant high index layer having a physical thickness of at least 50 nm, and further wherein the cover glass article exhibits a maximum hardness of greater than 10 GPa, as measured by a Berkovich Hardness Test over an indentation depth range from about 100 nm to about 500 nm in the inner optical film structure.

As outlined herein, a seventh aspect of the disclosure is a cover glass article according to any one of the fourth through the sixth aspects, wherein the first scratch-resistant high index layer has a physical thickness of at least 500 nm.

As outlined herein, an eighth aspect of the disclosure is a cover glass article according to any one of the first through the seventh aspects, wherein the first and the second plurality of alternating high index and low index layers have a different number of layers.

As outlined herein, a ninth aspect of the disclosure is a cover glass article according to any one of the first through the eighth aspects, wherein the cover glass article further exhibits an average transmittance of greater than 95%, as measured from 400 nm to 700 nm through the primary surfaces of the substrate at an incident angle from 0 to 40 degrees.

As outlined herein, a tenth aspect of the disclosure is a cover glass article according to any one of the first through the ninth aspects, wherein the cover glass article further exhibits a transmitted color $\sqrt{(a^{*2}+b^{*2})}$ with a D65 illuminant through the primary surfaces of the substrate of less than 2 at incident angles from 0 degrees to 10 degrees.

As outlined herein, an eleventh aspect of the disclosure is a cover glass article according to any one of the first through the tenth aspects, wherein the cover glass article exhibits a maximum hardness of greater than 10 GPa, as measured by a Berkovich Hardness Test over an indentation depth range from about 100 nm to about 500 nm in the inner optical film structure.

As outlined herein, a twelfth aspect of the disclosure is a cover glass article according to any one of the first through the eleventh aspects, wherein the substrate comprises a glass substrate.

As outlined herein, a thirteenth aspect of the disclosure is a cover glass article that includes: a substrate comprising an outer primary surface and an inner primary surface, wherein the outer primary surface and the inner primary surface are opposite of one another; the outer primary surface of the substrate has an outer optical film structure disposed thereon; and the inner primary surface of the substrate has an inner optical film structure disposed thereon. The outer optical film structure comprises a first plurality of alternating high index and low index layers, the first plurality comprising an outermost low index layer. Further, the inner optical film structure comprises a second plurality of alternating high index and low index layers, the second plurality comprising a low or high index layer disposed on the inner primary surface of the substrate, and an innermost low or high index layer. Each high index layer of the first plurality comprises $SiN_x$, $SiO_xN_y$, $AlN_x$, $SiAl_xN_y$, or $SiAl_xO_yN_z$ and a physical thickness from about 5 nm to 200 nm, each high index layer of the second plurality comprises $SiN_x$, $SiO_xN_y$, $AlN_x$, $SiAl_xN_y$, $SiAl_xO_yN_z$, $Nb_2O_5$, $Ta_2O_5$, $TiO_2$, $HfO_2$, or $Al_2O_3$ and a physical thickness from 5 nm to 500 nm. In addition, the cover glass article exhibits an average photopic transmittance of greater than 95%, as measured through the primary surfaces of the substrate at an incident angle from 0 to 40 degrees, and the cover glass article exhibits a maximum hardness of greater than 10 GPa, as measured by a Berkovich Hardness Test over an indentation depth range from about 100 nm to about 500 nm in the outer optical film structure.

As outlined herein, a fourteenth aspect of the disclosure is a cover glass article according to the thirteenth aspect, wherein the cover glass article further exhibits an infrared transmittance of greater than 85%, as measured from 840 nm to 860 nm or 930 nm to 950 nm through the primary surfaces of the substrate at an incident angle from 0 to 10 degrees.

As outlined herein, a fifteenth aspect of the disclosure is a cover glass article according to the thirteenth or the fourteenth aspects, wherein the first plurality of alternating high index and low index layers further comprises a low index layer in contact with the outer primary surface of the substrate, and further wherein the second plurality of alternating high index and low index layers comprises a low or high index layer in contact with the inner primary surface of the substrate.

As outlined herein, a sixteenth aspect of the disclosure is a cover glass article according to any one of the thirteenth through the fifteenth aspects, wherein the first plurality of alternating high index and low index layers further comprises a first scratch-resistant high index layer having a physical thickness of at least 50 nm.

As outlined herein, a seventeenth aspect of the disclosure is a cover glass article according to any one of the thirteenth through the sixteenth aspects, wherein each of the first and second plurality of alternating high index and low index layers is at least five (5) layers, and further wherein each low index layer of the first and second plurality comprises $SiO_2$, $SiAl_xO_y$, or $MgF_2$ and a physical thickness from 5 nm to 300 nm.

As outlined herein, an eighteenth aspect of the disclosure is a cover glass article according to any one of the thirteenth through the seventeenth aspects, wherein the second plurality of alternating high index and low index layers further comprises a second scratch-resistant high index layer having a physical thickness of at least 50 nm, and further wherein the cover glass article exhibits a maximum hardness of greater than 10 GPa, as measured by a Berkovich Hardness Test over an indentation depth range from about 100 nm to about 500 nm in the inner optical film structure.

As outlined herein, a nineteenth aspect of the disclosure is a cover glass article according to any one of the sixteenth through the eighteenth aspects, wherein the first scratch-resistant high index layer has a physical thickness of at least 500 nm.

As outlined herein, a twentieth aspect of the disclosure is a cover glass article according to any one of the thirteenth through the nineteenth aspects, wherein the first and the second plurality of alternating high index and low index layers have a different number of layers.

As outlined herein, a twenty-first aspect of the disclosure is a cover glass article according to any one of the thirteenth through the twentieth aspects, wherein the cover glass article further exhibits an average transmittance of greater than 95%, as measured from 400 nm to 700 nm through the primary surfaces of the substrate at an incident angle from 0 to 40 degrees.

As outlined herein, a twenty-second aspect of the disclosure is a cover glass article according to any one of the thirteenth through the twenty-first aspects, wherein the cover glass article further exhibits a transmitted color $\sqrt{(a^{*2}+b^{*2})}$ with a D65 illuminant through the primary surfaces of the substrate of less than 2 at incident angles from 0 degrees to 10 degrees.

As outlined herein, a twenty-third aspect of the disclosure is a cover glass article according to any one of the thirteenth through the twenty-second aspects, wherein the cover glass article exhibits a maximum hardness of greater than 10 GPa, as measured by a Berkovich Hardness Test over an indentation depth range from about 100 nm to about 500 nm in the inner optical film structure.

As outlined herein, a twenty-fourth aspect of the disclosure is a cover glass article according to any one of the thirteenth through the twenty-third aspects, wherein the substrate comprises a glass substrate.

As outlined herein, a twenty-fifth aspect of the disclosure is an apparatus that includes: a housing; at least one of a camera, a sensor, and a light source, each configured within the housing; a substrate within the housing, wherein the substrate comprises an outer primary surface and an inner primary surface, the outer primary surface and the inner primary surface are opposite of one another, and the substrate is disposed over the at least one of a camera, a sensor, and a light source; the outer primary surface of the substrate has an outer optical film structure disposed thereon; and the inner primary surface of the substrate has an inner optical film structure disposed thereon. The outer optical film structure comprises a first plurality of alternating high index and low index layers, the first plurality comprising an outermost low index layer. Further, the inner optical film structure comprises a second plurality of alternating high index and low index layers, the second plurality comprising a low or high index layer disposed on the inner primary surface of the substrate, and an innermost low or high index layer disposed over, and with an air gap therebetween, the at least one of a camera, a sensor, and a light source. Each high index layer of the first plurality comprises a nitride or an oxynitride, and each high index layer of the second plurality comprises an oxide or a nitride. In addition, the substrate and the outer and inner optical film structures exhibit an average photopic transmittance of greater than 95%, as measured through the primary surfaces of the substrate at an incident angle from 0 to 40 degrees. Further, the substrate and the outer and inner optical film structures exhibit a maximum hardness of greater than 10 GPa, as measured by a Berkovich Hardness Test over an indentation depth range from about 100 nm to about 500 nm in the outer optical film structure.

As outlined herein, a twenty-sixth aspect of the disclosure is an apparatus according to the twenty-fifth aspect, wherein the substrate and the outer and inner optical film structures further exhibit an infrared transmittance of greater than 85%, as measured from 840 nm to 860 nm or 930 nm to 950 nm through the primary surfaces of the substrate at an incident angle from 0 to 10 degrees.

As outlined herein, a twenty-seventh aspect of the disclosure is an apparatus according to the twenty-fifth or the twenty-sixth aspects, wherein the first plurality of alternating high index and low index layers further comprises a low index layer in contact with the outer primary surface of the substrate, and further wherein the second plurality of alternating high index and low index layers comprises a low or high index layer in contact with the inner primary surface of the substrate.

As outlined herein, a twenty-eighth aspect of the disclosure is an apparatus according to any one of the twenty-fifth through the twenty-seventh aspects, wherein the first plurality of alternating high index and low index layers further comprises a first scratch-resistant high index layer having a physical thickness of at least 50 nm.

As outlined herein, a twenty-ninth aspect of the disclosure is an apparatus according to any one of the twenty-fifth through the twenty-eighth aspects, wherein each of the first and second plurality of alternating high index and low index layers is at least five (5) layers.

As outlined herein, a thirtieth aspect of the disclosure is an apparatus according to any one of the twenty-fifth through the twenty-ninth aspects, wherein the second plurality of alternating high index and low index layers further comprises a second scratch-resistant high index layer having a physical thickness of at least 50 nm, and further wherein the substrate and the outer and inner optical film structures exhibit a maximum hardness of greater than 10 GPa, as measured by a Berkovich Hardness Test over an indentation depth range from about 100 nm to about 500 nm in the inner optical film structure.

As outlined herein, a thirty-first aspect of the disclosure is an apparatus according to any one of the twenty-eighth through the thirtieth aspects, wherein the first scratch-resistant high index layer has a physical thickness of at least 500 nm.

As outlined herein, a thirty-second aspect of the disclosure is an apparatus according to any one of the twenty-fifth through the thirty-first aspects, wherein the first and the second plurality of alternating high index and low index layers have a different number of layers.

As outlined herein, a thirty-third aspect of the disclosure is an apparatus according to any one of the twenty-fifth through the thirty-second aspects, wherein the substrate and the outer and inner optical film structures further exhibit an average transmittance of greater than 95%, as measured from 400 nm to 700 nm through the primary surfaces of the substrate at an incident angle from 0 to 40 degrees.

As outlined herein, a thirty-fourth aspect of the disclosure is an apparatus according to any one of the twenty-fifth through the thirty-third aspects, wherein the substrate and the outer and inner optical film structures further exhibit a transmitted color $\sqrt{(a^{*2}+b^{*2})}$ with a D65 illuminant through the primary surfaces of the substrate of less than 2 at incident angles from 0 degrees to 10 degrees.

As outlined herein, a thirty-fifth aspect of the disclosure is an apparatus according to any one of the twenty-fifth through the thirty-fourth aspects, wherein the substrate and the outer and inner optical film structures exhibit a maximum hardness of greater than 10 GPa, as measured by a Berkovich Hardness Test over an indentation depth range from about 100 nm to about 500 nm in the inner optical film structure.

As outlined herein, a thirty-sixth aspect of the disclosure is an apparatus according to any one of the twenty-fifth through the thirty-fifth aspects, wherein the sensor is an infrared sensor and the camera is a visible light camera.

As outlined herein, a thirty-seventh aspect of the disclosure is an apparatus according to any one of the twenty-fifth through the thirty-sixth aspects, wherein the substrate comprises a glass substrate.

As outlined herein, a thirty-eighth aspect of the disclosure is a cover glass article according to any one of the first through the twelfth aspects, wherein the cover glass article further exhibits an average photopic reflectance of less than 2.0%, as measured through the primary surfaces of the substrate at an incident angle from 0 to 10 degrees.

As outlined herein, a thirty-ninth aspect of the disclosure is a cover glass article according to any one of the first through the twelfth aspects, wherein the cover glass article further exhibits an average reflectance of less than 10%, as measured from 840 nm to 950 nm through the primary surfaces of the substrate at an incident angle from 0 to 10 degrees.

As outlined herein, a fortieth aspect of the disclosure is a cover glass article according to any one of the thirteenth through the twenty-fourth aspects, wherein the cover glass article further exhibits an average photopic reflectance of less than 2.0%, as measured through the primary surfaces of the substrate at an incident angle from 0 to 10 degrees.

As outlined herein, a forty-first aspect of the disclosure is a cover glass article according to any one of the thirteenth through the twenty-fourth aspects, wherein the cover glass article further exhibits an average reflectance of less than 10%, as measured from 840 nm to 950 nm through the primary surfaces of the substrate at an incident angle from 0 to 10 degrees.

As outlined herein, a forty-second aspect of the disclosure is an apparatus according to any one of the twenty-fifth through the thirty-seventh aspects, wherein the cover glass article further exhibits an average photopic reflectance of less than 2.0%, as measured through the primary surfaces of the substrate at an incident angle from 0 to 10 degrees.

As outlined herein, a forty-third aspect of the disclosure is an apparatus according to any one of the twenty-fifth through the thirty-seventh aspects, wherein the cover glass article further exhibits an average reflectance of less than 10%, as measured from 840 nm to 950 nm through the primary surfaces of the substrate at an incident angle from 0 to 10 degrees.

As outlined herein, a forty-fourth aspect of the disclosure is an apparatus according to the twenty-fifth aspect, wherein the at least one of a camera, a sensor and a light source is two or more of the camera, the sensor and the light source, and further wherein the substrate is disposed over the two or more of the camera, the sensor and the light source.

Many variations and modifications may be made to the above-described embodiments of the disclosure without departing substantially from the spirit and various principles of the disclosure. All such modifications and variations are intended to be included herein within the scope of this disclosure and protected by the following claims.

What is claimed is:

1. A cover glass article, comprising:
a substrate comprising an outer primary surface and an inner primary surface, wherein the outer primary surface and the inner primary surface are opposite of one another;
the outer primary surface of the substrate has an outer optical film structure disposed thereon; and
the inner primary surface of the substrate has an inner optical film structure disposed thereon,
wherein the substrate has a physical thickness from 100 μm to 5 mm,
wherein the outer optical film structure comprises a first plurality of alternating high index and low index layers, the first plurality comprising an outermost low index layer that is a capping layer,
wherein the inner optical film structure comprises a second plurality of alternating high index and low index layers, the second plurality comprising a low or high index layer disposed on the inner primary surface of the substrate, and an innermost low or high index layer, wherein each high index layer of the first plurality comprises a nitride or an oxynitride, and each high index layer of the second plurality comprises an oxide or a nitride, wherein the outermost low index layer in the outer optical film structure has a refractive index from about 1.3 to about 1.7, wherein the cover glass article exhibits an average photopic transmittance of greater than 95%, as measured through the primary surfaces of the substrate at an incident angle from 0 to 40 degrees, further wherein the cover glass article exhibits a maximum hardness of greater than 10 GPa, as measured by a Berkovich Hardness Test over an indentation depth range from about 100 nm to about 500 nm in the outer optical film structure, wherein the cover glass article further exhibits an infrared transmittance of greater than 88%, as measured from 840 nm to 860 nm or 930 nm to 950 nm through the primary surfaces of the substrate at an incident angle from 0 to 10 degrees, wherein the high index material of the first plurality of alternating high index and low index layers comprises one or more of $SiN_x$ and $SiO_xN_y$, and wherein the high index material of the second plurality of alternating high index and low index layers comprises $TiO_2$, $Ta_2O_5$ or $Nb_2O_5$.

2. The cover glass article according to claim 1, wherein the first plurality of alternating high index and low index layers further comprises a low index layer in contact with the outer primary surface of the substrate, and further wherein the second plurality of alternating high index and low index layers comprises a low or high index layer in contact with the inner primary surface of the substrate.

3. The cover glass article according to claim 1, wherein the first plurality of alternating high index and low index layers further comprises a first scratch-resistant high index layer having a physical thickness of at least 50 nm.

4. The cover glass article according to claim 3, wherein the first scratch-resistant high index layer has a physical thickness of at least 500 nm.

5. The cover glass article according to claim 1, wherein each of the first and second plurality of alternating high index and low index layers is at least five (5) layers.

6. The cover glass article according to claim 1, wherein the second plurality of alternating high index and low index layers further comprises a second scratch-resistant high index layer having a physical thickness of at least 50 nm, and further wherein the cover glass article exhibits a maximum hardness of greater than 10 GPa, as measured by a Berkovich Hardness Test over an indentation depth range from about 100 nm to about 500 nm in the inner optical film structure.

7. The cover glass article according to claim 1, wherein the first and the second plurality of alternating high index and low index layers have a different number of layers.

8. The cover glass article according to claim 1, wherein the cover glass article further exhibits an average transmittance of greater than 95%, as measured from 400 nm to 700 nm through the primary surfaces of the substrate at an incident angle from 0 to 40 degrees.

9. The cover glass article according to claim 1, wherein the cover glass article further exhibits a transmitted color $\sqrt{(a*^2+b*^2)}$ with a D65 illuminant through the primary surfaces of the substrate of less than 2 at incident angles from 0 degrees to 10 degrees.

10. The cover glass article according to claim 1, wherein the cover glass article exhibits a maximum hardness of greater than 10 GPa, as measured by a Berkovich Hardness Test over an indentation depth range from about 100 nm to about 500 nm in the inner optical film structure.

11. The cover glass article according to claim 1, wherein the substrate comprises a glass substrate.

12. The cover glass article according to claim 1, wherein the cover glass article further exhibits an average photopic reflectance of less than 2.0%, as measured through the primary surfaces of the substrate at an incident angle from 0 to 10 degrees.

13. The cover glass article according to claim 1, wherein the cover glass article further exhibits an average reflectance of less than 10%, as measured from 840 nm to 950 nm through the primary surfaces of the substrate at an incident angle from 0 to 10 degrees.

14. A cover glass article, comprising:

a substrate comprising an outer primary surface and an inner primary surface, wherein the outer primary surface and the inner primary surface are opposite of one another;

the outer primary surface of the substrate has an outer optical film structure disposed thereon; and the inner primary surface of the substrate has an inner optical film structure disposed thereon, wherein the substrate has a physical thickness from 100 μm to 5 mm, wherein the outer optical film structure comprises a first plurality of alternating high index and low index layers, the first plurality comprising an outermost low index layer that is a capping layer, wherein the inner optical film structure comprises a second plurality of alternating high index and low index layers, the second plurality comprising a low or high index layer disposed on the inner primary surface of the substrate, and an innermost low or high index layer, wherein each high index layer of the first plurality comprises $SiN_x$, $SiO_xN_y$, $AlN_x$, $SiAl_xN_y$, or $SiAl_xO_yN_z$ and a physical thickness from about 5 nm to 2000 nm, each high index layer of the second plurality comprises $SiN_x$, $SiO_xN_y$, $AlN_x$, $SiAl_xN_y$, $SiAl_xO_yN_z$, $Nb_2O_5$, $Ta_2O_5$, $TiO_2$, $HfO_2$, or $Al_2O_3$ and a physical thickness from 5 nm to 500 nm, wherein the outermost low index layer of the outer optical film structure has a refractive index from about 1.3 to about 1.7, wherein the cover glass article exhibits an average photopic transmittance of greater than 95%, as measured through the primary surfaces of the substrate at an incident angle from 0 to 40 degrees, further wherein the cover glass article exhibits a maximum hardness of greater than 10 GPa, as measured by a Berkovich Hardness Test over an indentation depth range from about 100 nm to about 500 nm in the outer optical film structure, and wherein the first and the second plurality of alternating high index and low index layers have a different number of layers.

15. The cover glass article according to claim 14, wherein the cover glass article further exhibits an infrared transmittance of greater than 85%, as measured from 840 nm to 860 nm or 930 nm to 950 nm through the primary surfaces of the substrate at an incident angle from 0 to 10 degrees.

16. The cover glass article according to claim 14, wherein the first plurality of alternating high index and low index layers further comprises a low index layer in contact with the outer primary surface of the substrate, and further wherein the second plurality of alternating high index and low index layers comprises a low or high index layer in contact with the inner primary surface of the substrate.

17. The cover glass article according to claim 14, wherein the first plurality of alternating high index and low index layers further comprises a first scratch-resistant high index layer having a physical thickness of at least 50 nm.

18. The cover glass article according to claim 17, wherein the first scratch-resistant high index layer has a physical thickness of at least 500 nm.

19. The cover glass article according to claim 14, wherein each of the first and second plurality of alternating high index and low index layers is at least five (5) layers, and further wherein each low index layer of the first and second plurality comprises $SiO_2$, $SiAl_xO_y$, or $MgF_2$ and a physical thickness from 5 nm to 300 nm.

20. The cover glass article according to claim 14, wherein the second plurality of alternating high index and low index layers further comprises a second scratch-resistant high index layer having a physical thickness of at least 50 nm, and further wherein the cover glass article exhibits a maximum hardness of greater than 10 GPa, as measured by a Berkovich Hardness Test over an indentation depth range from about 100 nm to about 500 nm in the inner optical film structure.

21. The cover glass article according to claim 14, wherein the cover glass article further exhibits an average transmittance of greater than 95%, as measured from 400 nm to 700 nm through the primary surfaces of the substrate at an incident angle from 0 to 40 degrees.

22. The cover glass article according to claim 14, wherein the cover glass article further exhibits a transmitted color $\sqrt{(a^{*2}+b^{*2})}$ with a D65 illuminant through the primary surfaces of the substrate of less than 2 at incident angles from 0 degrees to 10 degrees.

23. The cover glass article according to claim 14, wherein the cover glass article exhibits a maximum hardness of greater than 10 GPa, as measured by a Berkovich Hardness Test over an indentation depth range from about 100 nm to about 500 nm in the inner optical film structure.

24. The cover glass article according to claim 14, wherein the substrate comprises a glass substrate.

25. The cover glass article according to claim 14, wherein the cover glass article further exhibits an average photopic reflectance of less than 2.0%, as measured through the primary surfaces of the substrate at an incident angle from 0 to 10 degrees.

26. The cover glass article according to claim 14, wherein the cover glass article further exhibits an average reflectance of less than 10%, as measured from 840 nm to 950 nm through the primary surfaces of the substrate at an incident angle from 0 to 10 degrees.

27. The cover glass article of claim 14,
    wherein the cover glass article further exhibits an infrared transmittance of greater than 88%, as measured from 840 nm to 860 nm or 930 nm to 950 nm through the primary surfaces of the substrate at an incident angle from 0 to 10 degrees,
    wherein the high index material of the first plurality of alternating high index and low index layers comprises one or more of $SiN_x$ and $SiO_xN_y$, and wherein the high index material of the second plurality of alternating high index and low index layers comprises $TiO_2$, $Ta_2O_5$ or $Nb_2O_5$.

28. An apparatus, comprising:
a housing;
at least one of a camera, a sensor, and a light source, each configured within the housing;
a substrate within the housing, wherein the substrate comprises an outer primary surface and an inner primary surface, the outer primary surface and the inner primary surface are opposite of one another, and the substrate is disposed over the at least one of a camera, a sensor, and a light source;
the outer primary surface of the substrate has an outer optical film structure disposed thereon; and
the inner primary surface of the substrate has an inner optical film structure disposed thereon,
wherein the substrate has a physical thickness from 100 μm to 5 mm,
wherein the outer optical film structure comprises a first plurality of alternating high index and low index layers, the first plurality comprising an outermost low index layer that is the capping layer,
wherein the inner optical film structure comprises a second plurality of alternating high index and low index layers, the second plurality comprising a low or high index layer disposed on the inner primary surface of the substrate, and an innermost low or high index layer disposed over, and with an air gap therebetween, the at least one of a camera, a sensor, and a light source,
wherein each high index layer of the first plurality comprises a nitride or an oxynitride, and each high index layer of the second plurality comprises an oxide or a nitride,
wherein the outermost low index layer of the outer optical film structure has a refractive index from about 1.3 to about 1.7,
wherein the substrate and the outer and inner optical film structures exhibit an average photopic transmittance of greater than 95%, as measured through the primary surfaces of the substrate at an incident angle from 0 to 40 degrees,
further wherein the substrate and the outer and inner optical film structures exhibit a maximum hardness of greater than 10 GPa, as measured by a Berkovich Hardness Test over an indentation depth range from about 100 nm to about 500 nm in the outer optical film structure,
wherein the cover glass article further exhibits an infrared transmittance of greater than 88%, as measured from 840 nm to 860 nm or 930 nm to 950 nm through the primary surfaces of the substrate at an incident angle from 0 to 10 degrees,
wherein the high index material of the first plurality of alternating high index and low index layers comprises one or more of $SiN_x$ and $SiO_xN_y$, and
wherein the high index material of the second plurality of alternating high index and low index layers comprises $TiO_2$, $Ta_2O_5$ or $Nb_2O_5$.

29. The cover glass article according to claim 28, wherein the substrate comprises a glass substrate.

30. A cover glass article, comprising:
a substrate comprising an outer primary surface and an inner primary surface, wherein the outer primary surface and the inner primary surface are opposite of one another;

the outer primary surface of the substrate has an outer optical film structure disposed thereon; and the inner primary surface of the substrate has an inner optical film structure disposed thereon, wherein the substrate has a physical thickness from 100 µm to 5 mm, wherein the outer optical film structure comprises a first plurality of alternating high index and low index layers, the first plurality comprising an outermost low index layer that is a capping layer, wherein the inner optical film structure comprises a second plurality of alternating high index and low index layers, the second plurality comprising a low or high index layer disposed on the inner primary surface of the substrate, and an innermost low or high index layer, wherein each high index layer of the first plurality comprises a nitride or an oxynitride, and each high index layer of the second plurality comprises an oxide or a nitride, wherein the outermost low index layer in the outer optical film structure has a refractive index from about 1.3 to about 1.7, wherein the cover glass article exhibits an average photopic transmittance of greater than 95%, as measured through the primary surfaces of the substrate at an incident angle from 0 to 40 degrees, further wherein the cover glass article exhibits a maximum hardness of greater than 10 GPa, as measured by a Berkovich Hardness Test over an indentation depth range from about 100 nm to about 500 nm in the outer optical film structure, and wherein the first and the second plurality of alternating high index and low index layers have a different number of layers.

31. An apparatus, comprising:

a housing;

at least one of a camera, a sensor, and a light source, each configured within the housing;

a substrate within the housing, wherein the substrate comprises an outer primary surface and an inner primary surface, the outer primary surface and the inner primary surface are opposite of one another, and the substrate is disposed over the at least one of a camera, a sensor, and a light source;

the outer primary surface of the substrate has an outer optical film structure disposed thereon; and the inner primary surface of the substrate has an inner optical film structure disposed thereon, wherein the substrate has a physical thickness from 100 µm to 5 mm, wherein the outer optical film structure comprises a first plurality of alternating high index and low index layers, the first plurality comprising an outermost low index layer that is the capping layer, wherein the inner optical film structure comprises a second plurality of alternating high index and low index layers, the second plurality comprising a low or high index layer disposed on the inner primary surface of the substrate, and an innermost low or high index layer disposed over, and with an air gap therebetween, the at least one of a camera, a sensor, and a light source, wherein each high index layer of the first plurality comprises a nitride or an oxynitride, and each high index layer of the second plurality comprises an oxide or a nitride, wherein the outermost low index layer of the outer optical film structure has a refractive index from about 1.3 to about 1.7, wherein the substrate and the outer and inner optical film structures exhibit an average photopic transmittance of greater than 95%, as measured through the primary surfaces of the substrate at an incident angle from 0 to 40 degrees, further wherein the substrate and the outer and inner optical film structures exhibit a maximum hardness of greater than 10 GPa, as measured by a Berkovich Hardness Test over an indentation depth range from about 100 nm to about 500 nm in the outer optical film structure, and wherein the first and the second plurality of alternating high index and low index layers have a different number of layers.

* * * * *